US012253257B2

(12) United States Patent
Wang et al.

(10) Patent No.: US 12,253,257 B2
(45) Date of Patent: Mar. 18, 2025

(54) LED LIGHTING DEVICE

(71) Applicant: JIAXING SUPER LIGHTING ELECTRIC APPLIANCE CO LTD, Jiaxing (CN)

(72) Inventors: Mingbin Wang, Jiaxing (CN); Zhichao Zhang, Jiaxing (CN); Dongmei Zhang, Jiaxing (CN); Jifeng Xu, Jiaxing (CN); Tao Jiang, Jiaxing (CN); Kuan Lin, Jiaxing (CN); Huan Wei, Jiaxing (CN); Heng Zhao, Jiaxing (CN); Zecheng Jing, Jiaxing (CN)

(73) Assignee: Jiaxing Super Lighting Electric Appliance Co.,Ltd., Zhejiang (CN)

( * ) Notice: Subject to any disclaimer, the term of this patent is extended or adjusted under 35 U.S.C. 154(b) by 0 days.

(21) Appl. No.: 18/689,451

(22) PCT Filed: Aug. 29, 2022

(86) PCT No.: PCT/CN2022/115343
§ 371 (c)(1),
(2) Date: Mar. 6, 2024

(87) PCT Pub. No.: WO2023/035992
PCT Pub. Date: Mar. 16, 2023

(65) Prior Publication Data

US 2025/0003573 A1 Jan. 2, 2025

(30) Foreign Application Priority Data

Sep. 10, 2021 (CN) ......................... 202111061744.0
Nov. 11, 2021 (CN) ......................... 202111331195.4
(Continued)

(51) Int. Cl.
*F21V 7/00* (2006.01)
*F21V 5/00* (2018.01)
(Continued)

(52) U.S. Cl.
CPC ............ *F21V 7/0083* (2013.01); *F21V 5/007* (2013.01); *F21V 19/02* (2013.01); *F21V 23/06* (2013.01);
(Continued)

(58) Field of Classification Search
CPC ............................... F21V 5/007; F21V 7/0083
See application file for complete search history.

(56) References Cited

U.S. PATENT DOCUMENTS

2001/0001241 A1 5/2001 Kawakami et al.
2003/0165061 A1 9/2003 Martineau
(Continued)

FOREIGN PATENT DOCUMENTS

CN 102287646 A 12/2011
CN 204592956 U 8/2015
(Continued)

*Primary Examiner* — William N Harris
(74) *Attorney, Agent, or Firm* — Muir Patent Law, PLLC

(57) ABSTRACT

A LED lighting device, comprising: a base which has a bottom plate and a side wall, a cavity being formed between the bottom plate and the side wall; an optical component which covers one side of the base in a light-emitting direction of the LED lighting device; and a light source which is provided in the cavity of the base and comprises a circuit board and several LED arrays, the LED arrays comprising LED lamp beads fixed on the circuit board. The optical component comprises an optical unit, and the optical unit comprises a plurality of first optical components and a plurality of second optical components which correspond to the first optical components.

15 Claims, 47 Drawing Sheets

(30) Foreign Application Priority Data

| | | |
|---|---|---|
| Nov. 11, 2021 | (CN) | 202111332265.8 |
| Nov. 26, 2021 | (CN) | 202111418895.7 |
| Dec. 2, 2021 | (CN) | 202111461923.3 |
| Dec. 13, 2021 | (CN) | 202111517441.5 |
| Mar. 18, 2022 | (CN) | 202210267139.7 |
| Mar. 18, 2022 | (CN) | 202210267368.9 |
| Mar. 25, 2022 | (CN) | 202210299020.8 |
| May 10, 2022 | (CN) | 202210501344.5 |
| May 13, 2022 | (CN) | 202210519001.1 |
| Jul. 13, 2022 | (CN) | 202210818629.1 |
| Aug. 2, 2022 | (CN) | 202210319254.8 |

(51) Int. Cl.
*F21V 19/02* (2006.01)
*F21V 23/06* (2006.01)
*F21Y 105/16* (2016.01)
*F21Y 115/10* (2016.01)

(52) U.S. Cl.
CPC ....... *F21Y 2105/16* (2016.08); *F21Y 2115/10* (2016.08)

(56) References Cited

U.S. PATENT DOCUMENTS

| | | | |
|---|---|---|---|
| 2009/0310381 | A1 | 12/2009 | Chang et al. |
| 2010/0207131 | A1 | 8/2010 | Chiang et al. |
| 2011/0292658 | A1 | 12/2011 | Ho |
| 2012/0206911 | A1 | 8/2012 | Pickard et al. |
| 2013/0201693 | A1 | 8/2013 | Tang |
| 2013/0265751 | A1 | 10/2013 | Edmond et al. |
| 2014/0168992 | A1 | 6/2014 | Xue et al. |
| 2015/0138766 | A1 | 5/2015 | Kuo |
| 2016/0003454 | A1 | 1/2016 | Ye |
| 2018/0299096 | A1 | 10/2018 | Zhou |
| 2019/0004238 | A1 | 1/2019 | Peng et al. |
| 2019/0063723 | A1 | 2/2019 | Yamada |
| 2022/0034481 | A1 | 2/2022 | Caprara et al. |
| 2022/0299197 | A1 | 9/2022 | Henrici et al. |

FOREIGN PATENT DOCUMENTS

| | | | |
|---|---|---|---|
| CN | 205191348 | U | 4/2016 |
| CN | 205208278 | U | 5/2016 |
| CN | 206459105 | U | 9/2017 |
| CN | 208566388 | U | 3/2019 |
| CN | 208997833 | U | 6/2019 |
| CN | 209638797 | U | 11/2019 |
| CN | 211040856 | U | 7/2020 |
| CN | 112781012 | A | 5/2021 |
| CN | 215372333 | U | 12/2021 |
| CN | 215411610 | U | 1/2022 |
| CN | 216017257 | U | 3/2022 |
| CN | 217441545 | U | 9/2022 |
| JP | 2016058284 | A | 4/2016 |
| KR | 101001953 | B1 | 12/2010 |

LED LIGHTING DEVICE

CROSS-REFERENCE TO RELATED APPLICATIONS

This application is a U.S. 371 national stage of prior application number PCT/CN2022/115343 filed on 2022 Aug. 29, which claims priority to the following Chinese Patent Applications Nos: CN 202111061744.0 filed on 2021 Sep. 10; CN 202111331195.4 filed on 2021 Nov. 11; CN 202111332265.8 filed on 2021 Nov. 11; CN 202111418895.7 filed on 2021 Nov. 26; CN 202111461923.3 filed on 2021 Dec. 2; CN 202111517441.5 filed on 2021 Dec. 13; CN 202210267368.9 filed on 2022 Mar. 18; CN 202210267139.7 filed on 2022 Mar. 18; CN 202210299020.8 filed on 2022 Mar. 25; CN 202210501344.5 filed on 2022 May 10; CN 202210519001.1 filed on 2022 May 13; CN 202210818629.1 filed on 2022 Jul. 13; CN 202210919254.8 filed on 2022 Aug. 2, the disclosures of which are incorporated herein in their entirety by reference. This application is also a continuation-in-part of prior U.S. application Ser. No. 17/775,307.

FIELD OF THE INVENTION

The invention relates to lighting apparatuses, particularly to LED lighting devices.

BACKGROUND OF THE INVENTION

Light-emitting diode (LED) lighting has been widely adopted because of the advantages of energy-saving and long life. In currently available LED lighting, flat lamps and grille lamps are common.

A prior-art planar lamp usually includes a light strip, a base frame, a light guide plate and a diffuser plate. The light strip is disposed beside the base frame to provide lateral light emitting. Light emitted by the light strip is ejected from the diffuser plate via the light guide plate. Such a planar lamp has following drawbacks. Light emitted by the light strip will generate a greater light loss after passing through the light guide plate and the diffuser plate to result in low efficiency of light emitting. The guide plate is high in cost, this is disadvantageous to cost control. Glare control of the planar lamp is less good.

A prior-art grille lamp includes a base frame, a light source (may adopt a light strip, fluorescent tube or LED tube) and a grille. The light source is fixed on the base frame. The grille is disposed on the light emitting side of the light source. Such a grille lamp has following drawbacks. The arrangement of the grille is disadvantageous to the height control of the grille lamp to cause cost increase of package and transportation. The high cost of the grille is disadvantageous to the cost control of the whole lamp. The grille generates greater light loss and a dark area is easy to occur in the grille to be disadvantageous to light emitting.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY OF THE INVENTION

A number of embodiments relating to the invention are briefly described in this summary. However, the terms herein are used to describe only certain embodiments disclosed in this specification (whether or not already claimed) and not to be a complete description of all possible embodiments. Certain embodiments of the various features or aspects of the invention described above may be combined in various ways to form an LED lighting device or a portion thereof.

An embodiment of the invention provides an LED (light-emitting diode) lighting device, which includes:

a seat, having a baseplate and a sidewall, and a chamber being formed between the baseplate and the sidewall;

an optical member, completely covered on a side of the seat in a light-emitting direction of the LED lighting device; and a light source, disposed in the chamber of the seat, and comprising a circuit board and multiple LED arrays, wherein the LED array comprises LED chips mounted on the circuit board;

wherein the optical member comprises an optical unit, the optical unit comprises multiple first optical members and multiple second optical members corresponding to the first optical members, the LED arrays correspond to the first optical members, the second optical member comprises one or more optical wall s, and the optical wall(s) is/are arranged to surround the first optical members; and a rectangular coordinate system is established with a center in a width direction of the circuit board as an origin, a thickness direction of the LED lighting device as a Y-axis, a width direction of the first optical member as an X-axis, and any point on a light-emitting surface of the first optical members satisfies a following formula:

$$y=Ax^2+1E-15x-K$$

where A is a constant whose range is between 0.048 and 0.052, E means an exponent, and K is a constant whose range is between 9 and 12.

In an embodiment of the invention, any point on the optical wall of the second optical member satisfies a following formula:

$$Y=ax+L$$

where a is a constant whose range of absolute value is between 1.35 and 1.45, and L is a constant whose range is between 18 and 22.

In an embodiment of the invention, the LED chips have only one layer of light-permeable material in an optical axis of the LED chips.

In an embodiment of the invention, light emitting efficiency of the LED lighting device is greater than 80%.

In an embodiment of the invention, the LED chips have only one thermal resistance layer in an optical axis of the LED chips.

In an embodiment of the invention, the first optical members and the second optical members are made of the same layer material.

In an embodiment of the invention, the ratio of luminous intensity of two light distribution curves under the same angle in any direction is between 0.8 and 1.2.

In an embodiment of the invention, the ratio of luminous intensity of two light distribution curves under the same angle in any direction is between 0.9 and 1.1.

An embodiment of the invention further includes a light distribution curve, wherein a coordinate system is established with point 0 of the light distribution curve as a center, in a range of 0 to 60 degrees, any point on the light distribution curve satisfies a following formula:

$$y=ax^2+bx+K$$

where a is a constant whose range is between −0.3 and −0.4, b is a constant whose range is between 3.5 and 4, and K is a constant whose range is between 1600 and 1700.

In an embodiment of the invention, a light beam angle of the light distribution curve is between 100 degrees and 110 degrees.

An embodiment of the invention provides an LED (light-emitting diode) lighting device, which includes:

a seat, having a baseplate and a sidewall, and a chamber being formed between the baseplate and the sidewall; and a light source, disposed in the chamber of the seat, and comprising a circuit board and multiple LED arrays, wherein the LED array comprises LED chips mounted on the circuit board.

An embodiment of the invention provides an LED (light-emitting diode) lighting device, which includes:

a seat; and an optical member, completely covered on a side of the seat in a light-emitting direction of the LED lighting device.

In comparison with related art, the invention has the following advantages. At least part of the light which passes through a second optical member can be emitted from an adjacent second optical member, or at least part of the light which passes through a second optical member can be emitted from the second optical member after being reflected to prevent the second optical member from forming a dark area so as to improve overall appearance of the LED lighting device when lit.

DETAILED DESCRIPTION OF PREFERRED EMBODIMENTS

Figure 1:
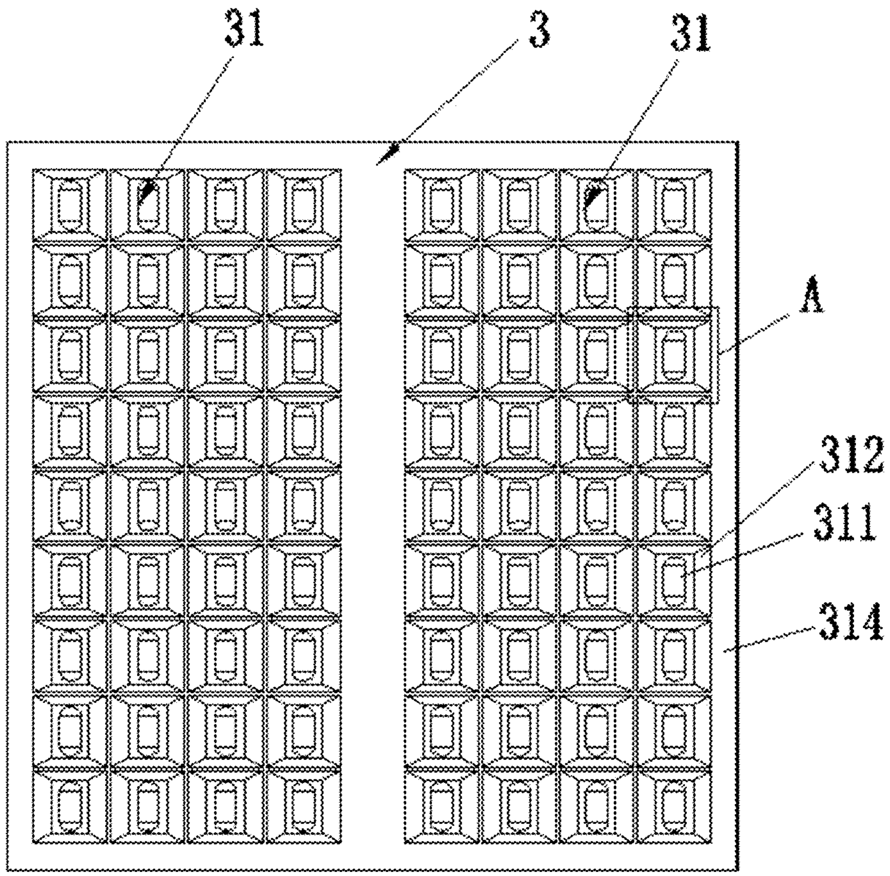
FIG. 1 is a front schematic view of an embodiment of the LED lighting device of the invention.

The following detailed description in association with the drawings is intended to provide further details to the invention. The drawings depict embodiments of the invention. However, the following descriptions of various embodiments of this invention are presented herein for purpose of illustration and giving examples only. It is not intended to be exhaustive or to be limited to the precise form disclosed. These exemplary embodiments are just examples and many implementations and variations are possible without the details provided herein. Contrarily, these embodiments make the invention thorough and complete and entirely convey the scope of the invention to persons having ordinary skill in the art. The same reference characters in the drawings indicate the same element.

It will be understood that, although the terms “first”, “second”, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term “and/or” includes one or more any and all combinations of the associated listed items.

It will be understood that when an element such as a layer, region or substrate is referred to as being “on” or extending “over” another element, the element can be directly on another element or directly extended over another element, or an intervening element may also be present. In contrast, when an element is referred to as being “directly on” or “extending directly on” another element, there are no intervening elements present. It will also be understood that when an element is referred to as being “connected” or “coupled” to another element, it can be directly connected or coupled to another element or an intervening element may be present. In contrast, when an element is referred to as being “directly connected” or “directly coupled” to another element, there are no intervening elements present.

Some terms mentioned in the following description, such as “lower”, “upper”, “above”, “under”, “perpendicular” or “horizontal” are used for clear structural relationship of an element, layer or region and another element, layer or region. It will be understood that these terms are intended to assist in understanding preferred embodiments of the invention with reference to the accompanying drawing Figures and with respect to the orientation of the sealing assemblies as shown in the Figures, and are not intended to be limiting to the scope of the invention or to limit the invention scope to the preferred embodiments shown in the Figures. In the present invention, the terms “perpendicular”, “horizontal” and “parallel” are defined in a range of ±10% based on a standard definition. For example, “perpendicular” (perpendicularity) means the relationship between two lines which meet at a right angle (90 degrees). However, in the present invention, “perpendicular” may encompass a range from 80 degrees to 100 degrees.

The phrases used herein are for the purpose of describing particular embodiments only and are not intended to limit the invention. As used herein, the singular forms “a” “an” and “the” are intended to include the plural forms as well, unless the context clearly dictates otherwise. It will also be understood that the terms “comprise”, “comprising”, “include” and/or “including” used herein designate the presence of recited features, integers, steps, operations, elements and/or parts, but do not preclude the presence or addition of one or more other features, integers, steps, operations, elements, parts and/or combinations thereof.

Unless otherwise defined, all terms (including technical and scientific terms) used herein have the same meaning as commonly understood by a person having ordinary skill in the art. It will also be understood that terms used herein should be construed to have meanings consistent with their meanings in the context of this specification and the relevant art, and should not be construed in an idealized or overly formal manner unless they are expressly so limited.

Unless explicitly stated otherwise, comparative quantitative terms such as “less than” and “greater than” are intended to encompass the concept of equality. As an example, “less than” means not only “less than” in the strictest mathematical sense, but also “less than or equal to.”

Please refer to FIGS. 1 to 6. The invention provides a light-emitting diode (LED) lighting device which includes a seat 1, a light source 2, an optical assembly 3 and an electric power source 4. The light source 2 is electrically connected to the electric power source 4. The light source 2 is disposed on the seat 1. The optical assembly 3 is disposed on a light-emitting direction of the light source 2.

Figure 9:
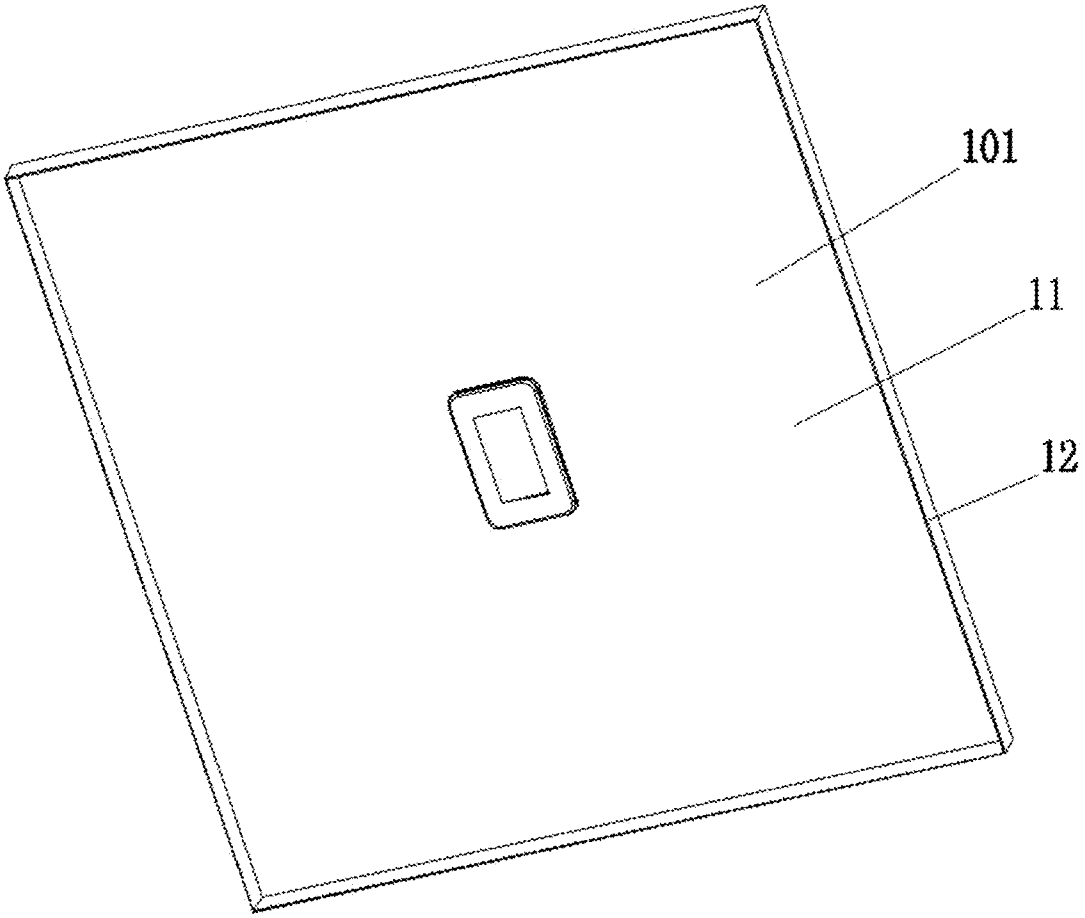
FIG. 9 is a perspective schematic view of the seat.

Please refer to FIG. 9. The seat 1 in the embodiment has a baseplate 11 and a sidewall 12. The sidewall 12 is disposed on a periphery of the baseplate 11 to form a chamber 101 between the baseplate 11 and the sidewall 12. The light source 2 is disposed in the chamber 101. The seat 1 may be made of metal such as iron or stainless steel to increase its thermal performance. In some embodiments, the seat 1 is formed by an integrated structure. The sidewall 12 is formed by directly bending the baseplate 11. In some embodiments, the seat 1 is formed by an integrated structure which is directly formed by pressing or stretching to possess better structural strength. In some embodiments, the seat 1 may also adopt plastic material.

Figure 6:
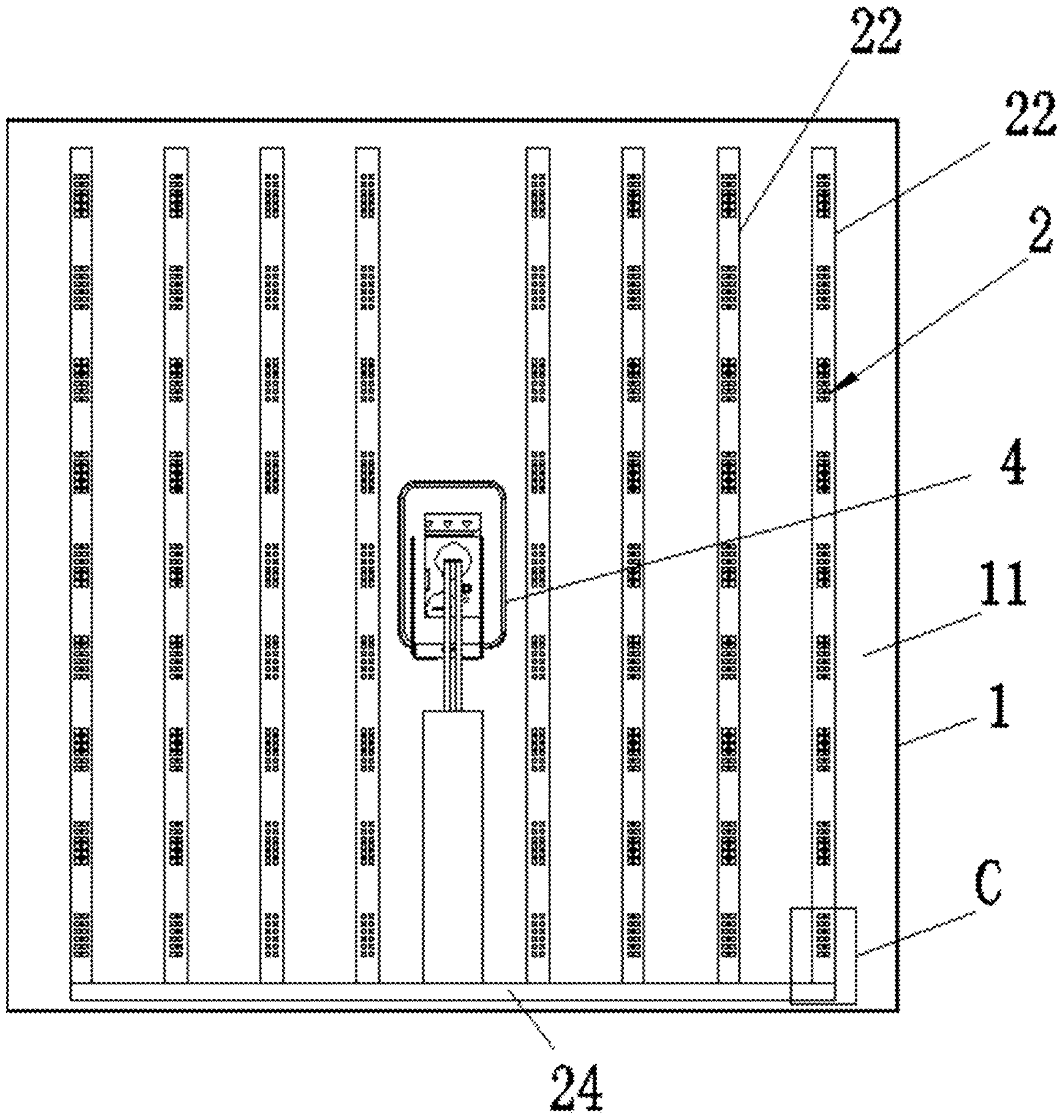
FIG. 6 is a schematic view of FIG. 1 which removes the optical assembly.
Figure 7:
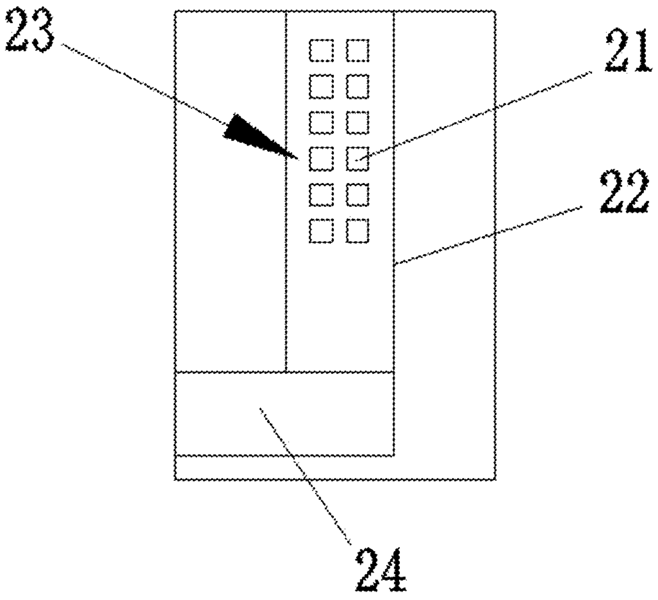
FIG. 7 is an enlarged view of part C in FIG. 6.

Please refer to FIGS. 6 and 7. In the embodiment, the light source 2 may be directly fixed on the baseplate 11 of the seat 1. In detail, the light source 2 includes LED chips and a circuit board 22. The LED chips 21 are fixed on the circuit board 22. The light source 2 is directly fixed to the baseplate 11 of the seat 1 through the circuit board 22. In some embodiments, the light source 2 is directly fixed to the baseplate 11 of the seat 1 by means of bonding. In some embodiments, the light source 2 may be clamped on the baseplate 11 of the seat 1 through the circuit board 22. In some embodiments, the light source 2 may be fixed to the baseplate 11 of the seat 1 by soldering. In the above embodiments, the light source 2 and the baseplate 11 of the base 1 form a heat conduction path to make the heat from the LED chips 21 which are working rapidly conducted to the seat 1 and dissipated by the seat 1 to improve the cooling efficiency. Please refer to FIG. 7. In some embodiments, the LED chips 21 on the circuit 22 are arranged in two rows. Please refer to FIGS. 13 and 15. In some embodiments, the LED chips 21 on the circuit 22 are arranged in one row.

Figure 12:
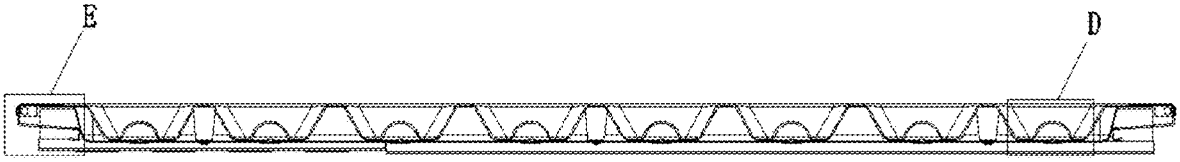
FIG. 12 is a cross-sectional schematic view of an embodiment of the LED lighting device of the invention.
Figure 13:
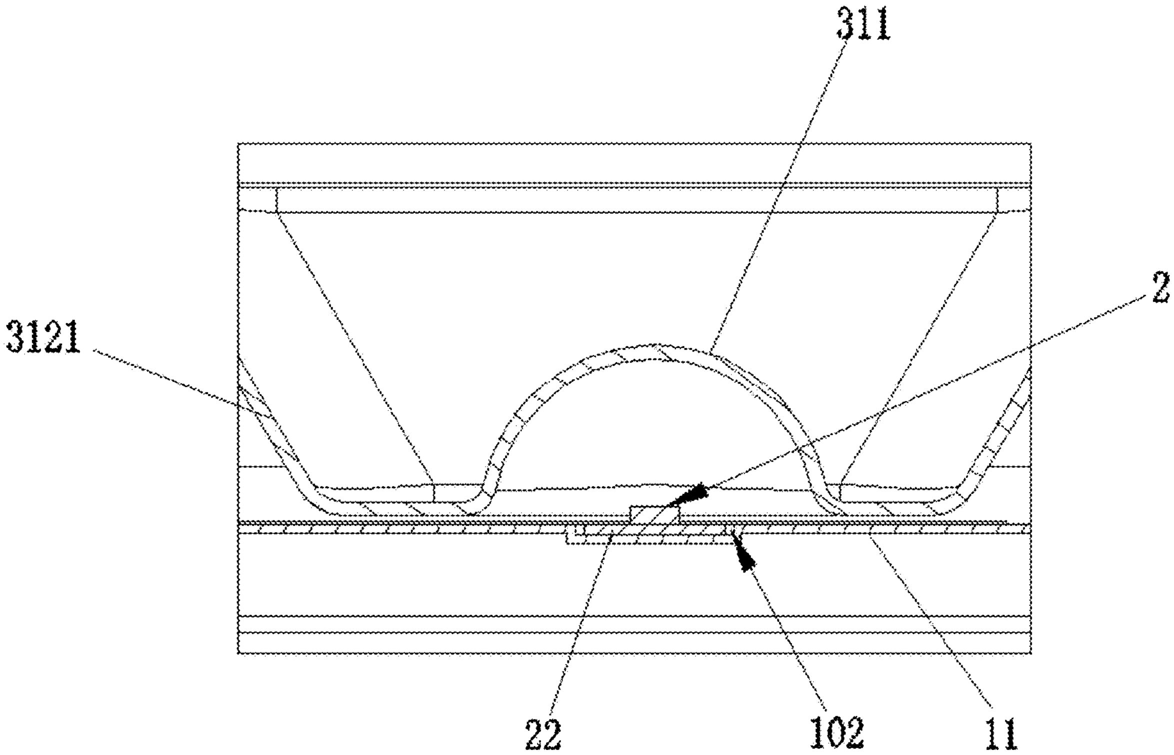
FIG. 13 is an enlarged view of part D in FIG. 12.
Figure 15:
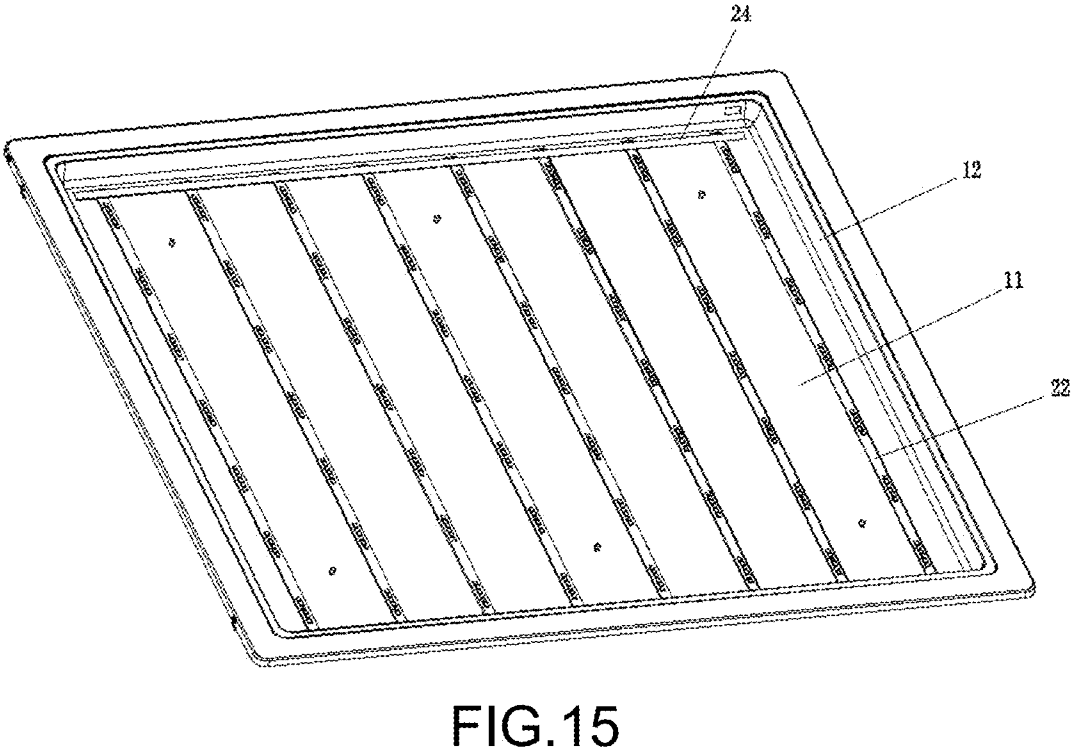
FIG. 15 is a perspective schematic view of an embodiment of the LED lighting device of the invention which removes the optical assembly.

Please refer to FIGS. 12, 13 and 15. In some embodiments, the seat 1 may be provided with a positioning unit 102 for positioning the light source 2. The positioning unit 102 includes a strip-shaped trench formed on the baseplate 11. A part or the whole of the circuit board 22 of the light source 2 is received in the trench to fix the circuit board 22 at a predetermined position on the baseplate 11. In addition, the trench formed on the baseplate 11 by pressing is equivalent to a reinforced rib disposed on the baseplate 11 to increase the structural strength of flexural resistance of the baseplate 11. In the embodiment, a thickness of the circuit board 22 is approximately equal to a depth of the trench. An electric connecting unit 24 may be attached on the baseplate 11 and is electrically connected to the circuit board 22 in the trench. The electric connecting unit 24 attached on the baseplate 11 can tightly press the circuit board 22 to prevent the circuit board 22 from loosening. Also, the electric connecting unit 24 may be fixed on the baseplate 11, for example, by an adhesive or screws, to increase the stability and prevent the electric connection between the electric connecting unit 24 and the circuit board 22 from separating to malfunction due to loosening of the electric connecting unit 24.

Please refer to FIGS. 46-53. In some embodiments, in order to enhance the strength of the seat 1, the seat 1 may be further disposed with a reinforcement unit 1001. The reinforce unit 1001 may include some first reinforcement structures 10011 and some second reinforcement structures 10012. The first reinforcement structures 10011 and the second reinforcement structures 10012 may be connected. In some embodiments, the first reinforcement structures 10011 and the second reinforcement structures 10012 may be arranged to be perpendicular or substantially perpendicular to each other. The first reinforcement structures 10011 are disposed to be extended along the length direction of the lighting device. In some embodiments, the first reinforcement structures 10011 projects toward the back of the seat 1 (a side without the light source 2). Identically, the second reinforcement structures 10012 projects toward the back of the seat 1. On the front of the seat 1, the first reinforcement structures 10011 and the second reinforcement structures 10012 are connected. The first reinforcement structures 10011 and the second reinforcement structures 10012 may be integrally formed on the seat 1, such as stretch or press, so as to make the first reinforcement structures 10011 and the second reinforcement structures 10012 project toward the back of the seat 1. Also, the thickness of each of the first reinforcement structures 10011 and the second reinforcement structures 10012 is substantially the same as the thickness of the rest of the seat 1. In other words, under the condition of being not disposed with additional material on the seat 1, the first reinforcement structures 10011 and the second reinforcement structures 10012 can improve the overall structural strength of the seat 1.

Figure 53:
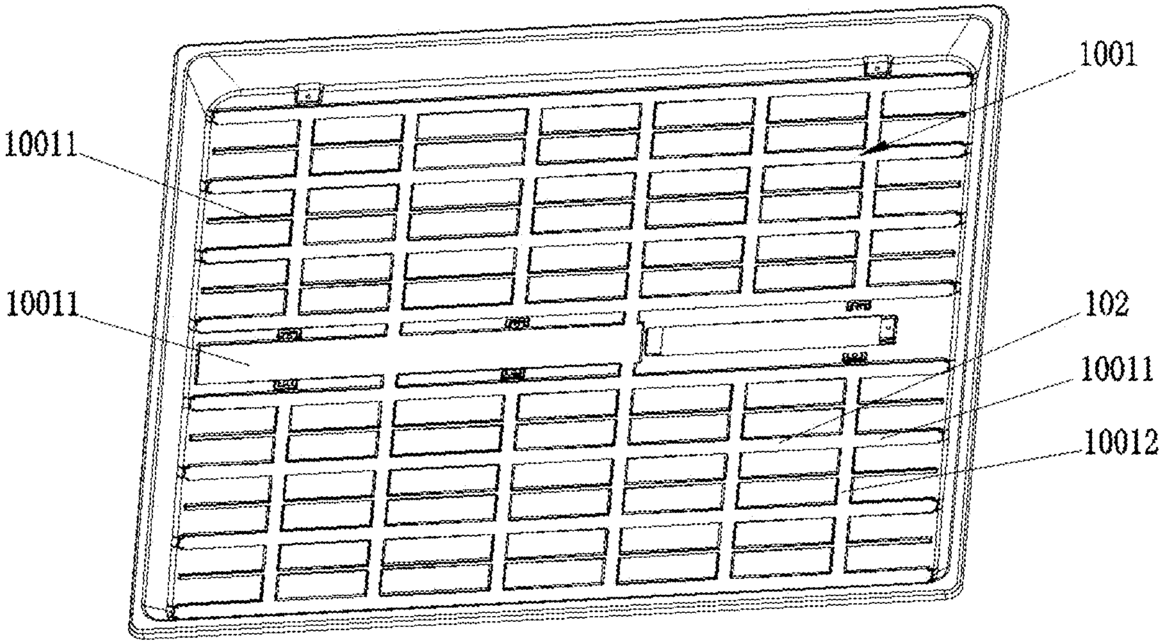
FIG. 53 is a perspective structural schematic view of the baseplate in some embodiments.
Figure 54:
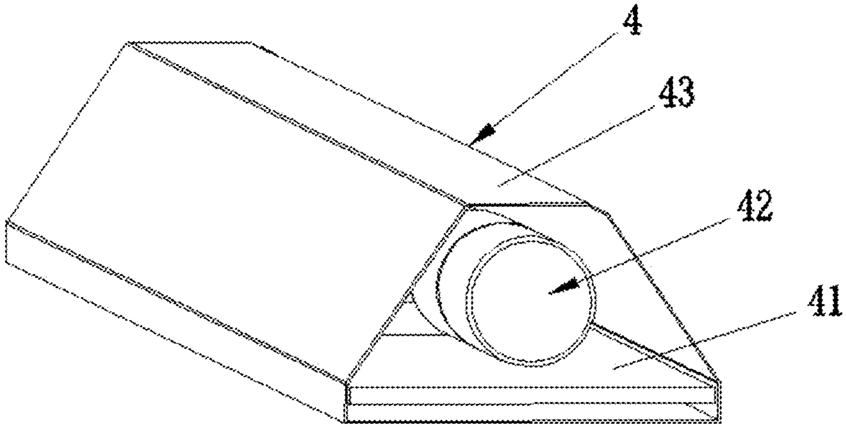
FIG. 54 is a perspective structural schematic view of the electric power source in some embodiments.
Figure 55:
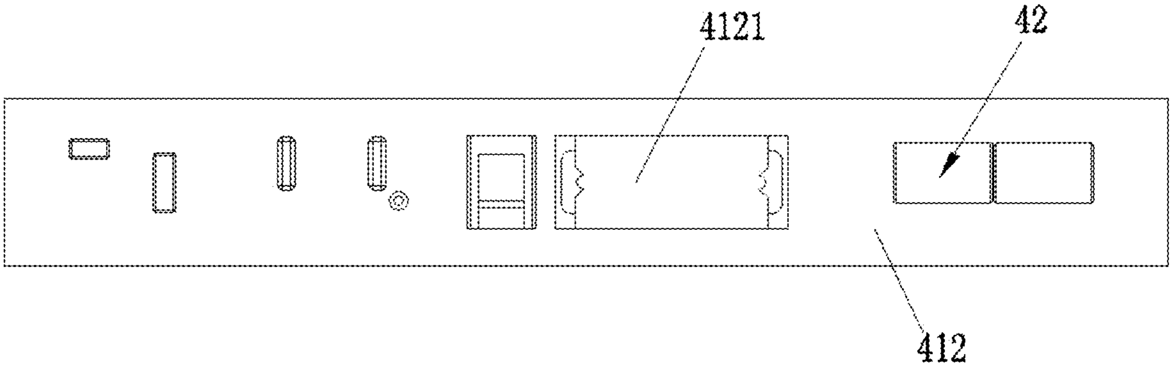
FIG. 55 is a schematic view of matching of the power source circuit board and the electronic components.
Figure 56:
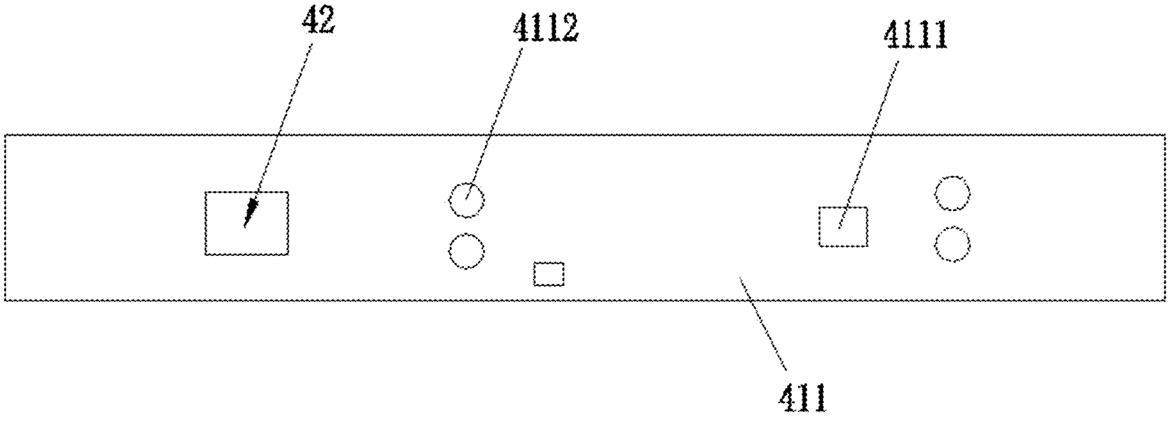
FIG. 56 is a rear view of FIG. 55.
Figure 57:
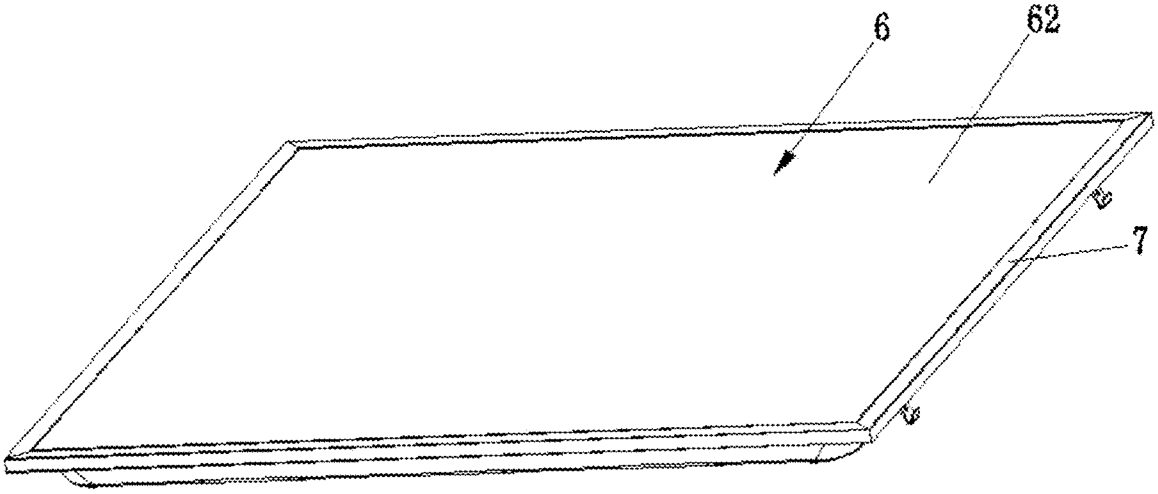
FIG. 57 is a perspective structural schematic view of the LED lighting device in some embodiments.
Figure 58:
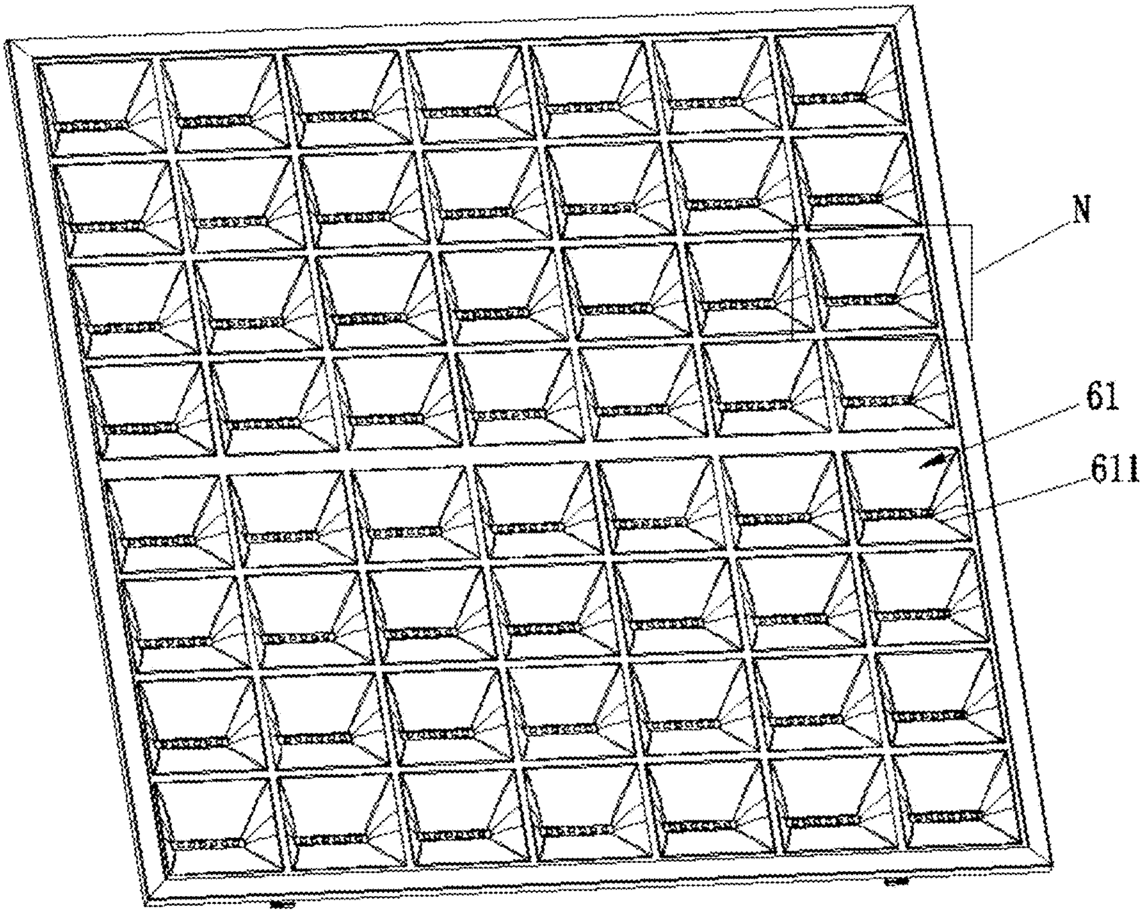
FIG. 58 is a perspective structural schematic view of FIG. 57 without the second optical element.
Figure 59:
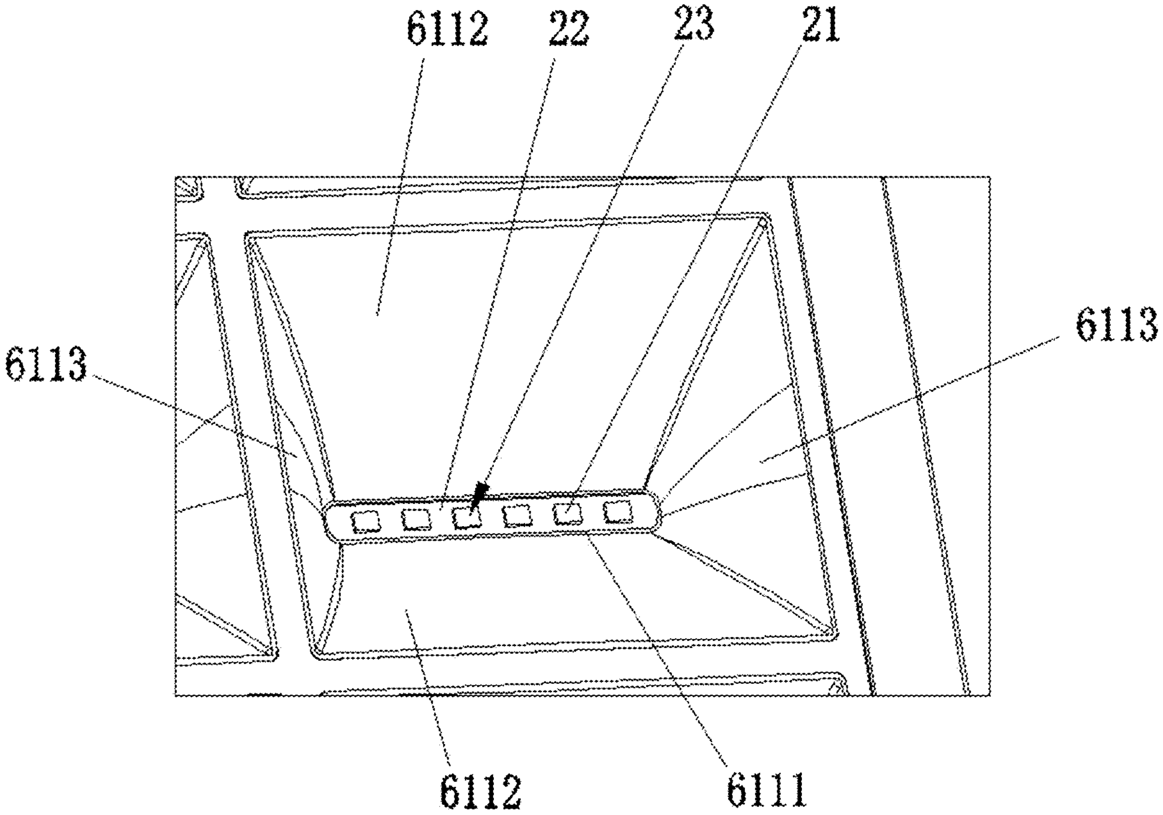
FIG. 59 is an enlarged view of part N in FIG. 58.
Figure 60:
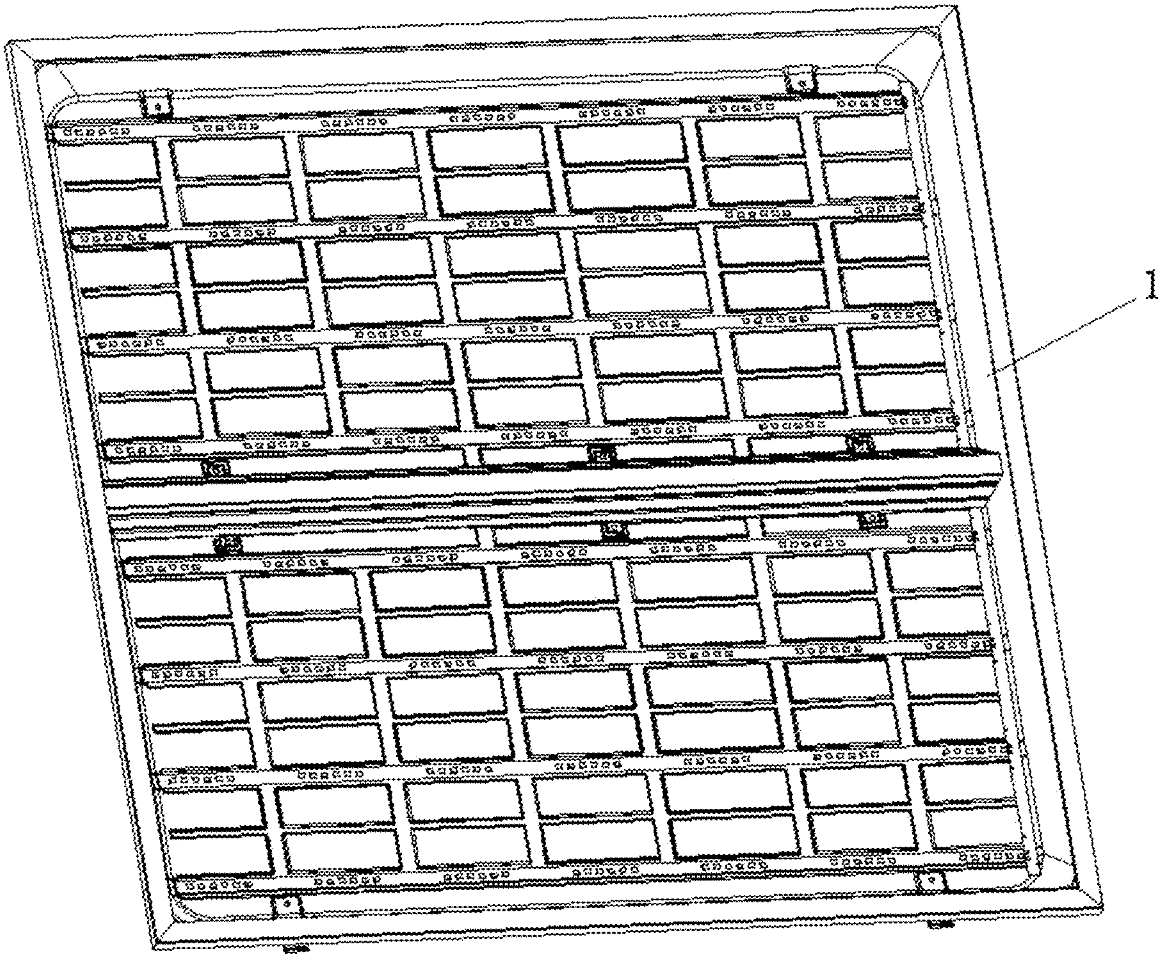
FIG. 60 is a perspective structural schematic view of FIG. 57 without the optical member.

Please refer to FIG. 53. A part of the first reinforcement structures 10011 form the positioning unit 102 for installing the circuit board 22 of the light source 2. The part of the first reinforcement structures 10011 has a first width. One of the first reinforcement structures 10011 has an area used for installing the electric power source 4 and this first reinforcement structures 10011 has a second width. Because the first reinforcement structures 10011 appear to be a dented shape on the front of the seat 1, the size of the electric power source 4 projecting from a surface of the seat 1 can be reduced when the electric power source 4 is disposed on the first reinforcement structures 10011, so as to decrease the overall thickness of the LED lighting device. The rest of the first reinforcement structures 10011 have a third width. The third width is less than the first width in size, and the first width is less than the second width in size. The third width is greater than 2.5 mm.

Please refer to FIG. 53. Some of the second reinforcement structures 10012 adopt the same or substantially the same width.

Please refer to FIG. 53. A distance between adjacent two of the first reinforcement structures 10011 is between 10 mm and 30 mm.

Figure 2:
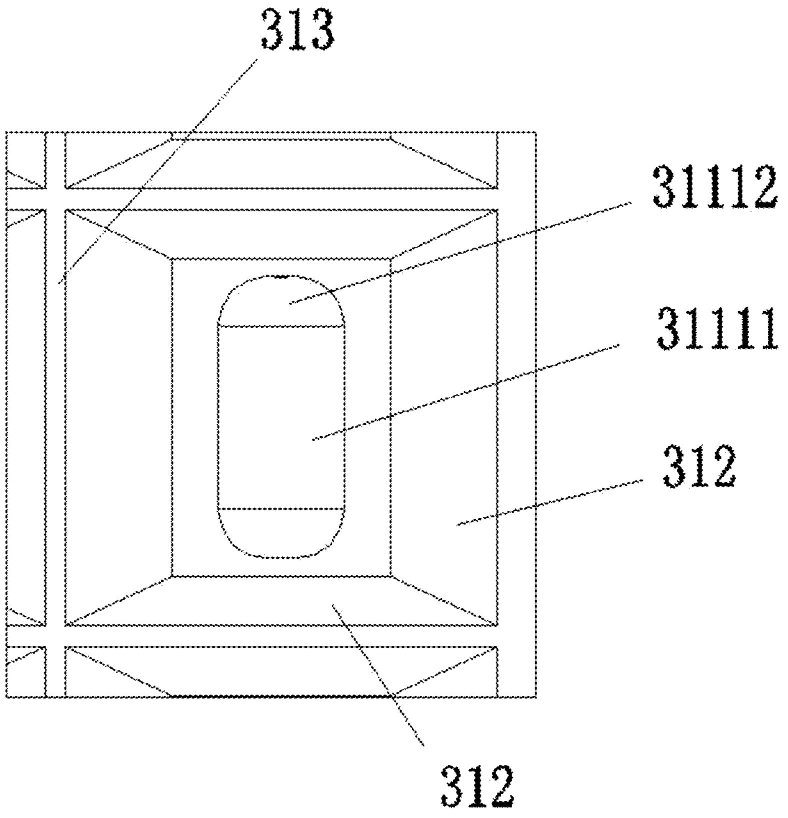
FIG. 2 is an enlarged view of part A in FIG. 1.
Figure 3:
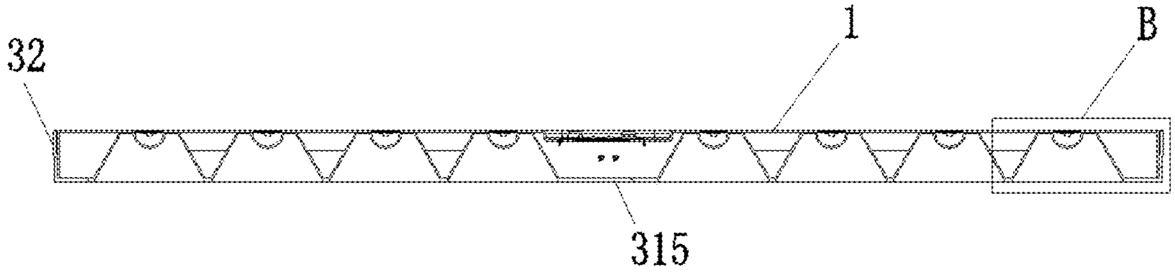
FIG. 3 is a cross-sectional view of an embodiment of the LED lighting device of the invention.

Please refer to FIGS. 1 to 3. In the embodiment, the optical assembly 3 includes an optical unit 31 and an installing unit 32. The installing unit 32 corresponds to the seat 1. In detail, the installing unit 32 connects with the sidewall 12 of the seat 1. The installing unit 32 may be disposed inside or outside the sidewall 12. In the embodiment, the installing unit 32 is disposed outside the sidewall 12 to make the optical assembly 3 completely cover a light-emitting side of the LED lighting device on the seat 1. When the LED lighting device is installed on the ceiling, the seat 1 is not exposed, so a user cannot see the seat 1. The optical unit 31 is only one in number.

Figure 10:
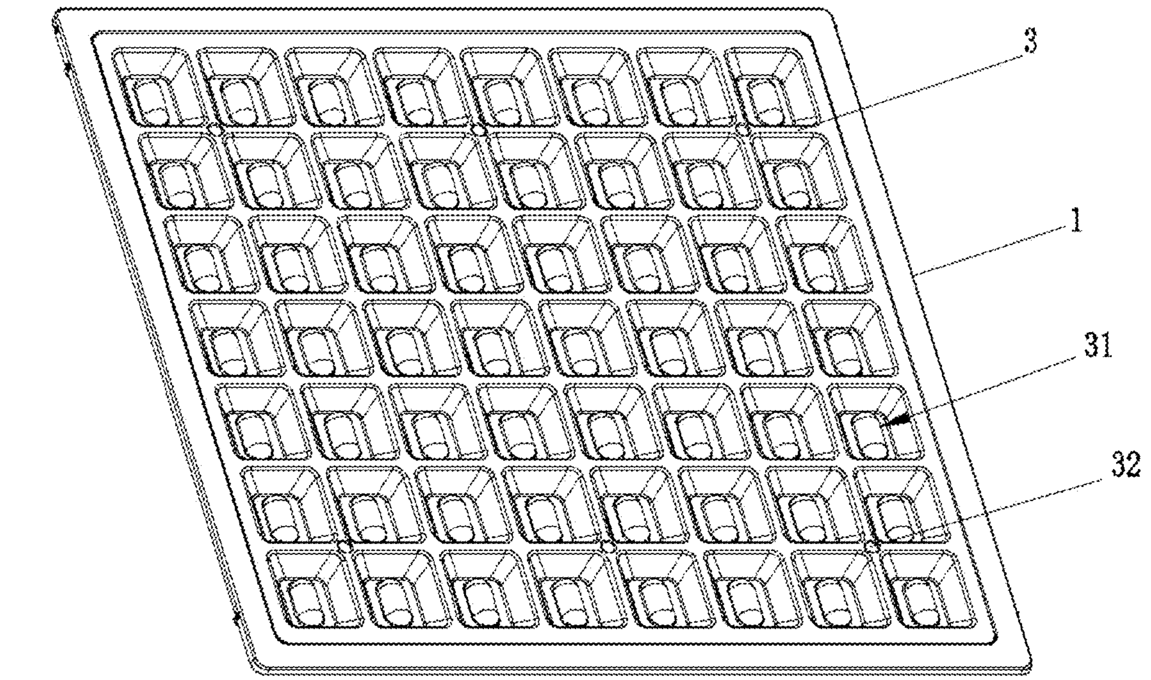
FIG. 10 is a structural schematic view of an embodiment of the LED lighting device of the invention.
Figure 11:
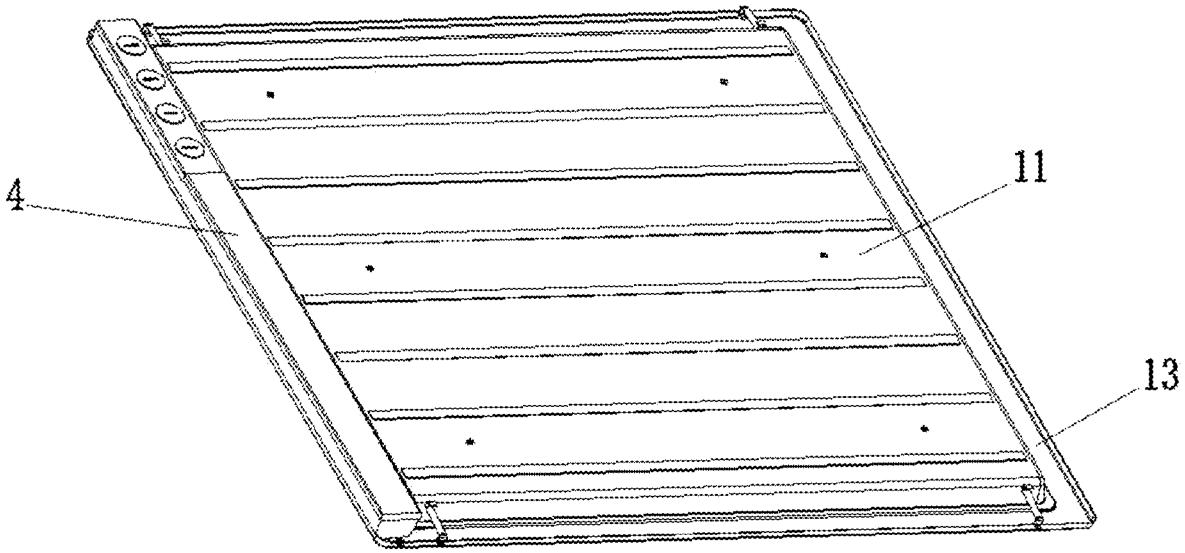
FIG. 11 is another structural schematic view of an embodiment of the LED lighting device of the invention.
Figure 16:
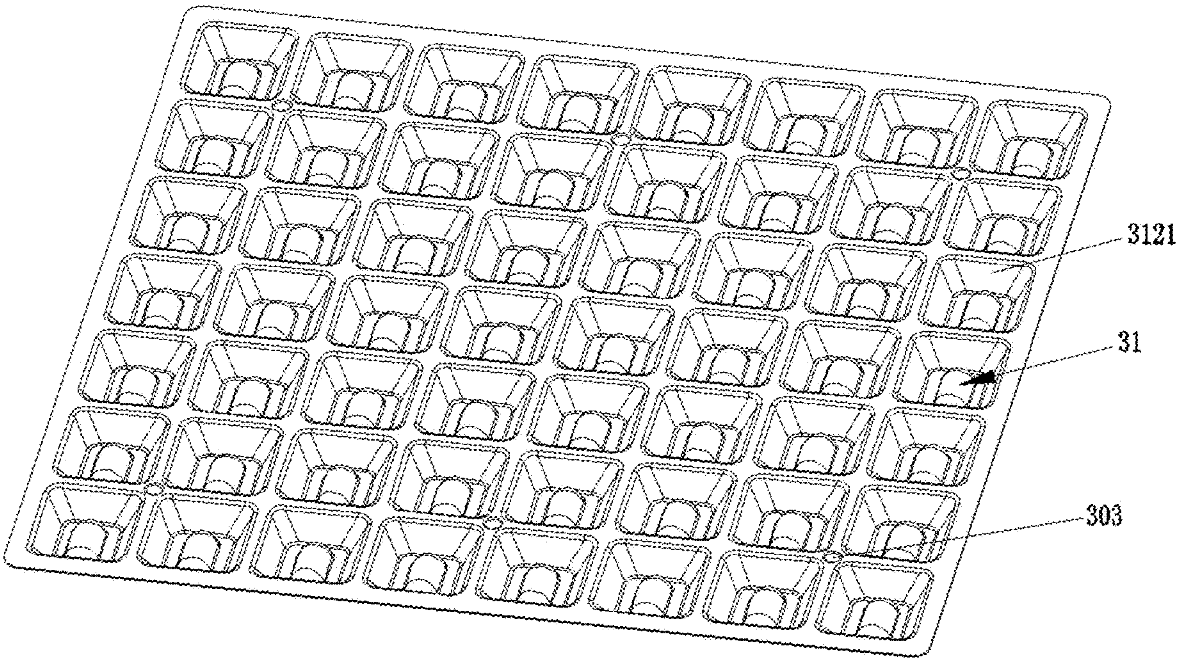
FIG. 16 is a perspective schematic view of an embodiment of the optical assembly of the LED lighting device of the invention.
Figure 17:
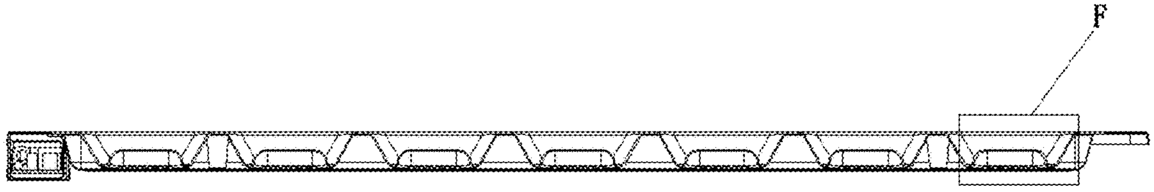
FIG. 17 is a cross-sectional schematic view of an embodiment of the LED lighting device of the invention.
Figure 18:
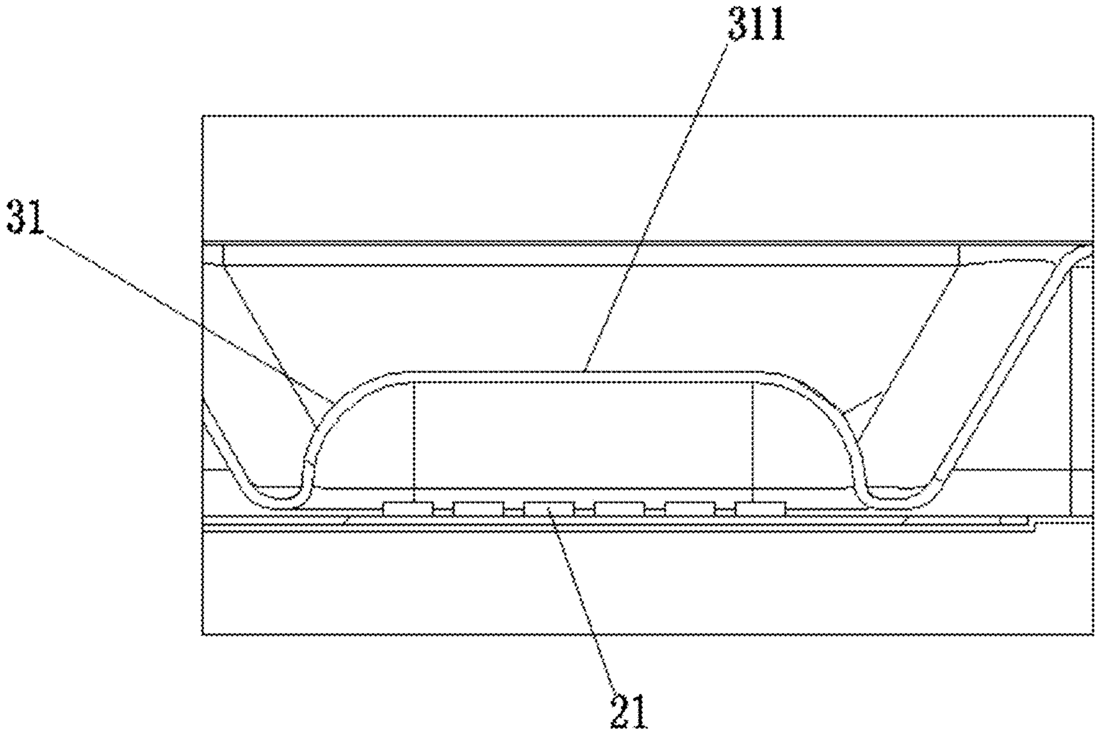
FIG. 18 is an enlarged view of part F in FIG. 17.
Figure 19:
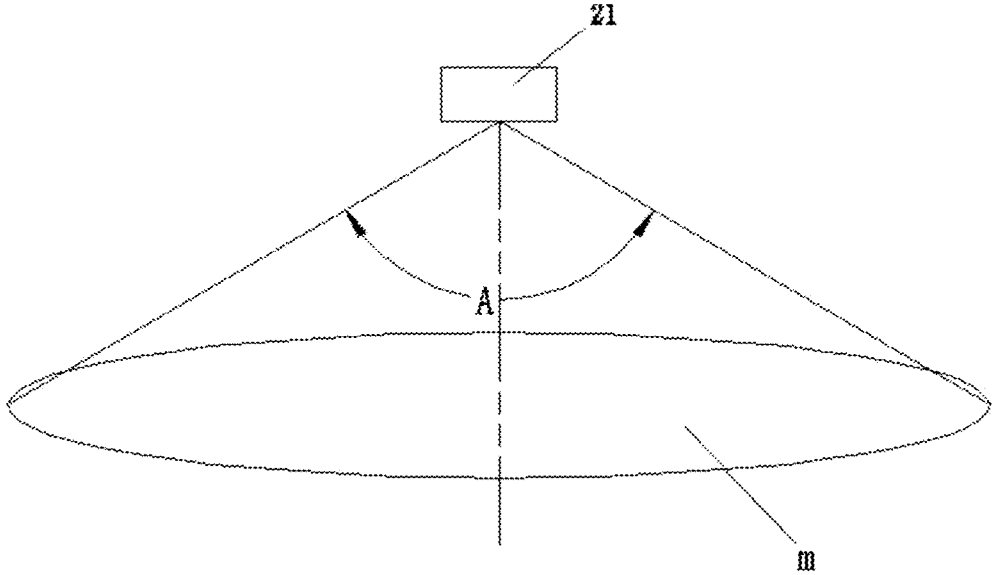
FIG. 19 is a schematic view of light emitting of the LED chip.

Please refer to FIGS. 10 and 16. In one embodiment, the installing unit 32 includes an aperture 303 formed on the optical assembly 3. Correspondingly, the seat 1 is also formed with an aperture corresponding to the aperture 303. Thus, the optical assembly 3 is fixed to the seat 1 by inserting a rivet into the corresponding apertures of the optical assembly 3 and the seat 1.

Please refer to FIGS. 21 to 24. In one embodiment, the installing unit is disposed on a periphery of the optical assembly 3 and includes a wall portion 321. The wall portion 321 surrounds the sidewall 12 of the seat 1 and outside the sidewall 12. The wall portion 321 is disposed with a bending portion 3211. The bending portion 3211 sheathes or abuts against an end of the sidewall 12 in a thickness direction of the LED lighting device, so the bending portion 3211 and the optical assembly 3 can clamp the sidewall by themselves to fix the optical assembly 3 on the seat 1. Also, by such a fixing manner, the optical assembly 3 and the seat 1 can be fixed without any fastener (such as screws or rivets). This can prevent a fastener disposed to a light-emitting surface of the optical assembly 3 from affecting light emitting of the optical assembly 3 (for example, the light-emitting surface of the optical assembly 3 forms a local dark spot because of arranging a fastener on the light-emitting surface of the optical assembly 3) and can guarantee integrity and beauty of appearance of the optical assembly 3.

The optical assembly 3 is made of plastic. When the optical assembly 3 is placed outside the seat 1, the wall portion 321 of the optical assembly 3 may be deformed by hot pressing to form the bending portion 3211.

In other embodiments, when the optical assembly 3 is placed outside the seat 1, the wall portion 321 and the sidewall 12 of the seat 1 may also be fixed by clips or fasteners.

The wall portion 321 of the optical assembly 3 disposed outside and fixed to the sidewall 12 can simplify the structure. This can reduce a bezel of the lamp, improve beauty and the effect of light emitting and reduce dark areas resulting from the bezel.

The installing unit 8 may also be an independent component. As shown in FIGS. 69-72, the installing unit 8 includes a support element 81 surrounding the periphery of the optical member 9 and/or the seat 1 to provide support to the optical member 9 and the seat 1.

The support element 81 includes a first wall 811. The first wall 811 is attached on a surface of the optical member 9 in the thickness direction of the LED lighting device. A wall 901 of the edge of the optical member 9 is clamped between the support element 81 and the end wall 121 which is extended outwardly from the side wall 12 of the seat 1.

The support element 81 may further include a second wall 812. The second wall 812 has a stopping portion 8121. The end wall 121 has a compression element 1211. The compression element 1211 is embedded into the space formed between the stopping portion 8121 and the first wall 811 to make the wall 901 of the edge of the optical member 9 tightly compressed between the end wall 121 and the first wall 811 to finish the fixing of the three pieces. In other words, when the seat 1 matches with the support element 81, the compression element 1211 is embedded between the first wall 81 and the stopping portion 8121 in an interference manner to finish the fixing. When the compression element 1211 is compressed between the stopping portion 8121 and the first wall 811, the end wall 121 tightly presses the wall 901 of the edge of the optical member 9 so as to fix the seat 1, the optical unit 31 and the support element 81 to be one piece.

The end wall 121 has a first portion 1212 attached on the wall 901 of the edge of the optical member 9 and a second portion 1213 not attached on the wall 901 of the edge of the optical member 9. The distance between the second portion 1213 and the first wall 811 is less than the distance between the first portion 1212 and the first wall 811. In other words, because the wall 901 of the edge of the optical member 9 is not disposed between the second portion 1213 and the first wall 811, there will be a certain gap between the second portion 1213 and the first wall 811. As a result, when the compression element 1211 is embedded between the stopping portion 8121 and the first wall 811 by an external force, the second portion 1213 connected with the compression element 1211 could be deformed toward the first wall 811 to allow the compression element 1211 to be embedded between the stopping portion 8121 and the first wall 811. The setting of the second portion 1213 makes the deformation occurring at the compression element 1211 and the second portion 1213 when the compression element 1211 being embedded between the stopping portion 8121 and the first wall 811 to prevent the compression element 1211 from being damaged or being unable to be embedded between the stopping portion 8121 and the first wall 811 because the deformation is concentrated at the compression element 1211.

An end of the compression element 1211 abuts against the stopping portion 8121. A gap is kept between at least part of the main portion of the compression element 1211 and the second wall 812 so as to make the compression element 1211 have sufficient elastic deformation to keep a sufficient force to the stopping portion 8121 to prevent the compression element 1211 from escaping between the stopping portion 8121 and the first wall 811.

The distance between an end of the compression element 1211 and the second wall 812 is the shortest, and the distance between the compression element 1211 and the second wall 812 gradually increases in the direction from the compression element 1211 to the end wall 121.

The support element 81 may be formed by a metal sheet, for example, a sheet of material is bent. The support element 81 may be formed by extrusion molding.

The support element 81 is configured into multiple in number and adjacent support elements 81 may be fixed by welding.

In the thickness direction of the LED lighting device, the support element 81 does not exceed the space defined by the optical member 9. As a result, the support element 81 will not additionally occupy the thickness size of the LED lighting device. When the LED lighting device is installed on a horizontal plane and emits light downward, a lower surface of the first wall 811 of the support element 81 is flush or substantially flush with a lower surface of the optical member 9.

Please refer to FIGS. 1 to 4. The optical unit 31 of the embodiment includes multiple first optical members 311 (light-permeable parts). The light from the light source 2 can penetrate the first optical members 311. The light source 2 includes multiple LED arrays 23. Each LED array 23 includes at least one LED chip 21. In the embodiment, each LED array 23 includes multiple LED chips 21. The LED arrays 23 correspond to the first optical members 311. In other words, each LED array 23 is arranged to correspond to one of the first optical members 311, they both are same in number. In other embodiments, the first optical members 311 may be greater than the LED arrays 23 in number.

In the embodiment, the LED chip 21 of the LED array 23 only corresponds to the first optical member 311. In other words, the LED chip of the LED array 23 is completely cloaked by the first optical member 311. At least part of the light from the LED chip 21 of the LED array 23 is emitted from the first optical member 311. In detail, in the embodiment, the first optical member 311 has a light-emitting surface 3111. There is a distance between the light-emitting surface 3111 and the LED chip 21 of the LED array 23. The light from the LED chip 21 is emitted from the light-emitting surface 3111.

Please refer to FIGS. 6 and 7. In the embodiment, the LED chips 21 of the LED array 23 are arranged along a first direction. The first optical member 311 (or the light-emitting surface 3111) is arranged along the first direction.

Please refer to FIGS. 1 to 4. In the embodiment, the light-emitting surface 3111 has a main portion 31111 arranged in the first direction and two end portions 31112 separately located at two ends of the main portion 31111 along the first direction. A cross-section of the main portion 31111 (a cross-section on the width direction of the light-emitting surface 3111) is of an arcuate shape, and each end portion 31112 is an arcuate surface, so that the light-emitting surface 3111 has a better effect of light emitting. In addition, in comparison with a flat surface, when the light from the LED chip 21 is emitted to an arcuate surface, reflection will decrease, so the light-emitting efficiency can be enhanced to improve the light efficiency. Also, the light-emitting surface 3111 is more adjacent to the LED chip 21 than the second optical member 312. When the LED chip 21 is working, the light-emitting surface 3111 has a higher temperature than the second optical member 312. Thus, the light-emitting surface 3111 adopting an arcuate shape can improve the structural strength and have better property of anti-deformation when heated. In other embodiments, the light-emitting surface 3111 may also be shaped into a spherical surface or a flat surface.

In one embodiment, each first optical member 311 is configured to possess an effect of light diffusion to increase a light-emitting angle of the light source 2 and prevent light from concentrating to cause visual uncomfortableness. In one embodiment, each first optical member 311 possesses an effect of light diffusion resulting from its own material property, for example, plastic or acrylic. In one embodiment, each first optical member 311 is coated with a diffusion coating or disposed with a diffusion film (not shown) to make it have an effect of light diffusion.

Please refer to FIGS. 1 and 2. In one embodiment, the optical unit 31 further has multiple second optical members 312 (anti-glare parts) corresponding to the first optical members 311. The second optical members are configured to reflect at least part of light emitted by the first optical members 311 and at least part of light emitted by the first optical members 311 penetrates the second optical members 312. At least part of light penetrating the second optical member 312 may be emitted from an adjacent one of the second optical members 312 or at least part of light penetrating the second optical member 312 is emitted from the second optical member 312 after reflection to prevent from forming a dark area at the second optical member 312 so as to improve beauty of the LED lighting device which is illuminated. In addition, the second optical member 312 reflecting at least part of light emitted from the first optical member 311 generates a certain effect of light blocking and glare reducing.

Figure 4:
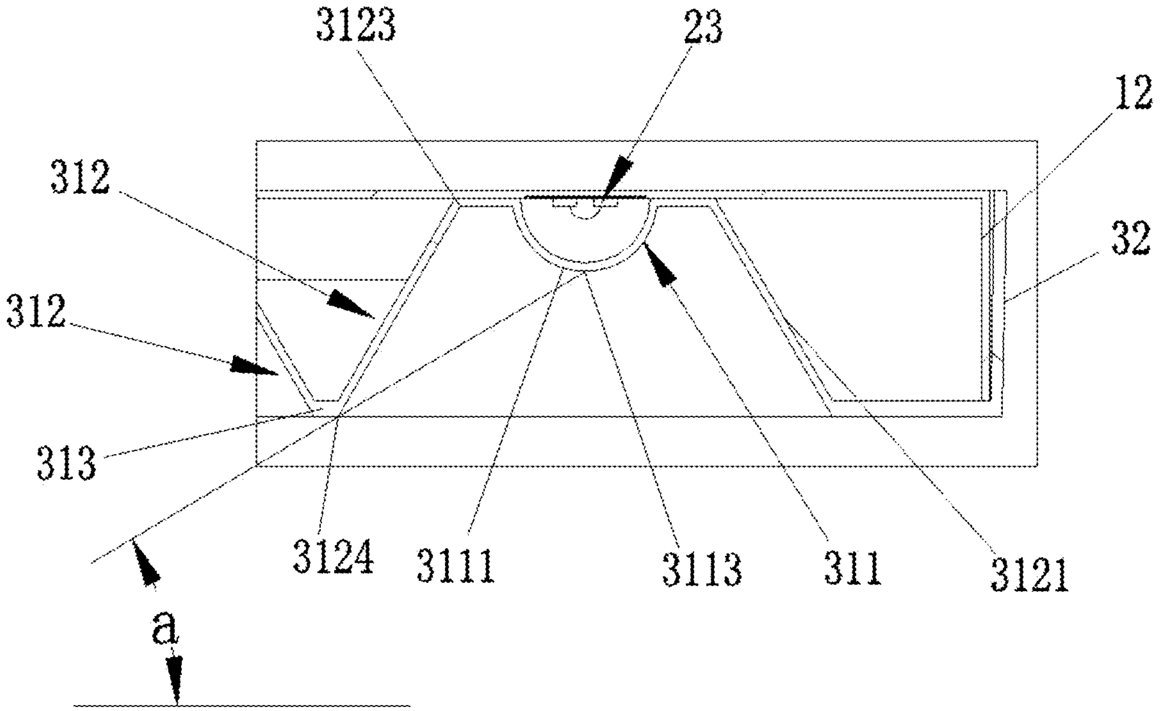
FIG. 4 is an enlarged view of part B in FIG. 3.

Please refer to FIG. 4. On a cross-section in the width direction of the first optical member 311, the first optical member 311 has a midpoint 3113 at the bottom, where the bottom means the bottom position of the first optical member 311 when the LED lighting device is normally installed on a horizontal plane and emits light downward. As shown in the figure, the midpoint 3113 means the midpoint on a cross-section in the width direction of the first optical member 311. The second optical member 312 has a near end 3123 and a far end 3124 on a cross-section in the height direction of the LED lighting device. The near end 3123 is more adjacent to the corresponding light source 2 than the far end 3124. The far end 3124 is the bottommost end of the second optical member 312 in the height direction of the LED lighting device. The angle a between the line through the midpoint 3113 and the far end 3124 and a lower-end surface of the LED lighting device (the plane on which the second connecting wall 314 is located) is between 10 degrees and 45 degrees. Further, the angle a between the line through the midpoint 3113 and the far end 3124 and a lower-end surface of the LED lighting device (the plane on which the second connecting wall 314 is located) is between 25 degrees and 35 degrees. As a result, part of the direct light emission from the first optical member 311 can be shaded to reduce the glare. It is noted that the abovementioned positional relationship, such as the positional relationship between the midpoint, the near end and the far end, is based on the cross-sectional view shown in FIG. 4.

In the embodiment, the second optical member 312 includes one or more sets of optical walls 3121. The optical walls 3121 are configured to possess functions of reflection and light-permeability. The optical walls 3121 surround the first optical member 311. In the embodiment, a set of second optical members 312 has four sets of optical walls 3121, the four sets of optical walls 3121 are connected in series, and each optical 3121 is configured to be a plane. In some embodiments, a set of second optical members 312 may have only one set of optical walls 3121, and a cross-section of each optical wall is of an annular shape. The optical wall 3121 may be a slant which is aslant arranged against the baseplate 11. As shown in FIGS. 10 and 16, in one embodiment, a smooth transition is formed between two adjacent optical walls 3121, such as an arcuate transition, to prevent an angle between two adjacent optical walls 3121 from forming a dark area and to make a region between two adjacent optical walls 3121 have a better effect of reflection.

Please refer to FIG. 4. In the embodiment, the optical walls 3121 of two adjacent second optical members 312 are connected through a first connecting wall 313. At least part of light penetrating the second optical member 312 is emitted from the first connecting wall 313 to prevent the first connecting wall 313 from form a dark area. The first connecting wall 313 is greater than the optical wall 3121 in thickness to provide better connective strength. Also, thinned optical wall 3121 makes the optical wall 3121 have less light loss.

Figure 8:
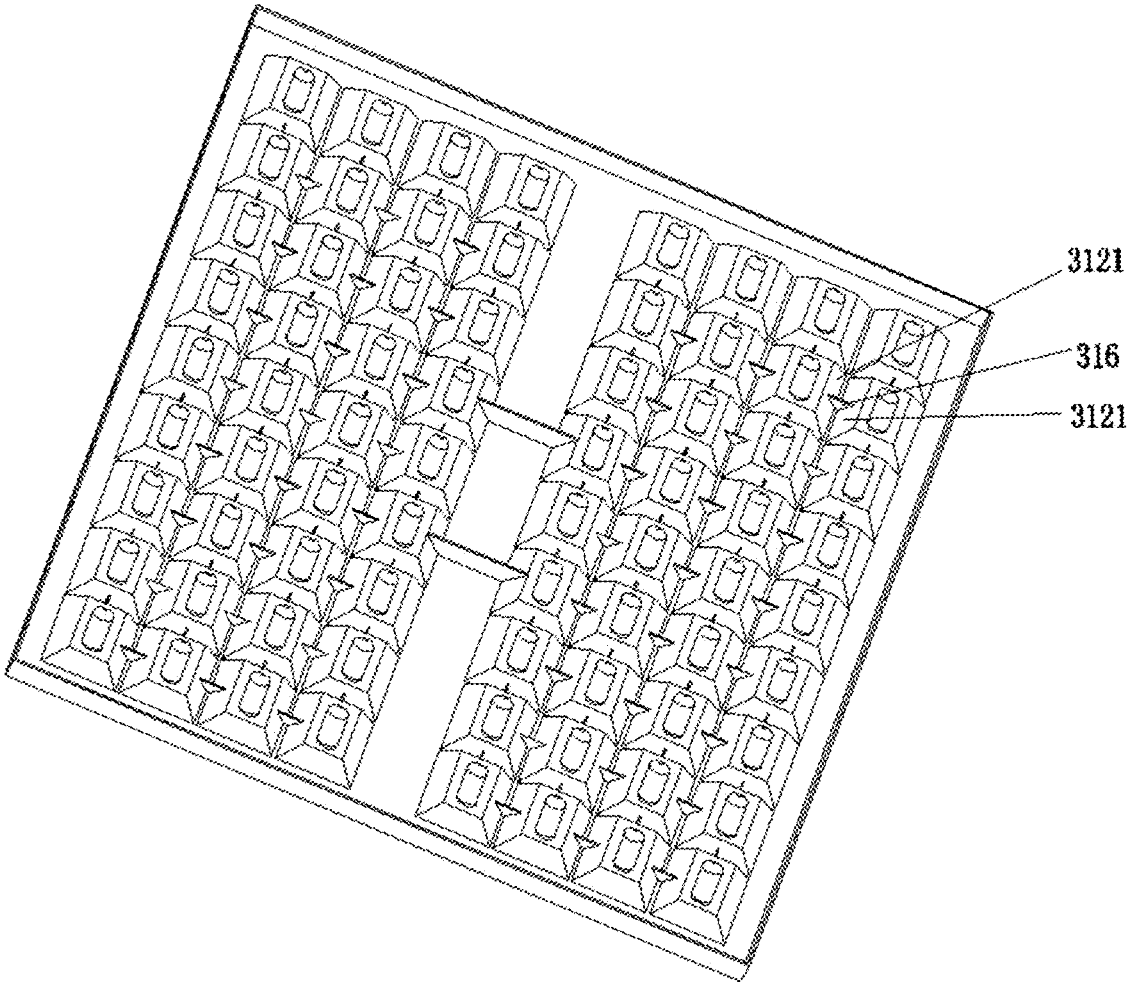
FIG. 8 is a perspective schematic view of the optical assembly.

Please refer to FIGS. 1 and 8. In the embodiment, the second optical member 312 may be disposed with a reinforcement structure 316 to improve the structural strength. In detail, the reinforcement structure 316 is disposed between the optical walls 3121 of adjacent second optical members 312. In other words, the optical walls 3121 between adjacent second optical members 312 are connected through the reinforcement structure 316. In the embodiment, the reinforcement structure 316 is a thin wall structure.

Figure 5:
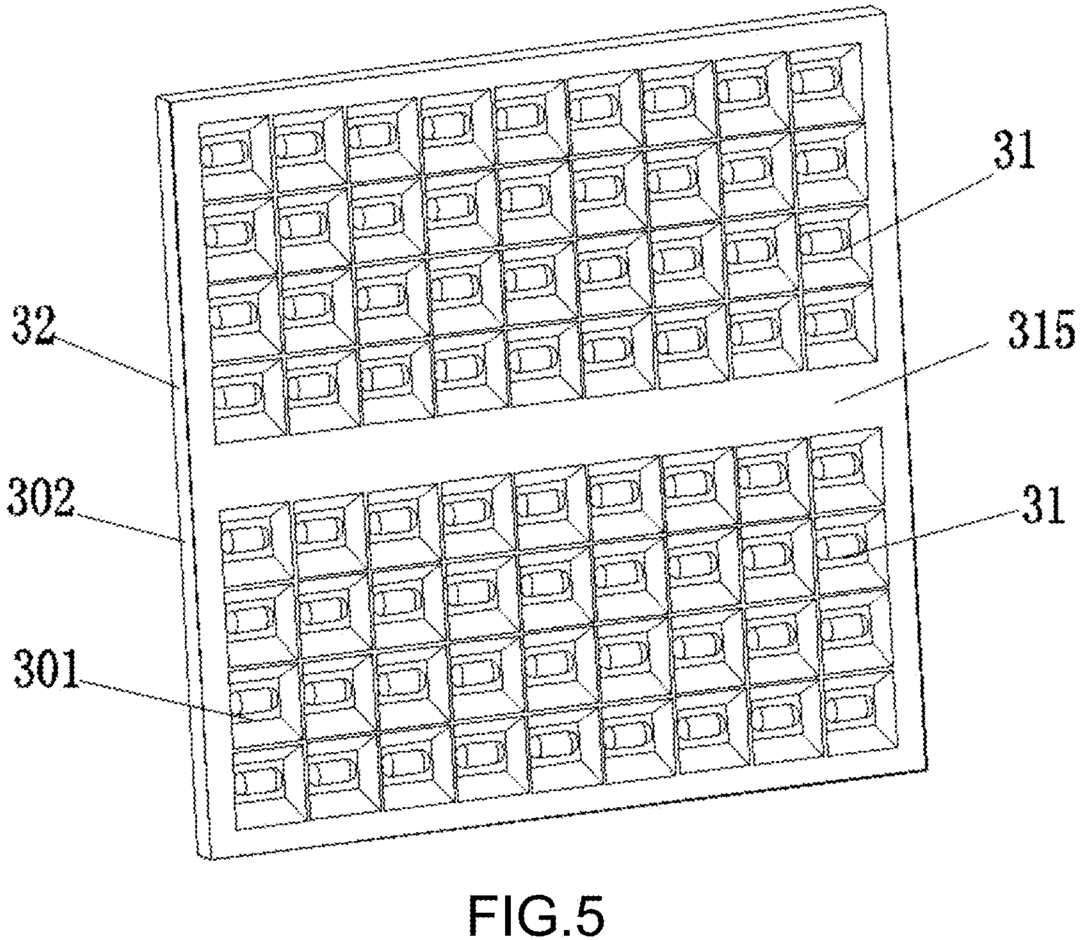
FIG. 5 is a perspective schematic view of an embodiment of the LED lighting device of the invention.

Please refer to FIGS. 1 and 5. In the embodiment, the optical unit 31 further includes a second connecting wall 314. The installing unit 32 and adjacent second optical member 312 are connected by the second connecting wall 314. At least part of light penetrating the second optical member 312 is emitted from the second connecting wall 314 to prevent the second connecting wall 314 from forming a dark area.

Figure 14:
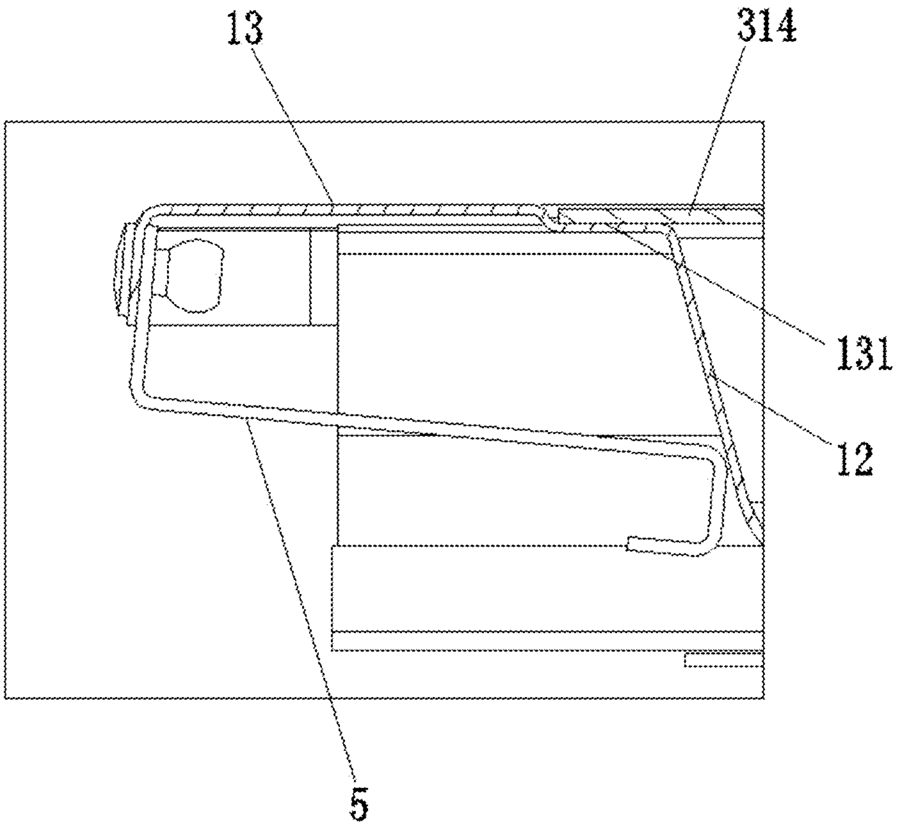
FIG. 14 is an enlarged view of part E in FIG. 12.

Please refer to FIGS. 12 and 14. In some embodiments, the second connecting wall 314 is adjacent to the end wall 13. And, a surface of the second connecting wall 314 is substantially flush with the end wall 13 to improve beauty. In the embodiment, the end wall 13 is disposed with an indent 131. The second connecting wall 314 is placed in the indent 131 to make a surface of the second connecting wall 314 flush or substantially flush with the end wall 13.

In the embodiment, a wall thickness of each of the first optical member 311 and the second optical member 312 is less than a wall thickness of the first connecting wall 313 or the second connecting wall 314. The first optical member 311 is primarily used for light emitting of the light source 2 (too much wall thickness will increase light loss). The second optical member 312 is primarily used for reflection and light permeability (too much wall thickness will increase light loss). Both the first connecting wall 313 and the second connecting wall 314 are primarily used for structural connection which needs a certain strength. Thus, the abovementioned wall thicknesses can satisfy the demands in optics and structure.

In the embodiment, the optical assembly 3 is formed by an integrated structure.

Please refer to FIGS. 1 to 6. In the embodiment, the optical assembly 3 has a first region 301 corresponding to the baseplate 11 of the seat 1 and a second region 302 corresponding to the sidewall 12. The second region 302 is used to connect the sidewall 12. In detail, the second region 302 is disposed with the installing unit 32. In the embodiment, when the LED lighting device is working, the light source 2 is lit, and at least 80% of the first region 301 has light emission to obtain even light emitting. Furthermore, when the LED lighting device is working, the light source 2 is lit, and at least 90% of the first region 301 has light emission to obtain even light emitting. Furthermore, when the LED lighting device is working, the light source 2 is lit, and the entire first region 301 has light emission to obtain even light emitting.

In the embodiment, the first region 301 may include the abovementioned first optical member 311, second optical member 312, first connecting wall 313 and second connecting wall 314.

Please refer to FIGS. 6 and 7. In the embodiment, the circuit board 22 may be multiple, and each circuit board 22 may be disposed with one or more sets of LED arrays 23. The embodiment further includes an electric connecting unit 24. The LED chips 21 on different circuit boards 22 are electrically connected by the electric connecting unit 24. In some embodiments, the electric connecting unit 24 adopts wires. In some embodiments, the electric connecting unit 24 adopts flexible circuit boards and the flexible circuit boards are fixed to the circuit boards 22 by soldering. In detail, the electric connecting unit 24 is affixed to the circuit boards 22 and is connected with the circuit boards 22 by soldering directly to implement electric connection. In some embodiments, the electric connecting unit 24 adopts PCB boards to perform connection.

Please refer to FIG. 5. In the embodiment, the optical unit 31 may be multiple, for example, two or four. Two adjacent optical units 31 are connected through the third connecting wall 315. A receiving space is formed between the third connecting wall 315 and the baseplate 11. The electric power source 4 is disposed in the receiving space. The electric power source 4 is disposed in the LED lighting device, in comparison with the electric power 4 disposed outside the seat 1, the electric power source 4 does not occupy additional height space of the LED lighting device so as to reduce a height of the LED lighting device. In the embodiment, a height of the LED lighting device is less than 35 mm. Further, a height of the LED lighting device is less than 30 mm. Furthermore, a height of the LED lighting device is between 20 mm and 30 mm.

Please refer to FIGS. 46-53. In some embodiments, the difference of the width of the third connecting wall 315 and the width of the first connecting wall 313 does not exceed 15 mm, 12 mm, 10 mm or 8 mm. When the difference of the width of the third connecting wall 315 and the width of the first connecting wall 313 is controlled in the abovementioned range, the overall consistency of the optical member 3 will be better and the visual effect can be improved.

Please refer to FIGS. 46-53. The electric power source 4 is extendedly to be disposed along the length direction of the LED lighting device. And the electric power source 4 may be disposed at the middle area in the width direction of the LED lighting device. Because the electric power source 4 possesses a certain structural strength, it can further enhance the structural strength of the seat 1 when being disposed on the seat 1. The electric power source 4 is located at the position between the corresponding optical walls 3121 of two sets of the second optical members 312.

The electric power source 4 includes a power source circuit board 41 and electronic components 42 disposed on the power source circuit board 41. The power source circuit board 41 may be directly or indirectly attached on the front of the seat 1.

The electric power source 4 may further include a power source box 43 disposed on the front of the seat 1. A receiving space is formed between the power source box 43 and the seat 1 for accommodating the power source circuit board 41 and the electronic components 42.

The electric power source 4 is disposed between two sets of the light sources 2. The outside of the power source box 43 is disposed with a light redirecting unit 431 for redirecting the light emitted from the light source 2 to the power source box 43 to make the light emitted from the LED lighting device, so as to reduce the light absorption of the electric power source 4 and improve the light emitting efficiency. The light redirecting unit 431 is equipped with functions of reflection and/or light diffusion.

In some embodiments, the outer surface of the power source box 43 directly forms the light redirecting unit 431.

In the embodiment, the outside of the power source box 43 is disposed with an independent element to form the light redirecting unit 431. The length of the power source box 43 is configured to account for less than half of the length of the LED lighting device. The length of the light redirecting unit 431 is greater than the length of the power source box 43. Further, an end of the light redirecting unit 431 in the length direction matches with (abuts against) a side of the seat 1 and the other end matches with (abuts against) the other side of the seat 1. Such an arrangement of the light redirecting unit 431 can prevent the electric power source 4 from affecting local light emission of the optical member 3.

Please refer to FIGS. 46-53. An interval is kept between the light redirecting unit 431 and the optical member 3. The interval forms a light channel 1002 with a minimum distance of 2.5 mm. In other words, a distance between any point on the light redirecting unit 431 and the any point on the optical member 3 is greater than or equal to 2.5 mm. Reflection and diffuse reflection of the light in the light channel 1002 will be affected if the interval is too small. The shortest distance between any point on the light redirecting unit 431 and the any point on the optical member 3 is not greater than 12 mm to be advantageous to the control of the overall size of the LED lighting device.

Please refer to FIGS. 46-53. The light channel 1002 includes a first light channel 10021 and a second light channel 10022 communicating therewith. The first light channel 10021 is formed between a lateral side 4311 of the light redirecting unit 431 and the optical wall 3121 of the second optical member 312. The lateral side 4311 of the light redirecting unit 431 is parallel or substantially parallel to the optical wall 3121 of the second optical member 312. The second light channel 10022 is formed between a top surface 4312 of the light redirecting unit 431 and the third connecting wall 313. The top surface 4312 of the light redirecting unit 431 is parallel or substantially parallel to the third connecting wall 313. In the embodiment, the interval between the lateral side 4311 of the light redirecting unit 431 and the optical wall 3121 of the second optical member 312 is less than the interval between the top surface 4312 of the light redirecting unit 431 and the third connecting wall 313 to allow more light to pass the second light channel 10022 and to emit from the third connecting wall 313 so as to reduce the dark area formed by the third connecting wall 313.

The electronic components 42 have length sizes, width sizes and height sizes. Please refer to FIG. 52. The electronic components 42 have at least two different kinds whose length size is greater than the width size. The length direction of the electronic components 42 is extendedly disposed along the length direction of the circuit board 22 to reduce the width required by installing the whole electric power source 4. The two kinds of electronic components 42 may include an electrolytic capacitor and a transformer. The length size of at least part of electronic components 42 (capacitors, ICs or resistors) is greater than the width size, and the length direction of the electronic components 42 is extendedly disposed along the width direction of the circuit board 22, so as to reduce the length required by installing the whole electric power source 4 to be advantageous to the control of the length size of the electric power source 4. The height size of at least part of electronic components 42 (such as transformers, capacitors or resistors) is less than the width size, and the height direction of the electronic components 42 is extendedly disposed along the thickness direction of the circuit board 22, so as to reduce the height of the whole electric power source 4 to reduce the impact on the light emission caused by installing the electric power source 4.

Please refer to FIGS. 52 and 54-56. In some embodiments, the length size of the electric power source 4 accounts for greater than one fifth of the length size of the LED lighting device. In an embodiment, the length size of the electric power source 4 accounts for greater than two fifths of the length size of the LED lighting device. The size of the electric power source 4 described here may be the length of the power source circuit board 41 (the size of the power source circuit board 41 in the length direction of the circuit board 22), may also be the size between the most lateral two of the electronic components 42 on both sides of the circuit board 22 in the length direction (the size includes these two electronic components 42 themselves). As a result, the electric power source 4 can be distributed on a wider area of the seat 1 to match with larger area of the seat 1 to be advantageous to improvement of the cooling performance.

Please refer to FIGS. 52 and 54-56. The power source circuit board 41 has a first side 411 and a second side 412. The first side is a side which is attached on or corresponds to the bottom of the power source box 43. The bottom of the power source box 43 is attached on the seat 1. The second side is the other side of the power source circuit board 41, which is opposite to the first side 411. In the embodiment, both the first side 411 and the second side 412 are disposed with the electronic components 42. The electronic components 42 on the first side 411 include one or more heat generating components 4111 (such as resistors and ICs). The heat from the heat generating components 4111 on the first side 411 when working can be rapidly transferred to the power source box 43 and dissipated by the seat 1. At least one heat generating component 4111 on the first side 411 may be in contact with the bottom of the power source box 43 to form a heat conduction path so as to improve the cooling efficiency. In some embodiments, the distance between any one of the electronic components 42 on the first side 411 and the bottom of the power source box 43 is not greater than 4 mm or 3.5 mm so as to further improve the heat transfer efficiency between the electronic components 42 and the power source box 43.

In some embodiments, the power source box 43 adopts metal material to be advantageous to more rapidly transferring the heat from the heat generating components 4111 to the power source box 43 and then to the seat 1.

Please refer to FIGS. 52 and 54-56. The first side 411 is disposed with a heat conduction material 4112. The heat conduction material 4112 is a material with high thermal conductivity (such as iron, aluminum, copper, tin or their alloy) or has thermal conductivity which is at least greater than the thermal conductivity of the power source circuit board 41. For example, the heat conduction material 4112 adopts tin or thermal conductive glue, and the power source circuit board 41 adopts a non-metallic plate such as a glass plate or epoxy resin plate, the thermal conductivity of the heat conduction material 4112 is greater than the thermal conductivity of the power source circuit board 41. The electronic components 42 on the second side 412 include heat generating elements 4121 (such as transformers, inductors and ICs). The heat generating elements 4121 on the second side 412 and the heat conduction material 4112 form a heat conduction path. In some embodiments, the heat generating elements 4121 on the second side 412 are connected to the heat conduction material 4112 by their conductive pins and form heat conduction paths. The heat conduction material 4112 can transfer heat to the bottom of the power source box 43 through heat radiation or heat conduction.

Please refer to FIGS. 52 and 54-56. In some embodiments, the electronic components 42 on the first side 411 (particularly, the heat generating components 4121) is greater than the electronic components 42 on the second side 412 (particularly, the heat generating elements 4111) in amount. Because the electronic components 42 on the first side 411 are more adjacent to the power source box 43, heat can be more rapidly dissipated to improve the overall cooling efficiency of the electric power source 4.

Please refer to FIGS. 52 and 54-56. In some embodiments, on the second side 412 of the power source circuit board 41, the number of the electronic components 42 arranged per unit length (such as per 10 mm length) is less than 1, 0.9, 0.8 or 0.7. Under the condition of the width of the power source circuit board 41 being limited (if the width increases, the power source box 43 increases correspondingly, the light emission will be affected), the disposing density of the electronic components 42 in the length direction of the power source circuit board 41 can be controlled to be advantageous to the interval control between the electronic components 42 so as to reduce the mutual heat influence between the electronic components 42 (particularly, the heat generating elements). In addition, by the proper arrangement of the heat generating elements, the heat influence can be further reduced. For example, when the same side of the power source circuit board 41 (the first side 411/the second side 412) includes multiple electronic components 42 which generate high heat during work, these electronic components 42 which generate high heat can be disposed on the same side without adjacency, for example, other electronic components 42 (components which generate low heat and are not easy to be affected by heat, such as capacitors) can be disposed therebetween. This manner can further reduce the influence to the lamp because of the high heat of the electronic components 42 during work.

Please refer to FIGS. 10 to 14. In one embodiment, the electric power source 4 may also be disposed on the back of the baseplate 11. At this time, it is unnecessary to provide a receiving space in the optical unit 31, i.e., the third connecting wall 315 is not necessary (as shown in FIGS. 3 and 5). This makes the continuity of the optical unit 31 better and enhances the effect of light emitting and appearance beauty.

In one embodiment, the seat 1 is further disposed with an end wall 13. The end wall 13 is formed on a periphery of the seat 1 and with connecting to the sidewall 12. The end wall 13 and the baseplate 11 are parallel or substantially parallel to each other. The sidewall 12 and the end wall 13 form a receiving space (there is a height difference between the end wall 13 and the baseplate 11, at least part of the electric power source 4 is disposed in the height difference). At least part of the electric power source 4 in a height direction is located in the receiving space to reduce the height space of the LED lighting device occupied by the electric power source 4.

In one embodiment, at least half of the electric power source 4 in a height direction is located in the receiving space. A length of the electric power source 4 accounts for more than 80%, 85%, 90% or 95% of a length of the seat 1. Thus, the electric power source 4 can increase the structural strength of the seat 1 in a length direction.

Please refer to FIGS. 21 to 24. In one embodiment, the electric power source 4 is disposed between the seat 1 and the optical assembly 3. In detail, a surface of the seat 1 is outward (toward the back of the seat 1) formed with a protrusion 103, the protrusion 103 is formed with a recess 104 on a front side of the seat 1, and part or all of the electric power source 4 is located in the recess 104. Further, the seat 1 may be disposed with a cap 105 which cloaks the recess 104 so as to form a receiving space between the recess 104 and the cap 105. The electric power source 4 is located in the receiving space 106. The cap 105 protrusively disposed on a front side of the seat 1. Thus, the receiving space 106 is greater than the recess 104 in volume.

In the above embodiments, the electric power source 4 is not necessary to additionally provide an independent power source box to simplify structure and reduce costs.

Figure 26:
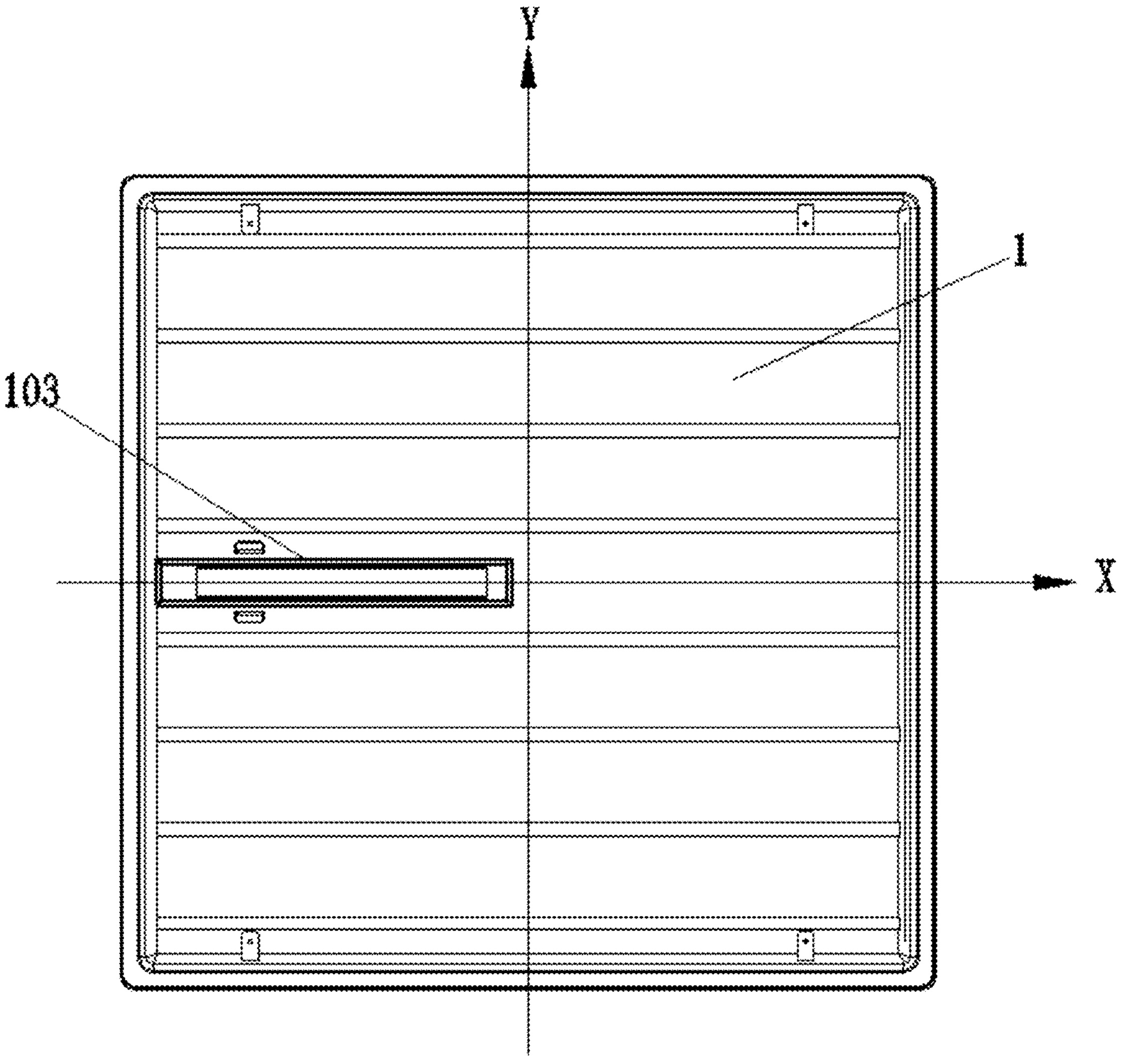
FIGS. 26-28 are front schematic views of some embodiments of the LED lighting device of the invention.
Figure 27:
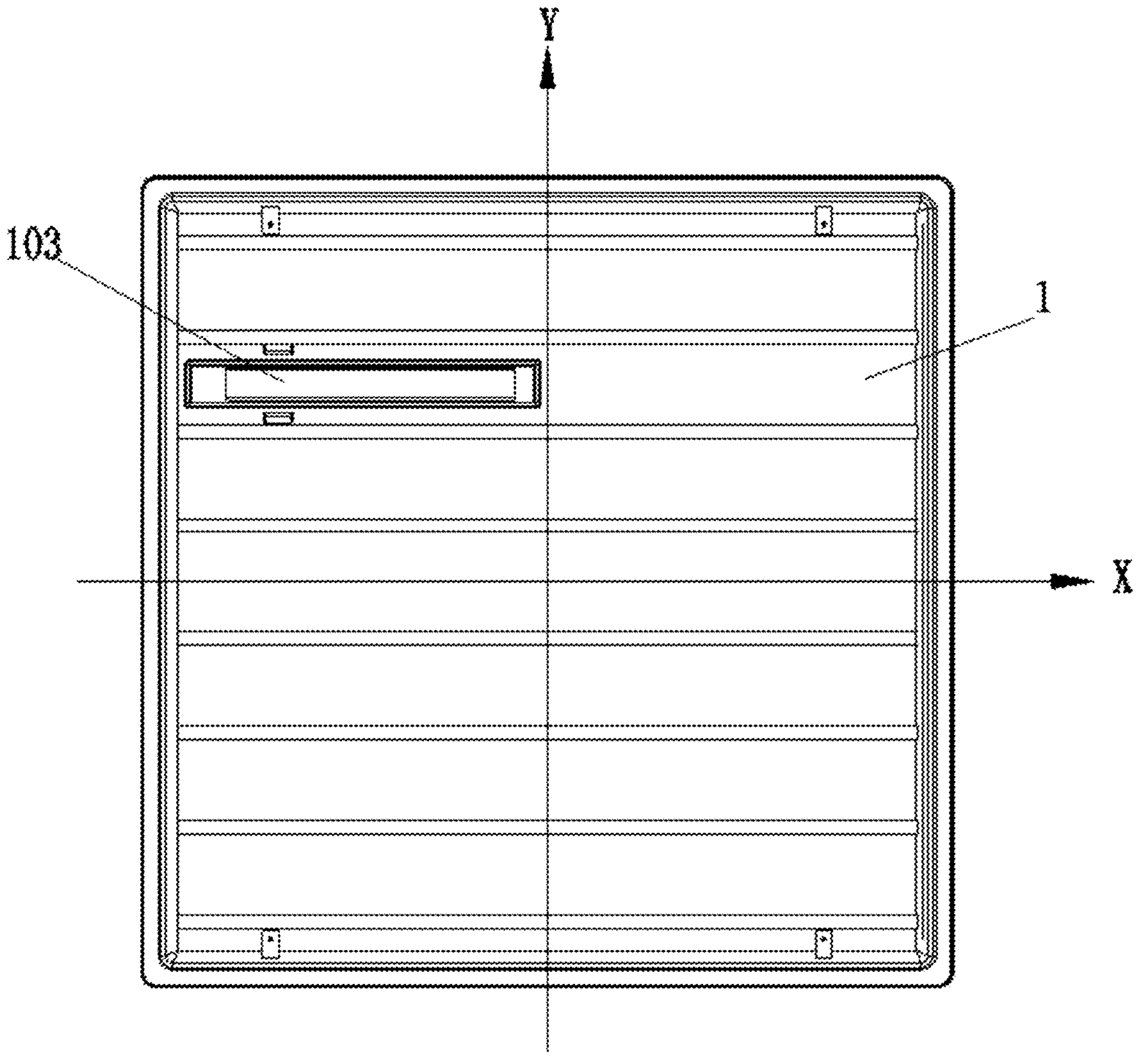

Please refer to FIGS. 26 and 27. In some embodiments, the protrusion 103 is one in number. When two LED lighting devices are stacked in a back-to-back manner, one of the LED lighting devices is rotated with a specific angle (such as 90 degrees, 180 degrees or 270 degrees), the protrusions 103 of the two LED lighting devices are interlaced to make the total height less than 2 times the height of a single LED lighting device. Thus, two or more LED lighting devices are stacked in the above manner, the package size and the transportation costs can be reduced. In the embodiment, the back of the LED lighting device is created with a coordinate system with taking the center of the LED lighting device as the origin, the protrusion 103 is completely located in one quadrant as shown in FIG. 27 or in completely located in two quadrants as shown in FIG. 26.

Figure 28:
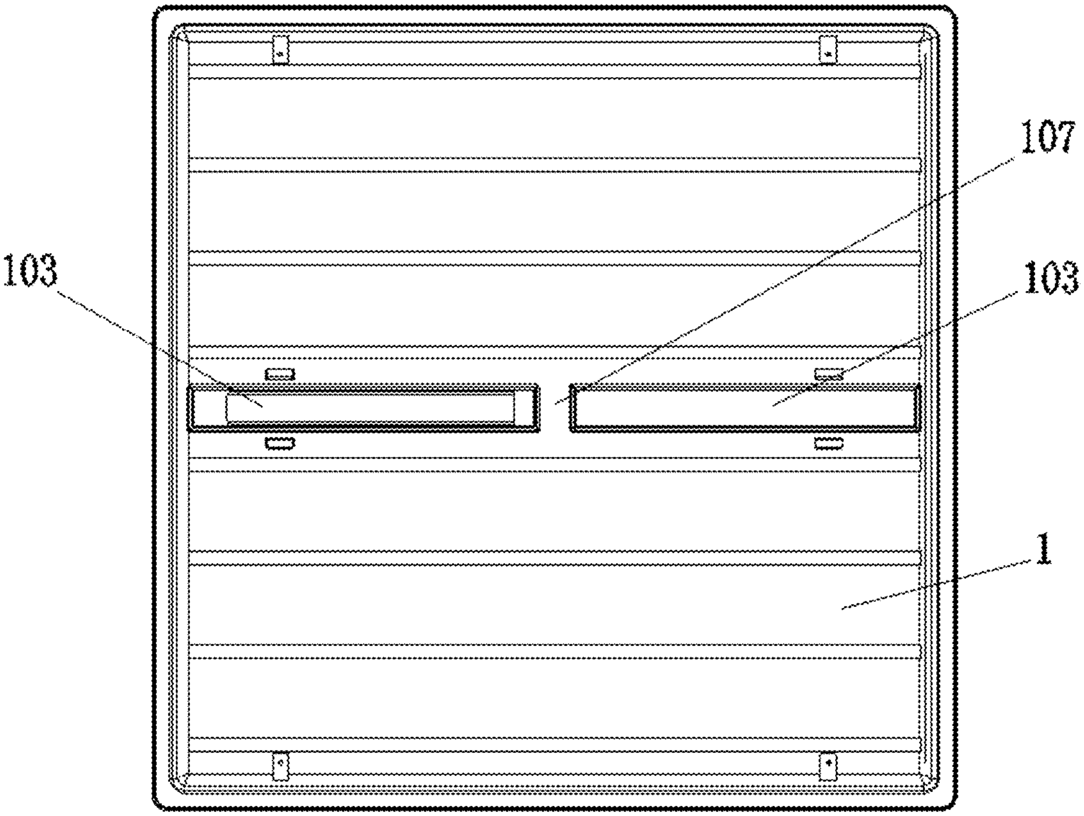

Please refer to FIG. 28. In some embodiments, the protrusion 103 is two in number, and a gap 107 is formed between the two protrusions 103. The two protrusions 103 may be arranged along the same direction such as a length direction or a width direction of the LED lighting device. When two LED lighting devices are stacked in a back-to-back manner, one LED lighting device is rotated 90 degrees, and the protrusions 103 of the two LED lighting devices are interlaced, the total height is less than 2 times the height of a single LED lighting device. The gap 107 can prevent two protrusions 103 from interfering with each other when two LED lighting devices are connected in a back-to-back manner. In the embodiment, the gap 107 is located at the center of the seat 1, and its size in an extending direction of the protrusion 103 is greater than a width of the protrusion 103.

Figure 25:
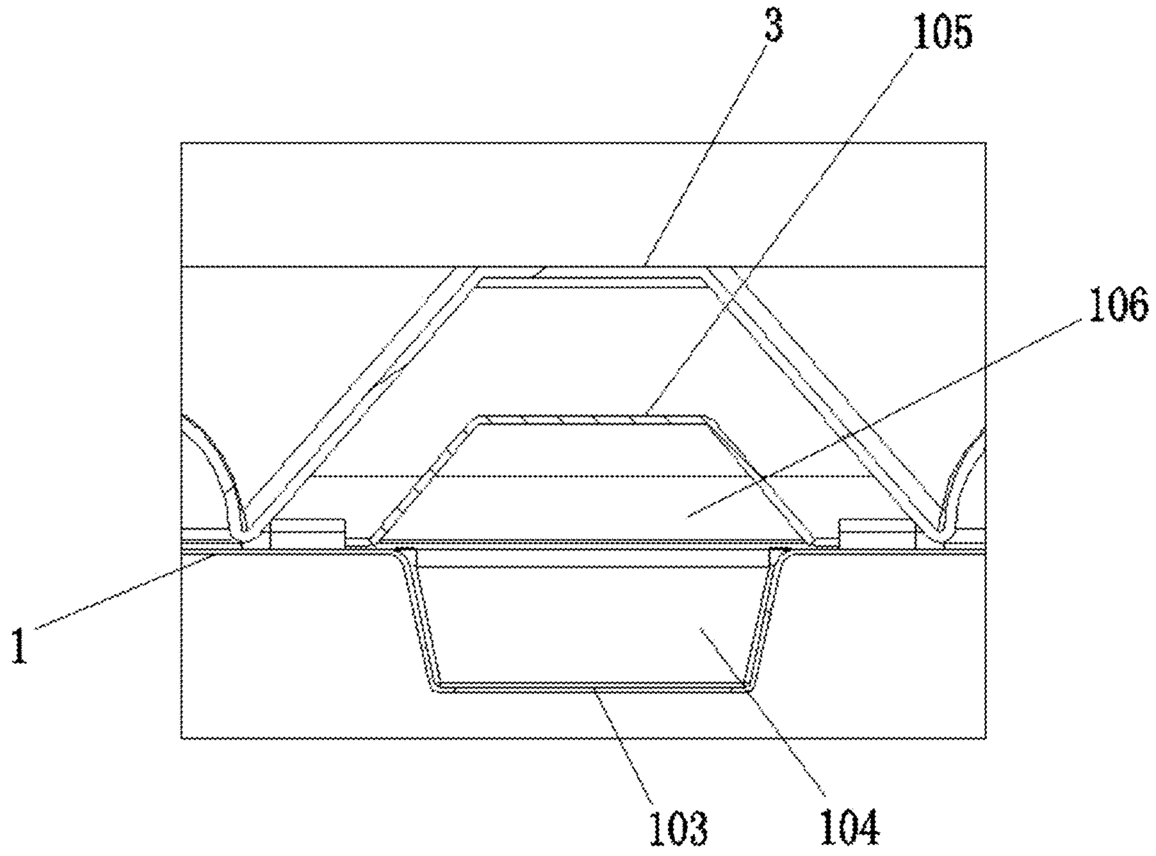
FIG. 25 is an enlarged view of part H in FIG. 22.
Figure 29:
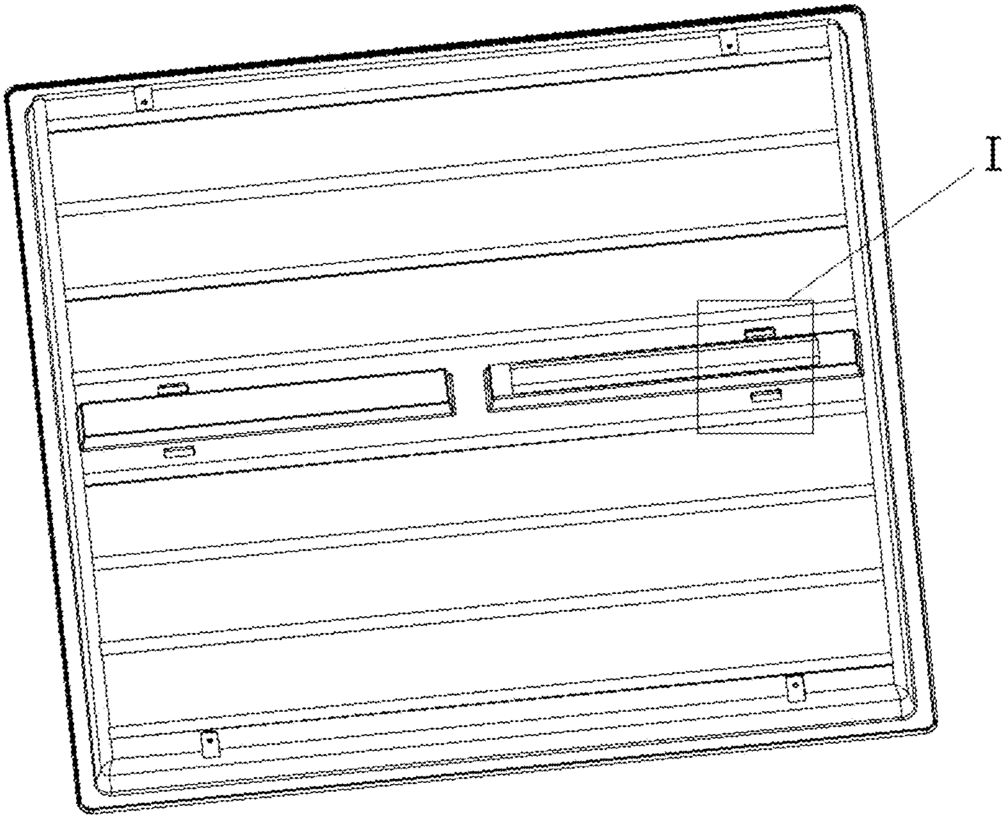
FIG. 29 is a perspective schematic view of an embodiment of the LED lighting device of the invention.
Figure 30:
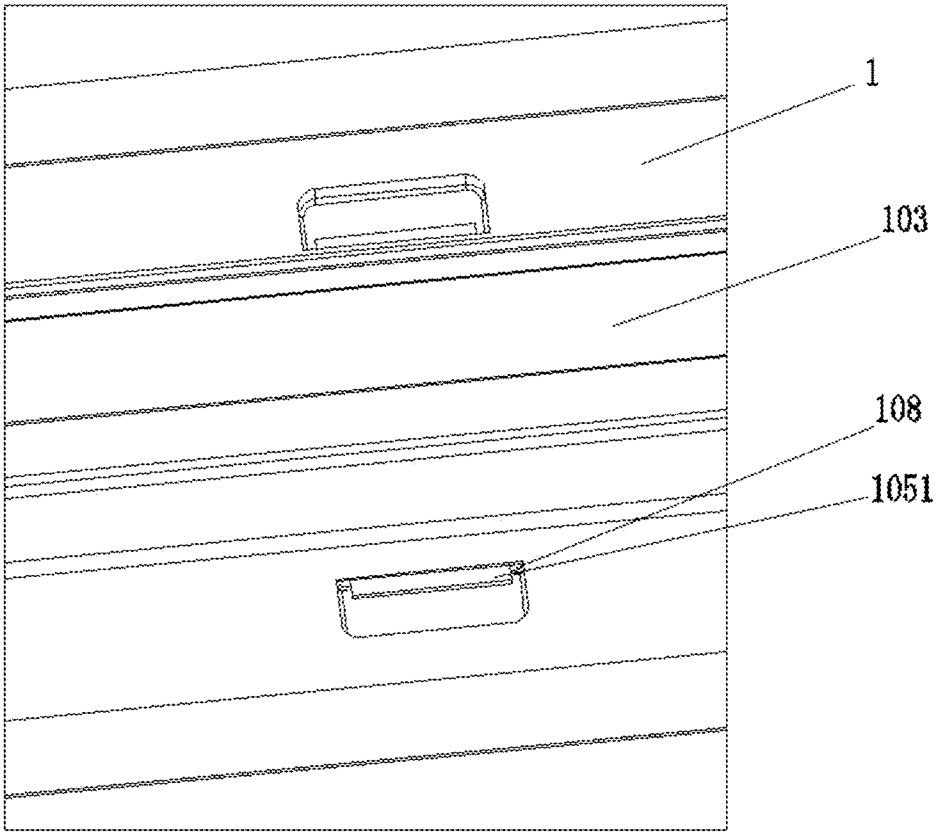
FIG. 30 is an enlarged view of part I in FIG. 29.

Please refer to FIGS. 25, 29 and 30. In the embodiment, the protrusion 103 is located at a middle position of the LED lighting device (seat 1) in a length direction or a width direction to make the LED lighting device be of a substantially symmetrical structure. In the embodiment, a cap 105 separately associates with two recesses 104. The cap 105 is disposed with an inserting wall 1051. The seat 1 is correspondingly disposed with an inserting hole 108. When the inserting wall 1051 of the cap 105 is inserted into the inserting hole 108 of the seat 1, the cap 105 can be fixed to the seat 1.

A distance between the LED chip 21 and the cap 105 is configured to be greater than 15 mm. In addition, an angle a between a sidewall of the cap 105 and a surface of the seat 1 is configured to be greater than 120 degrees. Thus, the influence of the cap 105 to light emitting of the LED chip 21 can be reduced.

Please refer to FIG. 14. In one embodiment, the LED lighting device further includes a bracket 5. The bracket 5 is used to install the device LED lighting device onto a support of a ceiling. The bracket 5 may adopt metal such as copper or iron. An end of the bracket 5 is fixed to the end wall 13, and the other end thereof is bent to be hung on the support.

In the embodiment, in the height direction of the LED lighting device, the height of the first optical member 311 does not exceed half of the height of the second optical member 312 to reduce the light directly emitted by the LED lighting device from the lateral side of the first optical member 311. That is, more light emitted from the first optical member 311 will be redirected by the second optical member 312 to adjust the light emission of the LED lighting device.

Please refer to FIGS. 14 and 17 to 20. A beam angle of the LED chip 21 of the LED array 23 is A. As for the definition of the beam angle (at a place where the light intensity reaches 50% of the light intensity of the normal, the angle formed by the two sides is the beam angle) is well-known, details will not be described here. Optionally, the beam angle A may be between 100 degrees and 130 degrees. The LED chip 21 is projected onto an inner surface of the first optical member 311 with the boundary of the beam angle A as the range, and a projection area m is formed on the inner surface of the first optical member 311 (the projection area m is a curved surface, a plane or other irregular surface), an area of the projection area m is greater than 500 mm2. To prevent the first optical member 311 from forming a grainy sense when the LED chip 21 is lit, without considering the influence of the adjacent LED chips 21, the light intensity on the projection area m should be less than 50,000 lux.

The size of the projection area m depends on the distance from the LED chip 21 to the first optical member 311. The longer the distance, the greater the thickness of the optical unit 3 (the total thickness will increase), this is disadvantageous to cost control. When the distance is small, the area of the projection area m is less than 500 mm2, this makes the illuminance not easy to be controlled and forms a grainy sense. Thus, in the embodiment, the distance from the LED chip 21 to the first optical member 311 is controlled to be between 6 mm and 15 mm. Also, without considering the influence of the adjacent LED chips 21, the light intensity on the projection area m should be greater than 10000 lux. When the projection area m is non-planar, the shortest distance from the center of the surface of the LED chip 21 to the first optical member 311 within the range of the beam angle A can be used as the distance to be controlled.

The luminous flux of the LED chip 21 is L. When the LED chips 21 in the LED array 23 are arranged in only one row, the projection areas m of the LED chips 21 of the same LED array 23 on the inner surface of the first optical member 311 may partially overlap. Considering the overlapping of the projection areas m of different LED chips 21 on the inner surface of the first optical member 311, the illuminance of any position in any projection area m does not exceed 5 L/m, to prevent the overlapping of the projection areas m of the LED chips 21 from forming strong light. In one embodiment, the illuminance of any position in any projection area m does not exceed 4 L/m, so as to prevent the formation of strong light when the projection areas m of the LED chips 21 are superimposed. In one embodiment, the illuminance of any position in any projection area m does not exceed 3 L/m, so as to prevent the formation of strong light when the projection areas m of the LED chips 21 are superimposed. In one embodiment, the illuminance of any position in any projection area m does not exceed 2 L/m, so as to prevent the formation of strong light when the projection areas m of the LED chips 21 are superimposed.

One of the factors affecting the overlapping of the projection areas m of the LED chips 21 is the distance between the LED chips 21. In one embodiment, the center-to-center distance between the LED chips 21 is controlled to be greater than 4 mm or more than 4.5 mm.

In one embodiment, the number of LED chips 21 in the LED array 23 is n, and the number of projection areas m superimposed by any area of any projection area m is less than or equal to n. In one embodiment, the number of LED chips 21 in the LED array 23 is n, and the number of projection areas m superimposed by any area of any projection area m is less than n.

Figure 20:
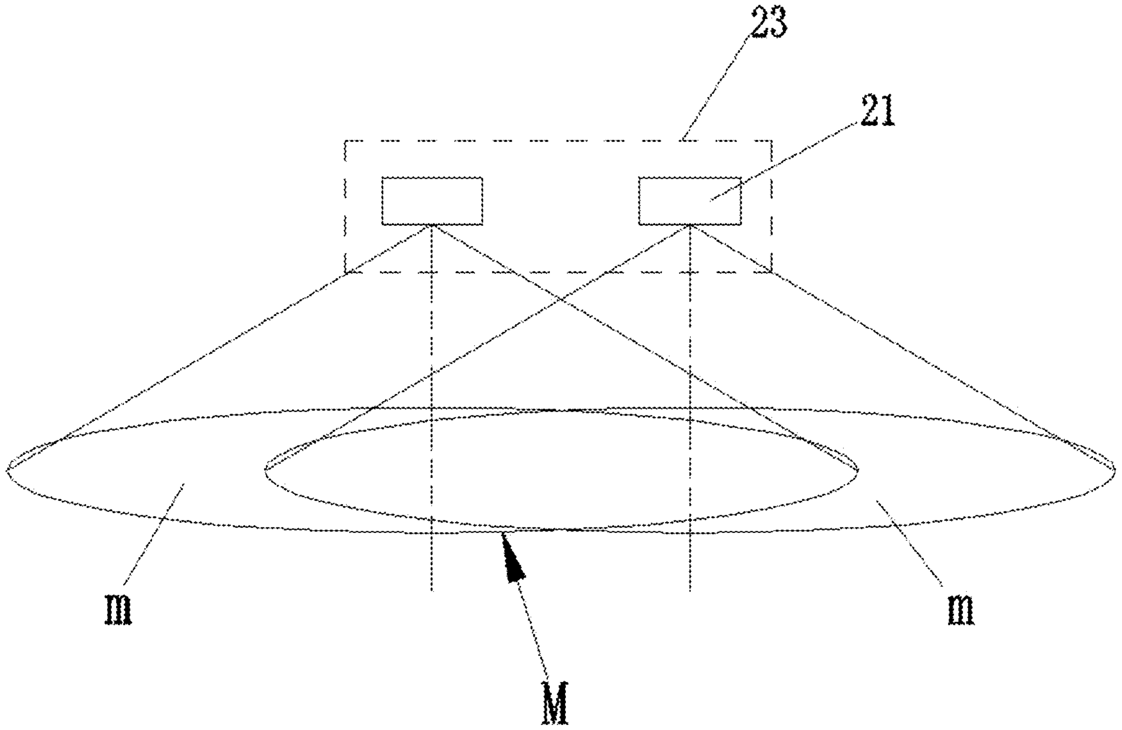
FIG. 20 is a schematic view of light emitting of the LED array.

The total area of the projection area on the inner surface of the first optical member 311 is M. FIG. 20 as an example, when the LED array 23 has two LED chips 21, the projection areas m of the two LED chips 21 overlap, the area of the total projection area M on the inner surface of the first optical member 311 is composed of the boundary of the projection areas m of the two LED chips 21 on the inner surface of the first optical member 311. That is, the area of the total projection area M is that the sum of the areas of the projection areas m of the two LED chips 21 on the inner surface of the first optical member 311 subtracts the area of the overlapping area.

The luminous intensity near an optical axis of the beam angle A is greater than the luminous intensity of the marginal area of the beam angle A. That is, in a single projection area m, the illuminous intensity within its range is not even. Therefore, it can be arranged as follows. More than 30%, 35%, or 40% of the total projection area M on the inner surface of the first optical member 311 has the overlapping of at least two projection areas m, so as to improve the uniformity of illumination in the total projection area M. However, in order to avoid the overlapping of too many projection areas m to cause uneven illuminous intensity, not more than 25%, 20% or 18% of the area of the total projection area M on the inner surface of the first optical member 311 can be configured to have the overlapping of four or more projected areas m.

Based on the above, in the embodiment, when only one optical unit 31 is provided (without a lens), the uniformity of light emitting can be achieved, the structure is simplified, and the material cost is reduced.

Figure 21:
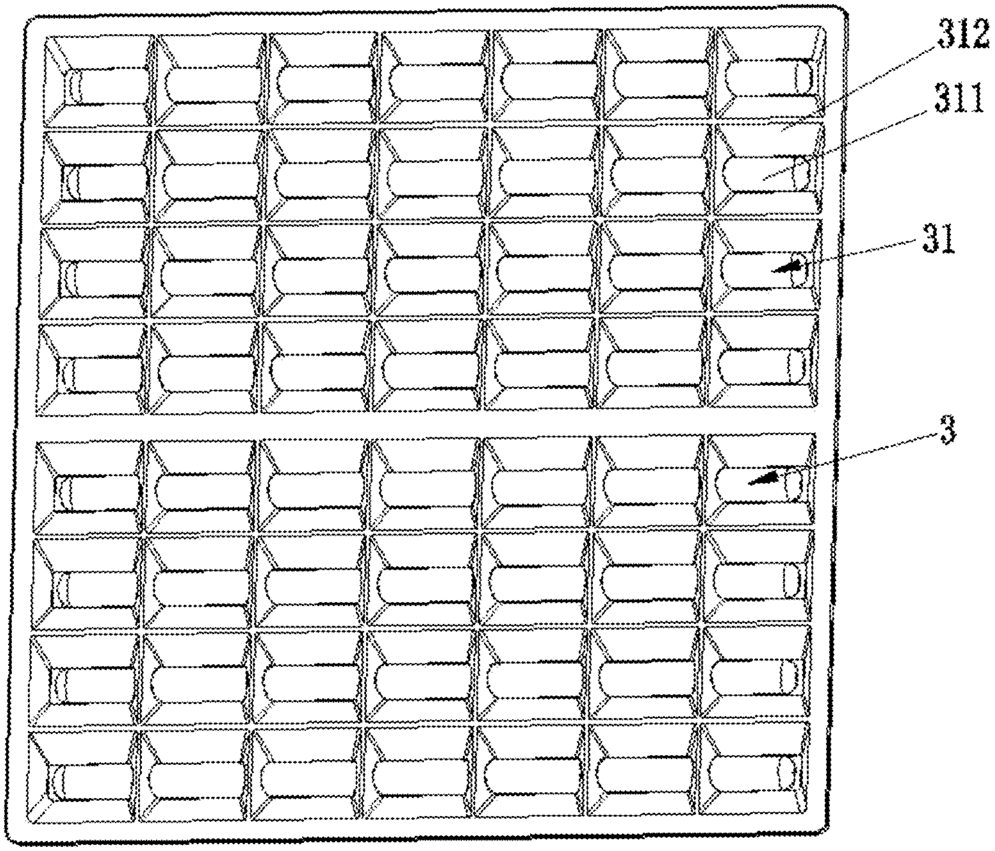
FIG. 21 is a perspective schematic view of an embodiment of the LED lighting device of the invention which removes the optical assembly.
Figure 22:
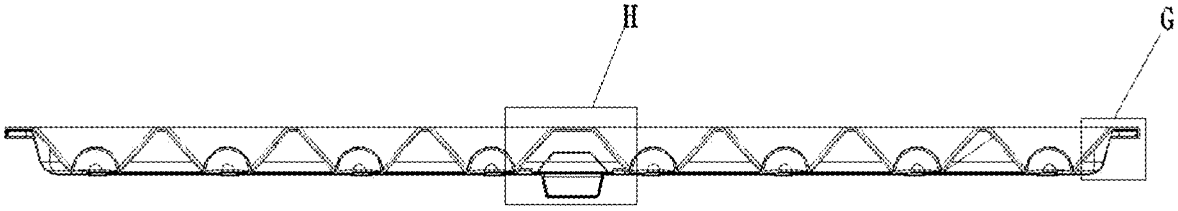
FIG. 22 is a cross-sectional schematic view of an embodiment of the optical assembly of the LED lighting device of the invention.
Figure 23:
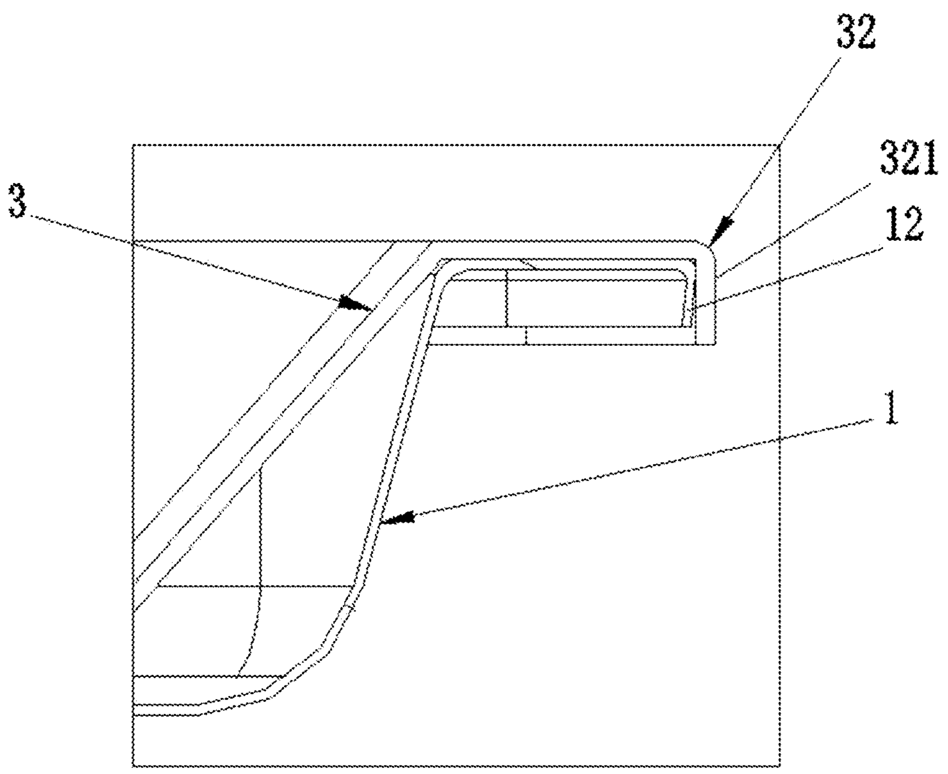
FIG. 23 is an enlarged view of part G in FIG. 22.
Figure 24:
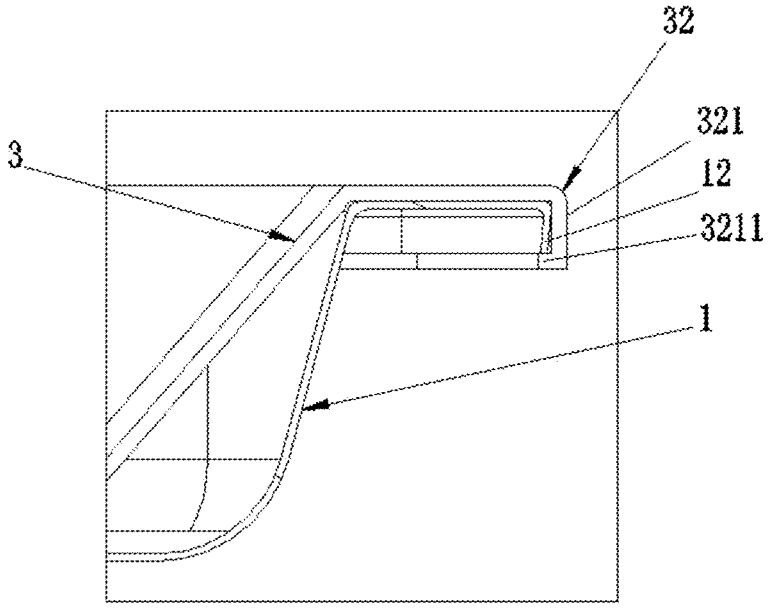
FIG. 24 is a partially cross-sectional view of the installing unit.
Figure 31:
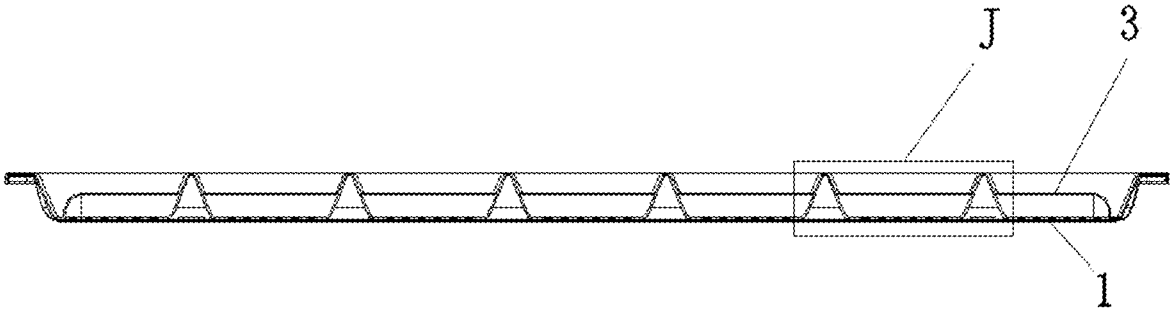
FIG. 31 is a cross-sectional schematic view of an embodiment of the LED lighting device of the invention.
Figure 32:
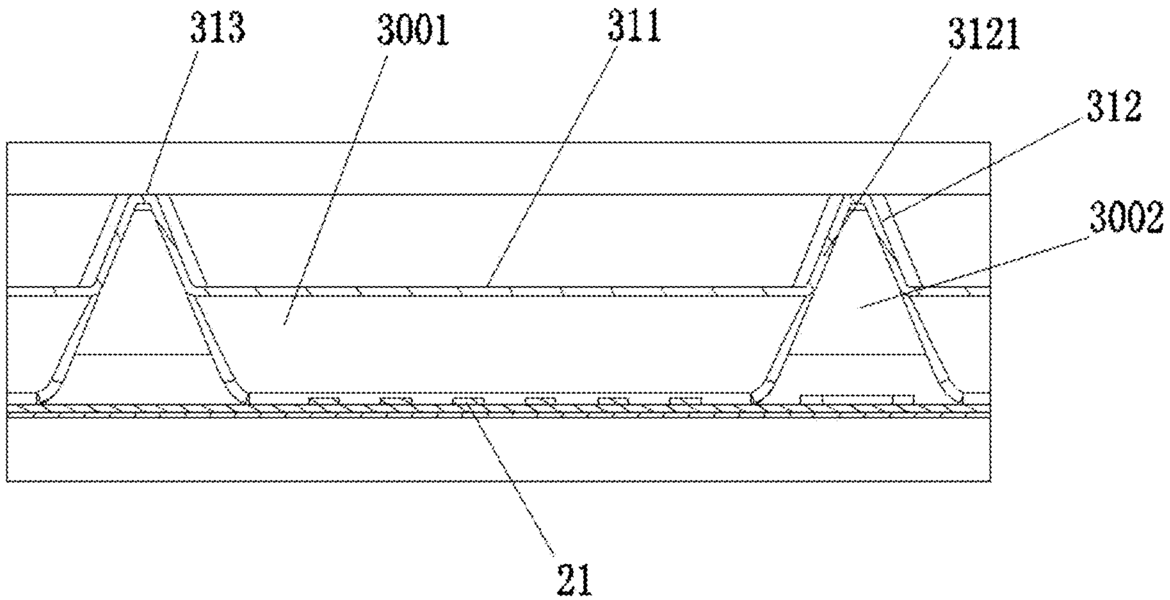
FIG. 32 is an enlarged view of part J in FIG. 31.
Figure 33:
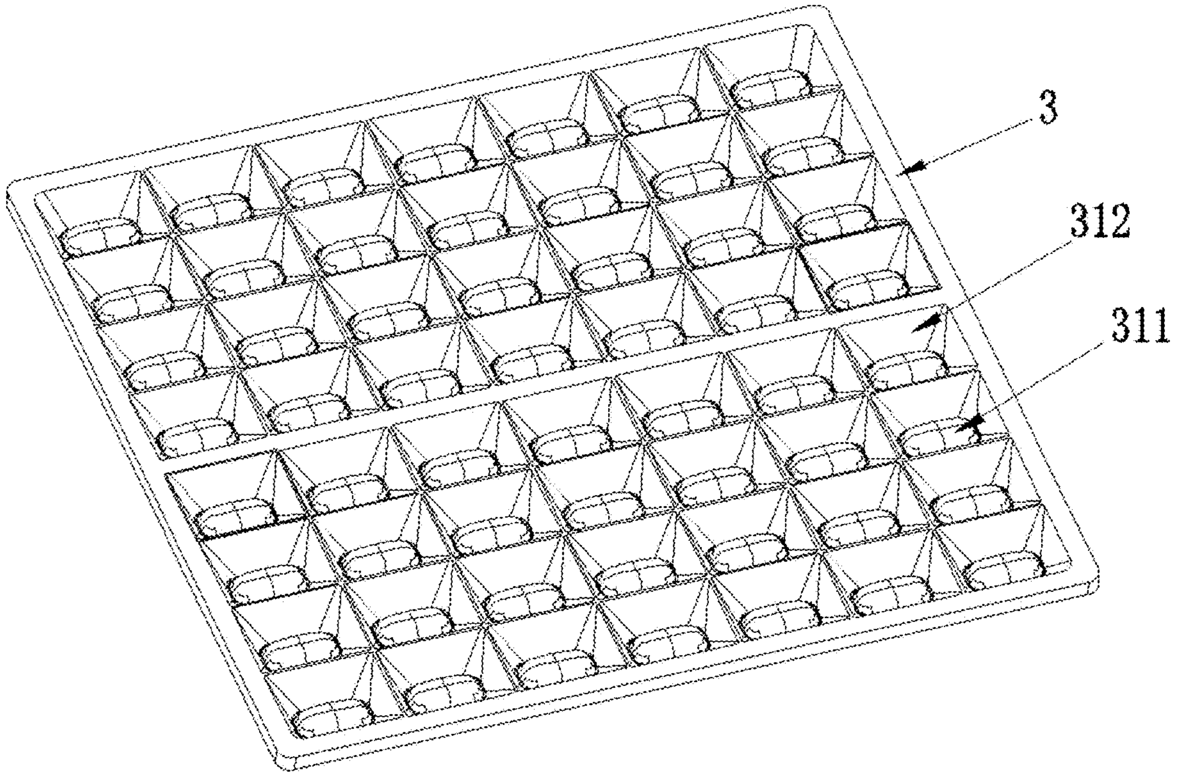
FIG. 33 is a perspective schematic view of an embodiment of the LED lighting device of the invention.
Figure 34:
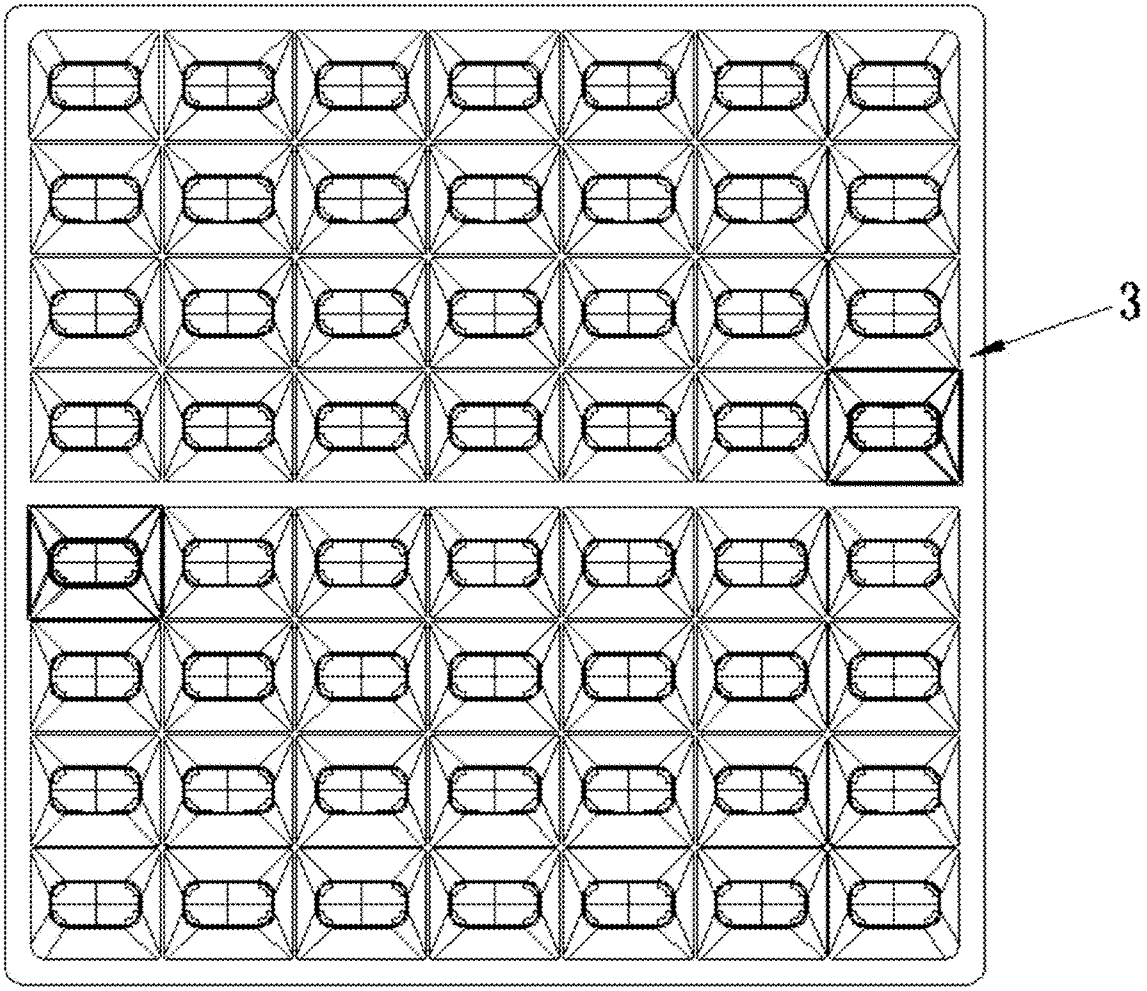
FIG. 34 is a front schematic view of an embodiment of the LED lighting device of the invention.
Figure 35:
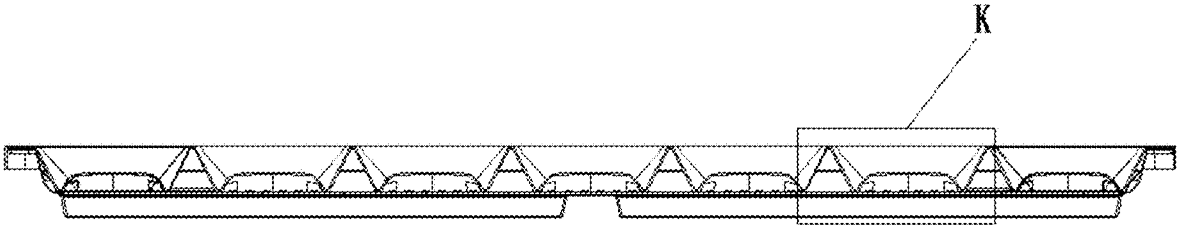
FIG. 35 is a cross-sectional schematic view of an embodiment of the LED lighting device of the invention.

As shown in FIGS. 21, 31 and 32, in one embodiment, a first cavity 3001 is formed in the first optical member 311 (between the first optical member 311 and a surface of the seat 1), and a second cavity 3002 is formed between adjacent second optical members 312. The first optical member 311 is connected to the optical wall 3121 of the second optical member 312 in the length direction thereof, and the first cavity 3001 communicates with the second cavity 3002. When the LED chip 21 emits light, at least part of the light enters the second cavity 3002 after being reflected by the seat 1 and the first optical member 311, and penetrates through the corresponding optical wall 3121 and/or the first connecting wall 313 to improve the light emitting effect of the optical assembly 3.

Figure 36:
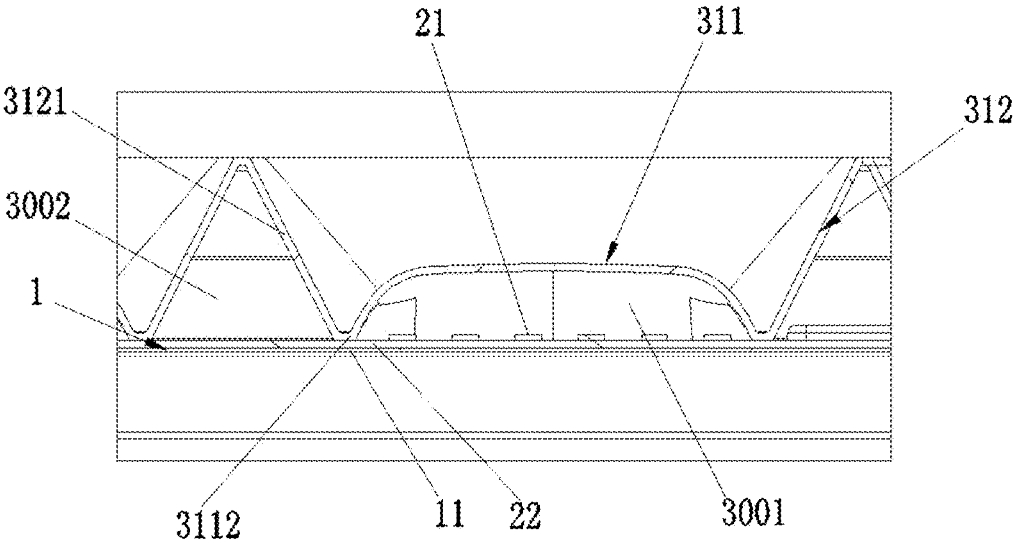
FIG. 36 is an enlarged view of part K in FIG. 35.
Figure 37:
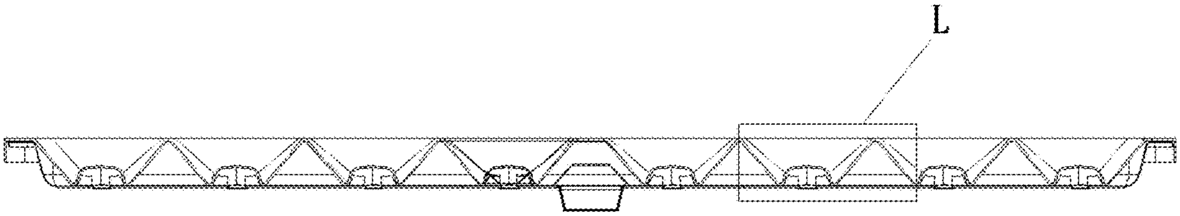
FIG. 37 is another cross-sectional schematic view of an embodiment of the LED lighting device of the invention, which shows a different cross-section from FIG. 35.
Figure 38:
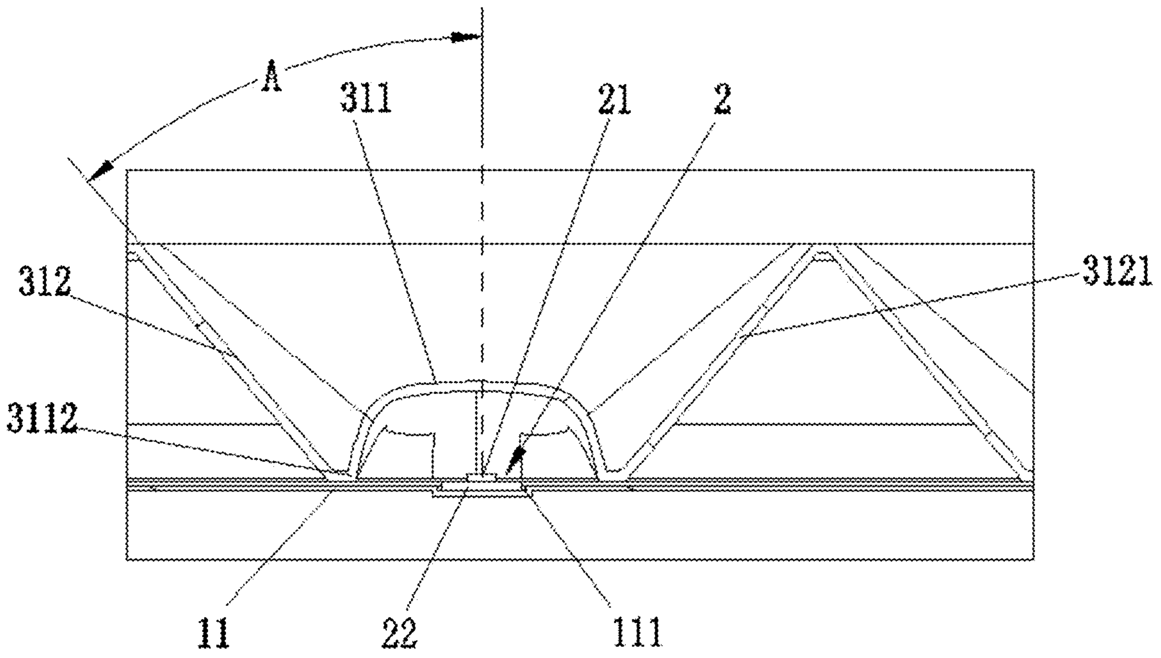
FIG. 38 is an enlarged view of part L in FIG. 37.

As shown in FIGS. 33 to 38, in one embodiment, a first cavity 3001 is formed in the first optical member 311 (between the first optical member 311 and the surface of the seat 1), and a second cavity 3002 is formed between adjacent second optical members 312. The first optical member 311 is not connected (not directly connected) with the optical wall 3121 of the second optical member 312 in its length direction and width direction. Therefore, the first cavity 3001 does not communicate with the second cavity 3002 (excluding the connection caused by assembling gaps, it can be regarded as the first cavity 3001 not communicating with the second cavity 3002 when the assembly gap here is less than 5 mm). This can reduce the light from the light source 2, which is reflected in the first cavity 3001 to enter the second cavity 3002, to make the light emitted through the first optical member 311 be more concentrated when the light source 2 works. As shown in FIGS. 36 and 38, in other words, the distance between an end of the first optical member 311 (in terms of FIGS. 36 and 38, the lower portion of the first optical member 311) and the baseplate 11 of the seat 1 is not more than 5 mm, 4 mm, 3 mm, 2 mm or 1 mm to reduce the leakage of the light emitted by the light source 2 via the gaps between the first optical member 311 and the baseplate 11. In one embodiment, an end of the first optical member 312 (in terms of FIGS. 36 and 38, the lower portion of the first optical member 311) is at least partially attached on the baseplate 11 of the seat 1 to further reduce light leakage.

In one embodiment, the baseplate 11 is disposed with a positioning trough 111. The light source 2 is at least partially accommodated in the positioning trough 111 in the height direction thereof. In other words, the circuit board 22 of the light source 2 is at least partially accommodated in the positioning trough 111 in the thickness direction. When the surface of the circuit board 22 does not project from the positioning trough 111 (that is, the circuit board 22 is completely accommodated in the positioning trough 111 in the thickness direction), the end 3112 of the first optical member 311 (in terms of FIGS. 36 and 38, the lower portion of the first optical member 311) can be directly attached on the baseplate 11. When a part of the circuit board 22 is accommodated in the positioning trough 111 in the thickness direction, the end 3112 of the first optical member 311 (in terms of FIGS. 36 and 38, the lower portion of the first optical member 311) abuts against a surface of the circuit board 22. At this time, the end 3112 of the first optical member 311 (in terms of FIGS. 36 and 38, the lower portion of the first optical member 311) and the baseplate 11 are kept at a distance, and the distance can be the height of an exposed portion of the circuit board 22 projecting from the positioning trough 111.

In one embodiment, the optical wall 3121 has a function of reflection, which can reflect part of the light emitted from the first optical member 311 to reduce light emitting of the LED lighting device in a lateral direction of the first optical member 311 so as to reduce glare. In this embodiment, on a cross-section of the first optical member 311 in a width direction, the optical wall 3121 and an optical axis of the LED chip 21 form an acute angle A. The acute angle A formed between the optical wall 3121 and the optical axis of the LED chip 21 is between 30 degrees to 60 degrees. The optical wall 3121 includes a wall portion corresponding to a length direction of the first optical member 311 and another wall portion corresponding to a width direction of the first optical member 311. The angle between each of the wall portion in the length direction of the first optical member 311 and the wall portion in the width direction of the first optical member 311 and the optical axis of the LED chip 21 is within the range of the aforementioned acute angle A. In one embodiment, the includes angle between corresponding two sets of optical walls 3121 in the width direction of the first optical member 311 is smaller than the beam angle of the LED chip 21 to block light and reduce glare. In addition, the included angle between corresponding two sets of optical walls 3121 in the width direction of the first optical member 311 (i.e., the double of the acute angle A) is greater than 70 degrees to prevent excessively restricting the light emitting angle of the LED lighting device.

Figure 39:
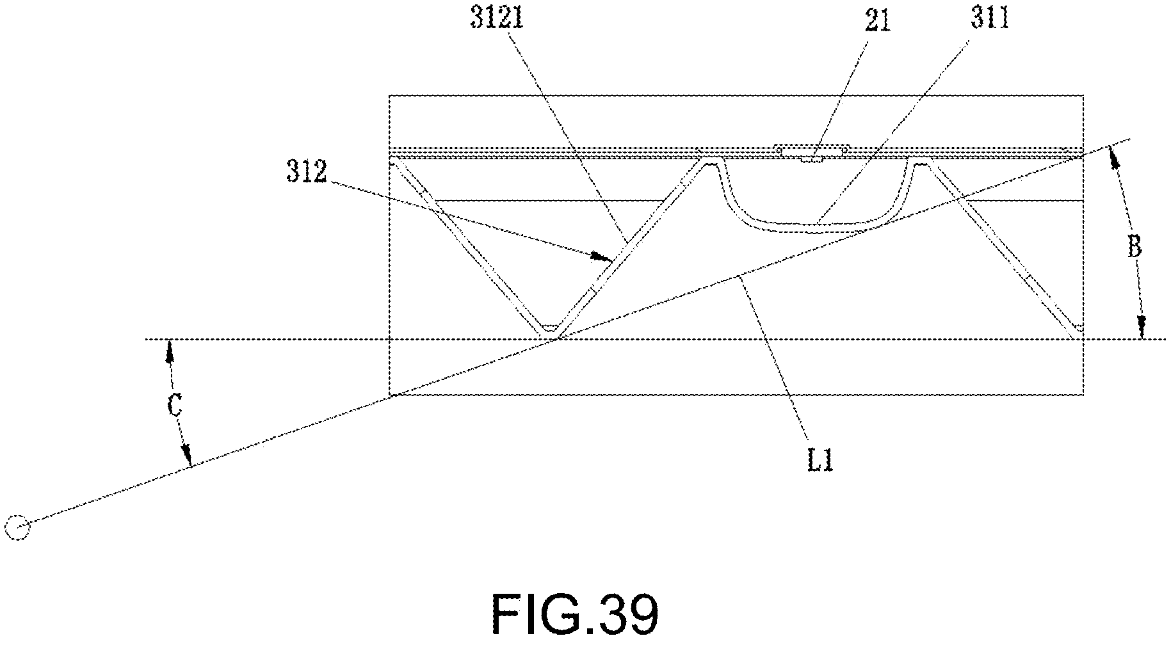
FIG. 39-43 are partially cross-sectional schematic views of some embodiments of the LED lighting device of the invention which is horizontally installed and downward emits light.

FIG. 39 shows a partially cross-sectional schematic view of an LED lighting device installed horizontally and emitting light downward in one embodiment, which shows a cross-section of the first optical member 311 in the width direction. In this embodiment, on the cross-section of the first optical member 311 in the width direction, the optical wall 3121 of the second optical member 312 has a lower end point, and the lower end point extends along a direction and forms a straight line. The straight line L1 is tangent to an outer surface of the first optical member 311. The included angle B between the straight line L1 and the horizontal plane (that is, the light-emitting surface of the LED lighting device, when the LED lighting device is installed along the level, the light-emitting surface is parallel or approximately parallel to the horizontal plane) is greater than 10 degrees, 12 degrees, 14 degrees, 16 degrees or 18 degrees. In one embodiment, the included angle B between the straight line L1 and the horizontal plane (that is, the light-emitting surface of the LED lighting device, when the LED lighting device is installed along the level, the light-emitting surface is parallel or substantially parallel to the horizontal plane) is between 15 degrees and 25 degrees. In one embodiment, the included angle B between the straight line L1 and the horizontal plane (that is, the light-emitting surface of the LED lighting device, when the LED lighting device is installed along the level, the light-emitting surface is parallel or substantially parallel to the horizontal plane) is between 18 degrees and 20 degrees. When a human eye and the first optical member 311 (or the LED lighting device) are in a certain position (when the angle C between a straight line through the human eye and the light-emitting surface of the LED lighting device is less than the aforementioned included angle B), the human eye will not directly observe direct light emitting from the first optical member 311, so glare can be reduced. From another point of view, a straight line L1 is set, one end of the straight line L1 is connected to the lower end point of the optical wall 3121, and the other end of the straight line L1 is tangent to the outer surface of the first optical member 311, and the included angle between the straight line L1 and the horizontal plane (that is, the light-emitting surface of the LED lighting device, when the LED lighting device is installed along the level, the included angle B between the light-emitting surface is parallel or approximately parallel to the horizontal plane) is greater than 10 degrees, 12 degrees, 14 degrees, 16 degrees or 18 degrees. In some embodiments, the included angle B between the straight line L1 and the horizontal plane is between 15 degrees and 25 degrees. In some embodiments, the included angle B between the straight line L1 and the horizontal plane is between 18 degrees and 20 degrees. The shape of the cross-section of the optical wall 3121 in this embodiment may not be set to be straight and flat. Glare can be reduced as long as the position of the lower end point thereof meets the above requirements.

Figure 40:
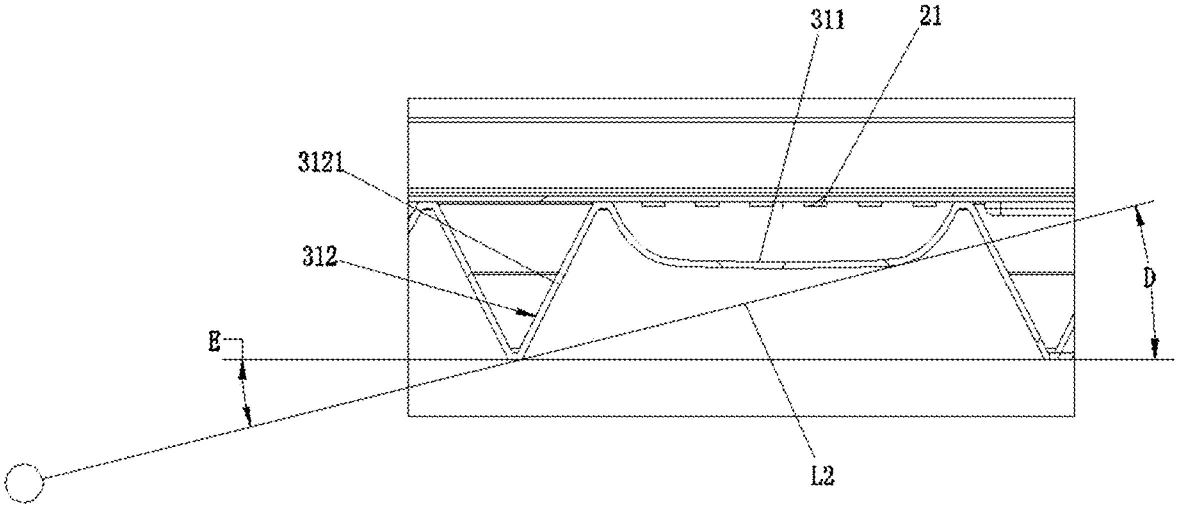

FIG. 40 shows a partially cross-sectional schematic view of the LED lighting device installed horizontally and emitting light downward in one embodiment, which shows a cross-section of the first optical member 311 in the length direction. In this embodiment, on the cross-section of the first optical member 311 in the length direction, the optical wall 3121 of the second optical member 312 has a lower end point, and the lower end point extends along one direction and forms a straight line. The straight line L2 is tangent to the outer surface of the first optical member 311. The included angle D between the straight line L2 and the horizontal plane (that is, the light-emitting surface of the LED lighting device, when the LED lighting device is installed along the level, the light-emitting surface is parallel or approximately parallel to the horizontal plane) is smaller than the included angle B. In some embodiments, the included angle D is greater than 10 degrees, 11 degrees, 12 degrees or 13 degrees. In one embodiment, the included angle D is between 10 degrees and 20 degrees. In one embodiment, the included angle D is between 12 degrees and 16 degrees. When a human eye and the first optical member 311 (or the LED lighting device) are in a certain position (when the angle E between a straight line through the human eye and the first optical member 311 and the light-emitting surface of the LED lighting device is less than the aforementioned included angle D), the human eye will not directly observe direct light emitting from the first optical member 311, so glare can be reduced. From another point of view, a straight line L2 is set, one end of the straight line L2 is connected to the lower end point of the optical wall 3121, and the other end of the straight line L2 is tangent to the outer surface of the first optical member 311, and the included angle D between the straight line L2 and the horizontal plane (that is, the light-emitting surface of the LED lighting device, when the LED lighting device is installed along the level, the light-emitting surface is parallel or approximately parallel to the horizontal plane) is between 10 degrees and 20 degrees. In some embodiments, the included angle D is between 12 degrees and 16 degrees. The shape of the cross-section of the optical wall 3121 in this embodiment may not be set to be straight and flat. Glare can be reduced as long as the position of the lower end point thereof meets the above requirements.

Figure 41:
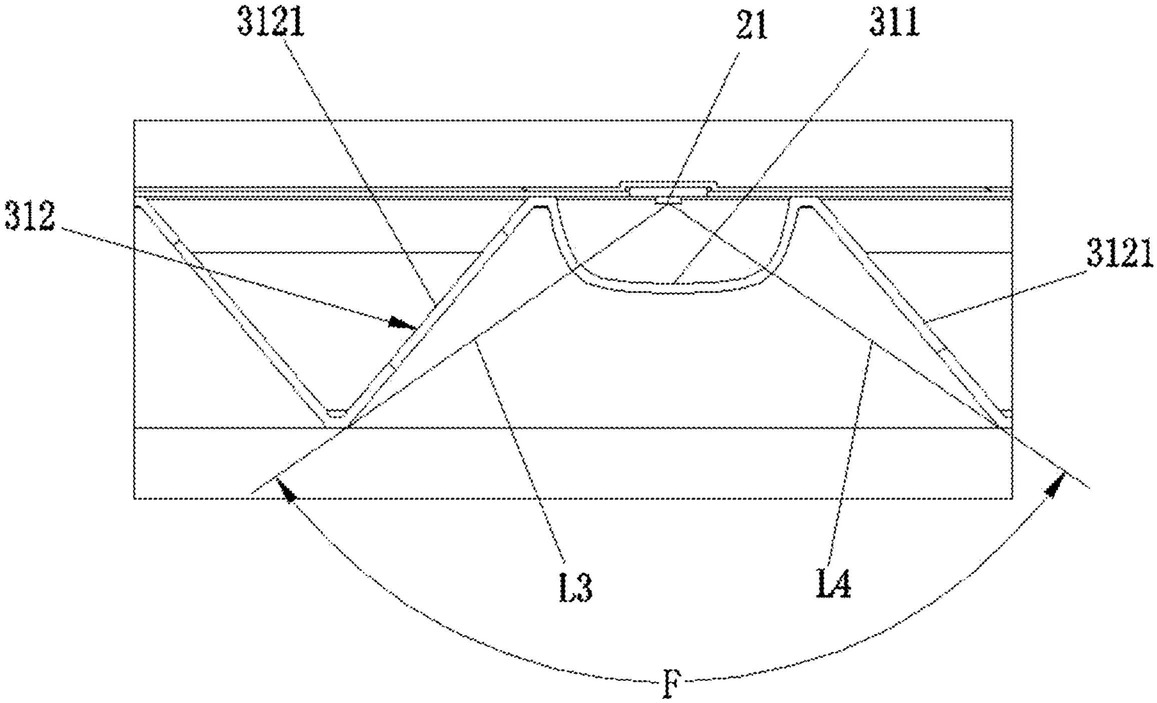

FIG. 41 shows a partially cross-sectional schematic view of the LED lighting device installed horizontally and emitting light downward in one embodiment, which shows a cross-section of the first optical member 311 in the width direction. In this embodiment, on the cross section of the first optical member 311 in the width direction, each of the two sets of optical walls 3121 of the second optical member 312 corresponding to the LED chip 21 has a lower end point. The included angle F between each of two straight lines through the center of the light-emitting surface of the LED chip 21 and anyone of the lower end points of the two sets of optical walls 3121 is greater than 0.8 times the beam angle A of the LED chip 21 (at a place where the light intensity of the LED chip 21 reaches 50% of the luminous intensity of the normal, the angle formed by the two sides is the beam angle A), so as to prevent the optical walls 3121 from blocking the light emitting of the LED chip 21 excessively to cause light loss and reduce the light emitting efficiency. In some embodiments, the included angle F is less than 1.2 times the beam angle A of the LED chip 21 (at a place where the light intensity of the LED chip 21 reaches 50% of the luminous intensity of the normal, the included angle formed by the two sides is the beam angle A, where the beam angle A is about 120 degrees) to ensure that the optical walls 3121 have a certain light blocking effect to reduce glare.

Figure 42:
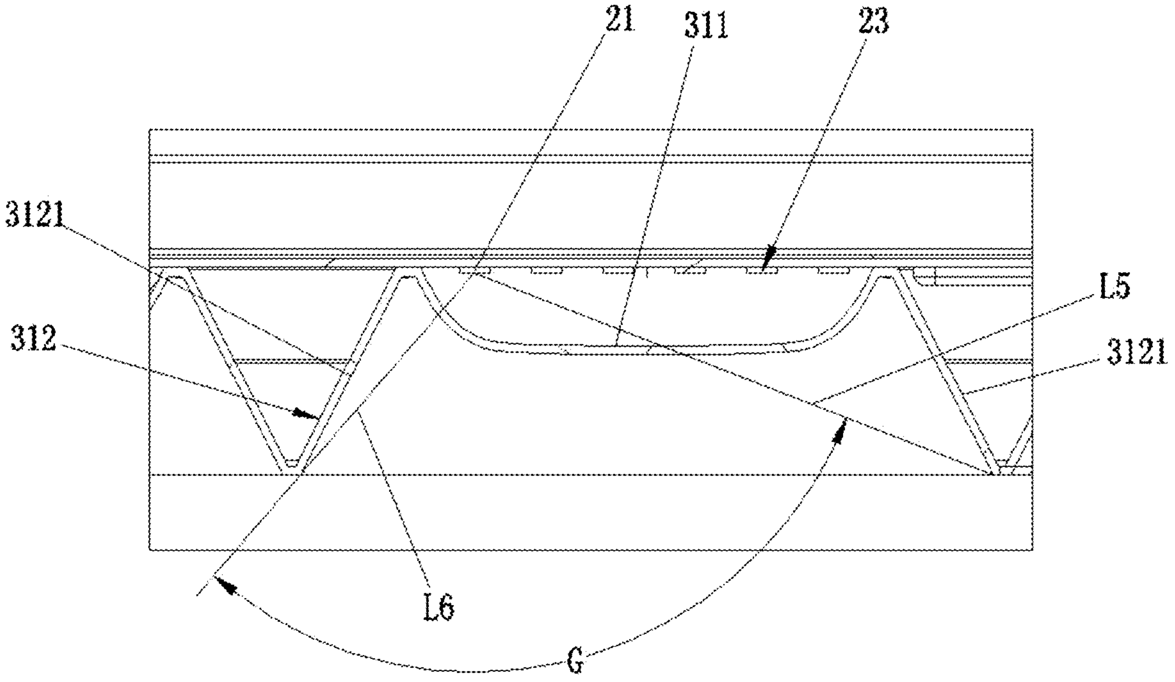

FIG. 42 shows a partially cross-sectional schematic view of the LED lighting device installed horizontally and emitting light downward in one embodiment, which shows a cross-section of the first optical member 311 in the length direction. In this embodiment, on the cross-section of the first optical member 311 in the length direction, there is an LED array 23 corresponding to the first optical member 311, and the two sets of optical walls 3121 of the second optical member 312 are correspondingly disposed to the LED array 23 in the first optical member 311. Each set of optical walls 3121 has a lower end point. The included angle G between lines L5 and L6 through a midpoint of the light-emitting surface of any LED chip 21 in the LED array 23 corresponding to the first optical member 311 and the lower end points of the two sets of optical walls 3121 is greater than 0.8 times the beam angle A of the LED chip 21 (at a place where the light intensity of the LED chip 21 reaches 50% of the luminous intensity of the normal, the included angle formed by the two sides is the beam angle A, where the beam angle A is about 120 degrees), so as to prevent the optical walls 3121 from blocking the light emitting of the LED chip 21 excessively to cause light loss and reduce the light emitting efficiency. In some embodiments, the included angle G is less than 1.2 times the beam angle A of the LED chip 21 (at a place where the light intensity of the LED chip 21 reaches 50% of the luminous intensity of the normal, the included angle formed by the two sides is the beam angle A) to ensure that the optical walls 3121 have a certain light blocking function to reduce glare.

Figure 43:
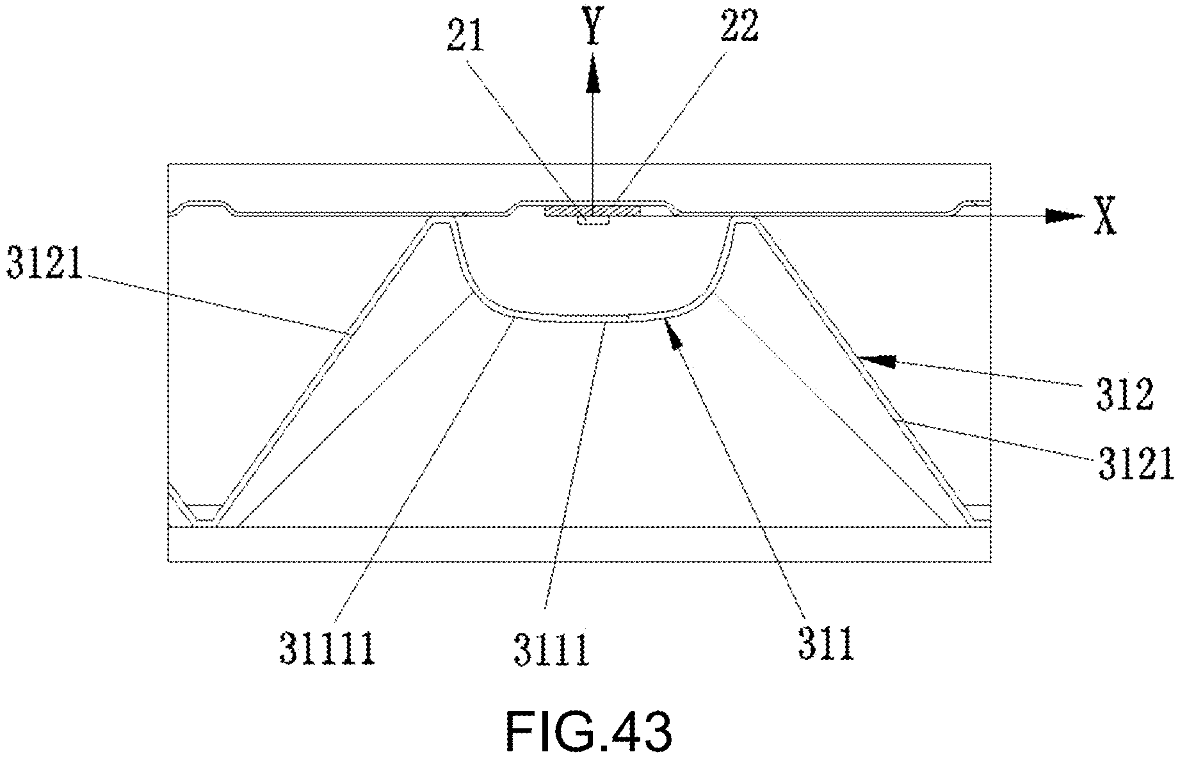

FIG. 43 shows a partially cross-sectional structural schematic view of the LED lighting device in some embodiments, which is horizontally installed and emits light downward. This figure shows a cross-section in the width direction of the first optical member 311, and the cross-section sections is at the main portion 31111 of the first optical member 311 in the length direction. A rectangular coordinate system is established, with the center of the width of the circuit board 22 as the origin, the thickness direction of the LED lighting device as the Y axis, and the width direction of the first optical member 311 as the X axis. Any point on the light-emitting surface 3111 of the first optical member 311 satisfies the following formula:

$$y=Ax^2+1E-15X-K$$

where A is a constant whose range is between 0.048 and 0.052, E means an exponent, and K is a constant whose range is between 9 and 12.

When any point on the light-emitting surface 3111 of the first optical member 311 satisfies the above formula, the light beam angle of the LED chips 21 better matches with the light-emitting surface 3111 (in the width direction) of the first optical member 311 after the LED chips 21 have been installed on the circuit board 22 (installed on the middle position in the width direction of the circuit board 22), so as to make the light-emitting surface 3111 have even light distribution.

In addition, in the above coordinate system, any point on the optical wall 3121 of the second optical member 312 satisfies the following formula:

$$Y=ax+L$$

where a is a constant whose range of absolute value is between 1.35 and 1.45, and L is a constant whose range is between 18 and 22.

When any point on the optical wall 3121 of the second optical member 312 satisfies the above formula, the optical wall 3121 can better redirect the light emitted to the optical wall 3121 to adjust the light distribution and improve the glare.

In one embodiment, there is only one thermal resistance layer (i.e., the optical assembly 3) on the optical axis direction (light-emitting direction) of the LED chip 21. When the LED chip 21 works, at least part of the heat generated by the LED chip 21 is radiated to the thermal resistance layer, and is outward dissipated through the thermal resistance layer. In comparison with the LED chip 21 which needs to use multiple thermal resistance layers (the prior art is disposed with at least two of a lampshade, a lens, a diffuser plate or a light guide plate to achieve the effect of uniform light emitting, but each of the above components constitutes a thermal resistance layer) to outward dissipate heat in the optical axial direction, the heat dissipation efficiency of the invention is improved.

In one embodiment, there is only one layer of light-permeable material (i.e., the optical assembly 3) on the optical axis direction (light-emitting direction) of the LED chip 21. When the LED chip 21 works, the light generated by the LED chip 21 is emitted to the light-permeable material and passes through the light-permeable material to be emitted from the Led lighting device. In comparison with the LED chip 21 which needs to use multiple light-permeable materials (the prior art is disposed with at least two of a lampshade, a lens, a diffuser plate or a light guide plate to achieve the effect of uniform light emitting, but each of the above components cause certain light loss) to outward emit light in the optical axial direction, the light-emitting efficiency of the invention is improved. In some embodiments, the light-emitting efficiency of the LED lighting device is greater than 80%, 85% or 90%. The light-emitting efficiency refers to the ratio of the luminous flux emitted from the LED lighting device to the total luminous flux generated by the LED chip 21.

In one embodiment, the light-permeable part (the first optical member 311) and the anti-glare part (the second optical member 312) adopt the same laminated material and are an integrated element.

Figure 44:
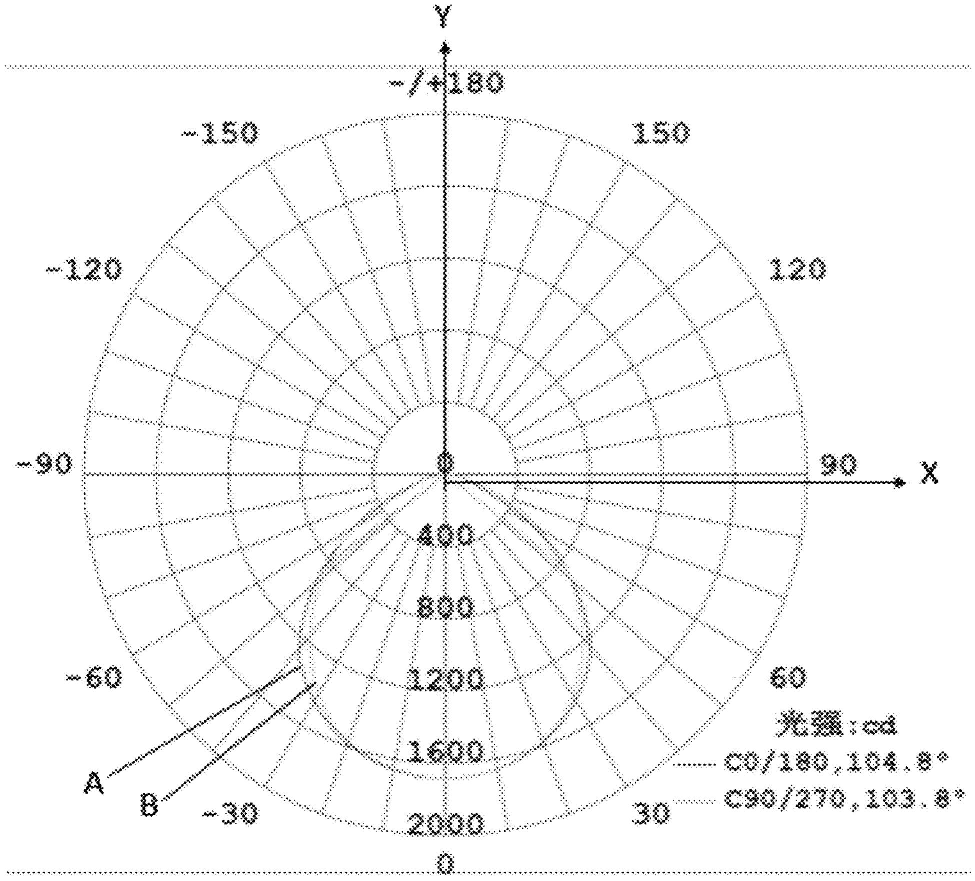
FIG. 44 is a light distribution curve of the LED lighting device in some embodiments.
Figure 45:
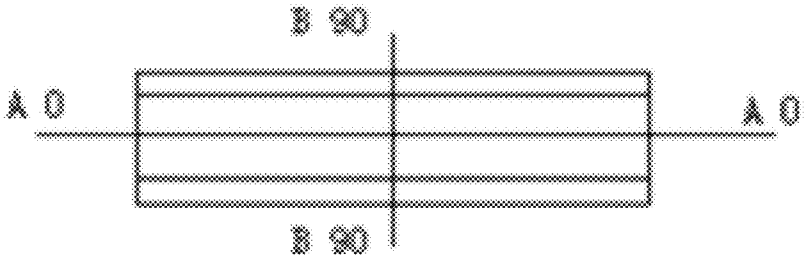
FIG. 45 is a schematic view of the LED lighting device in some embodiments.
Figure 46:
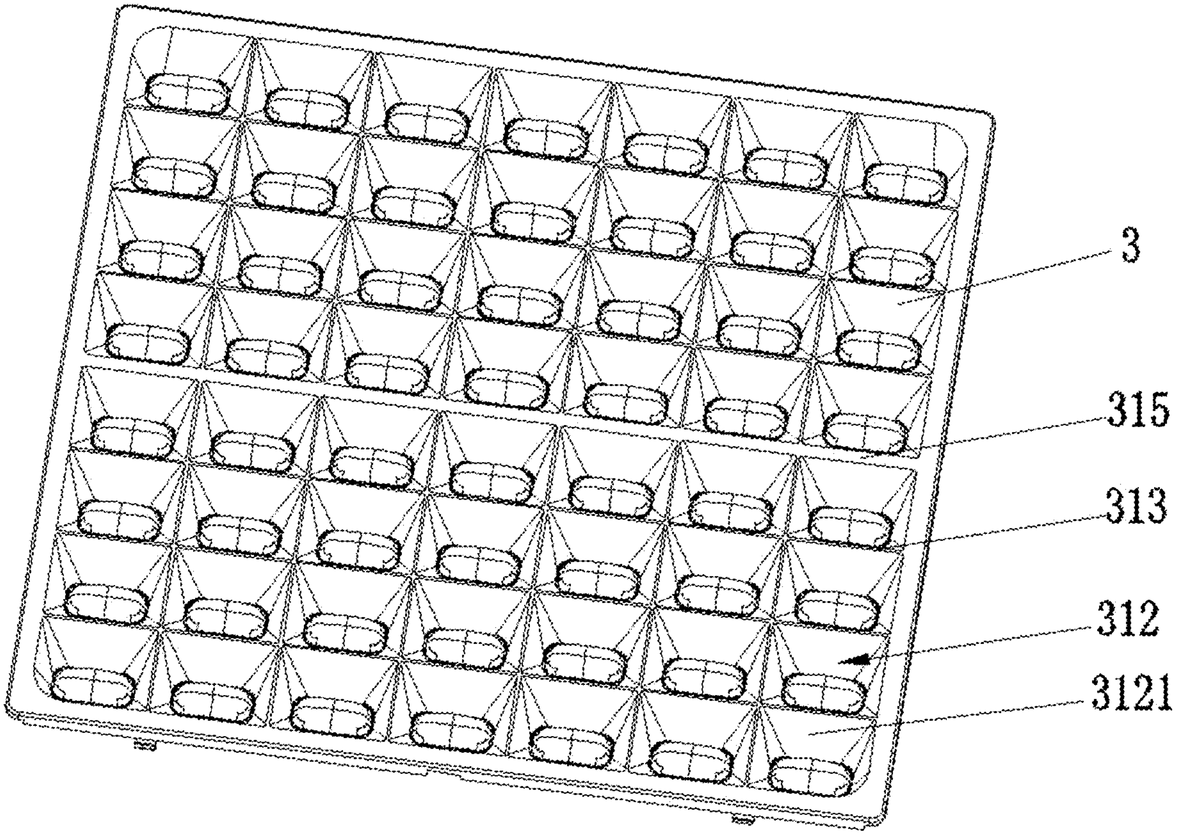
FIG. 46 is a perspective structural schematic view of the LED lighting device in some embodiments, which shows the front of the LED lighting device.
Figure 47:
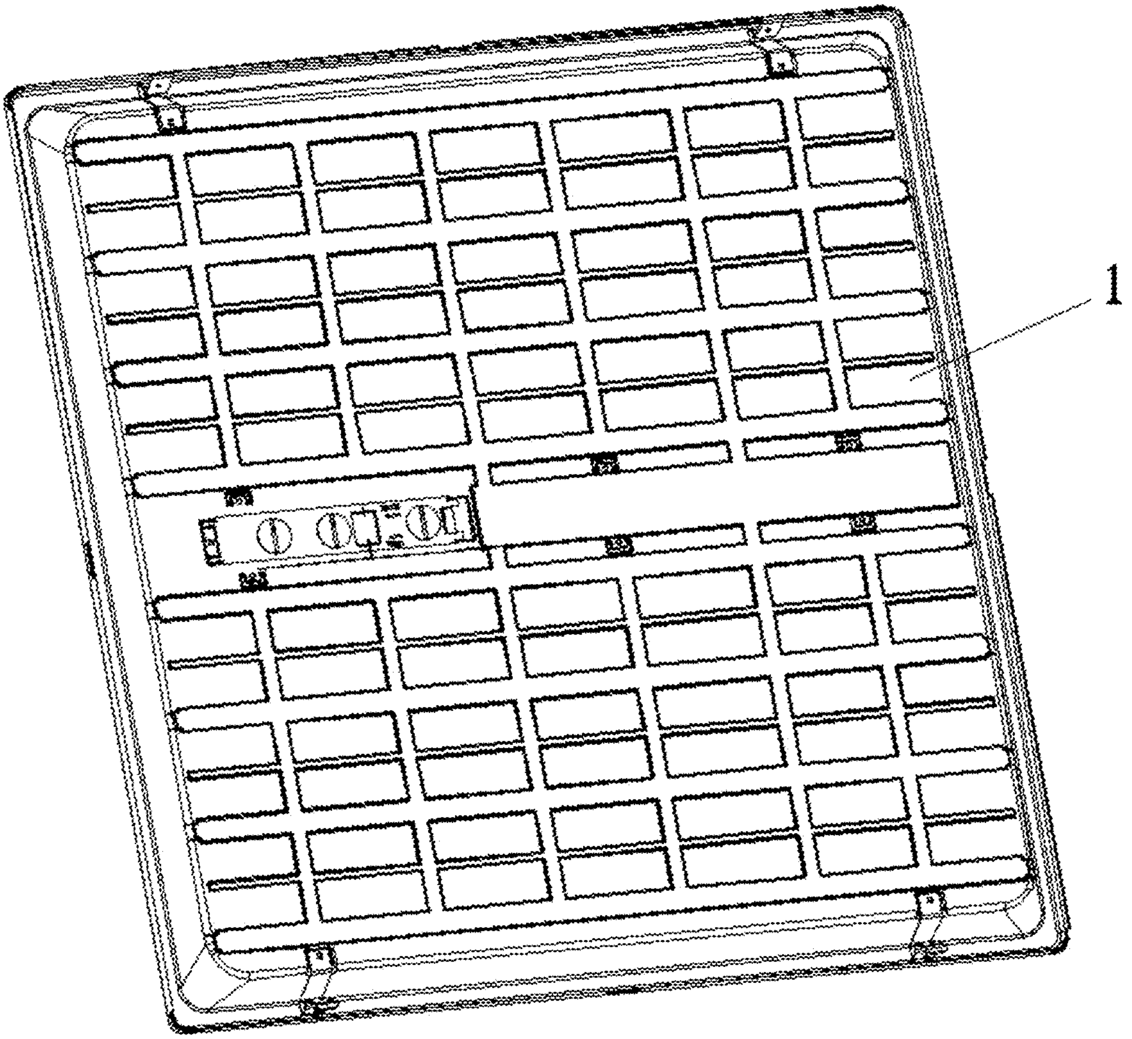
FIG. 47 is another perspective structural schematic view of the LED lighting device in some embodiments, which shows the back of the LED lighting device.
Figure 48:
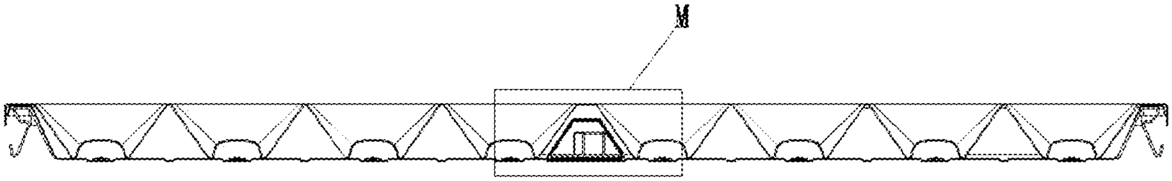
FIG. 48 is a cross-sectional structural schematic view of the LED lighting device in some embodiments.
Figure 49:
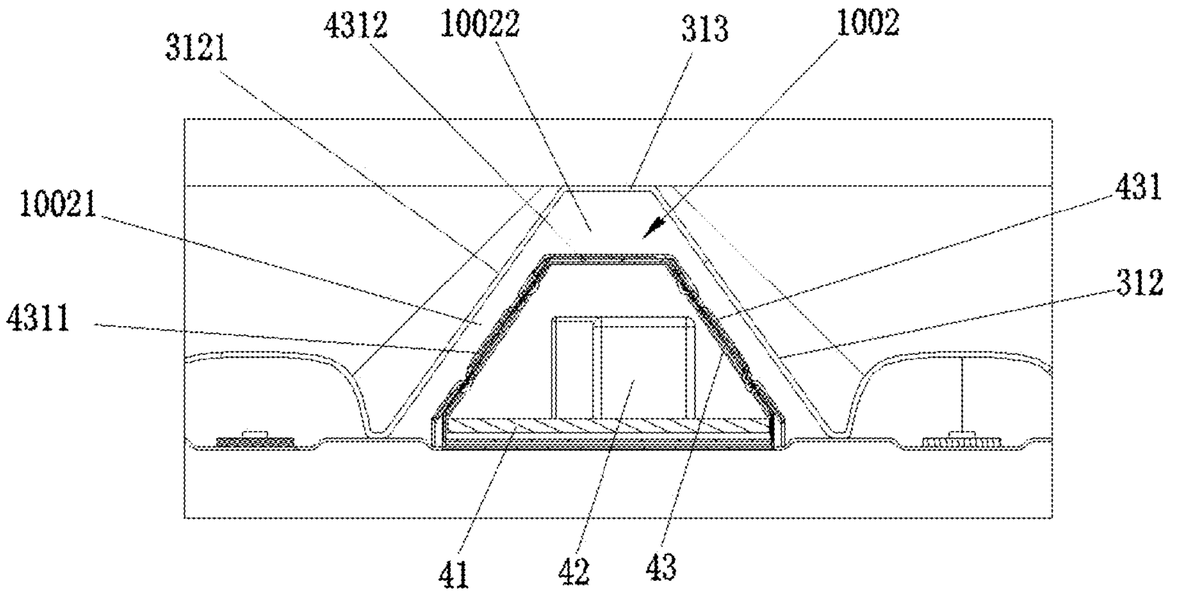
FIG. 49 is an enlarged view of part M in FIG. 48.
Figure 50:
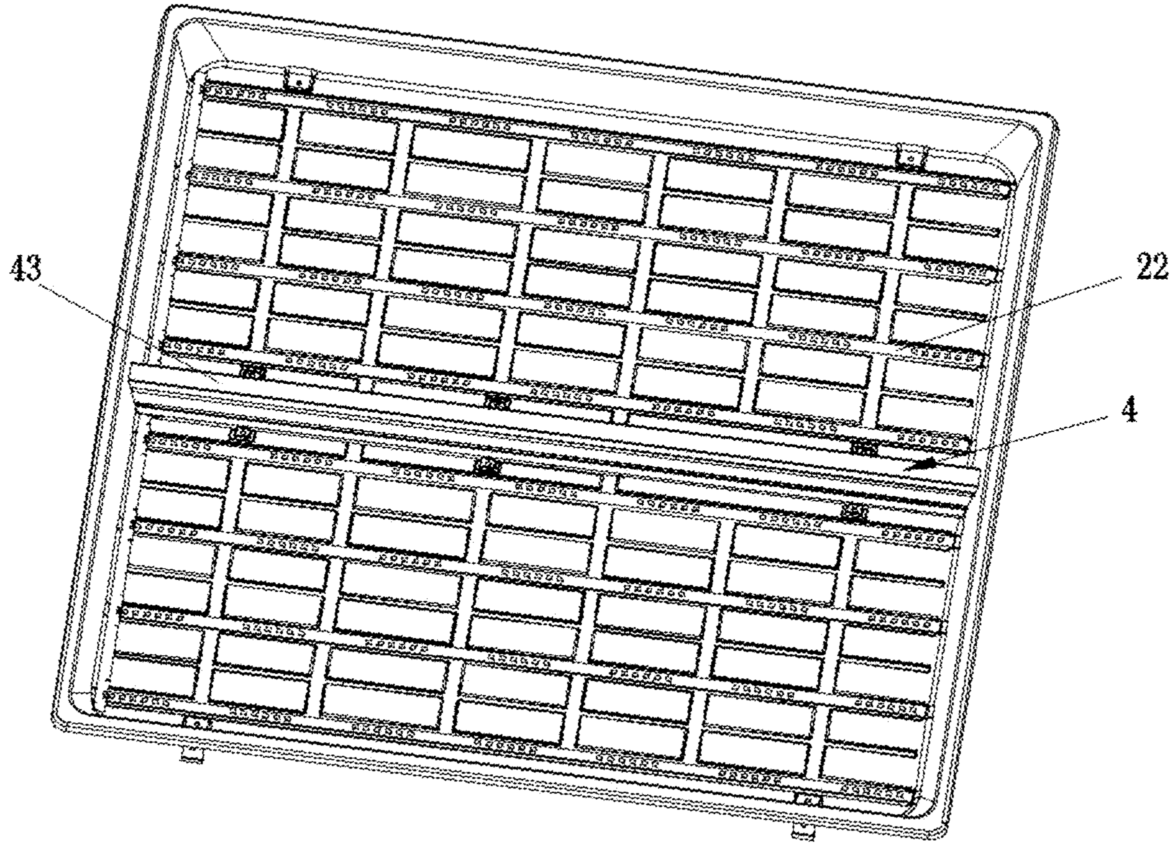
FIG. 50 is a perspective structural schematic view of FIG. 46 without the optical member.
Figure 51:
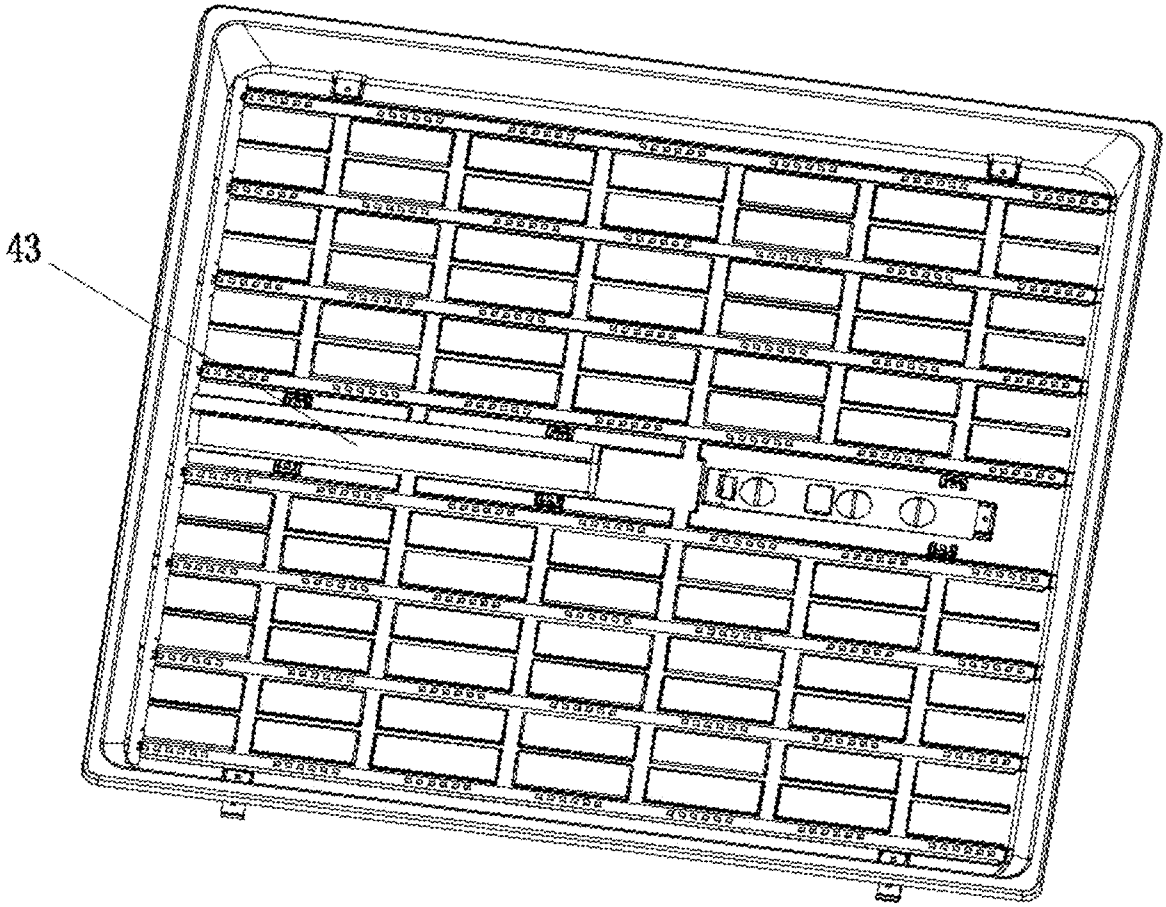
FIG. 51 is a perspective structural schematic view of FIG. 46 without the light redirecting unit.
Figure 52:
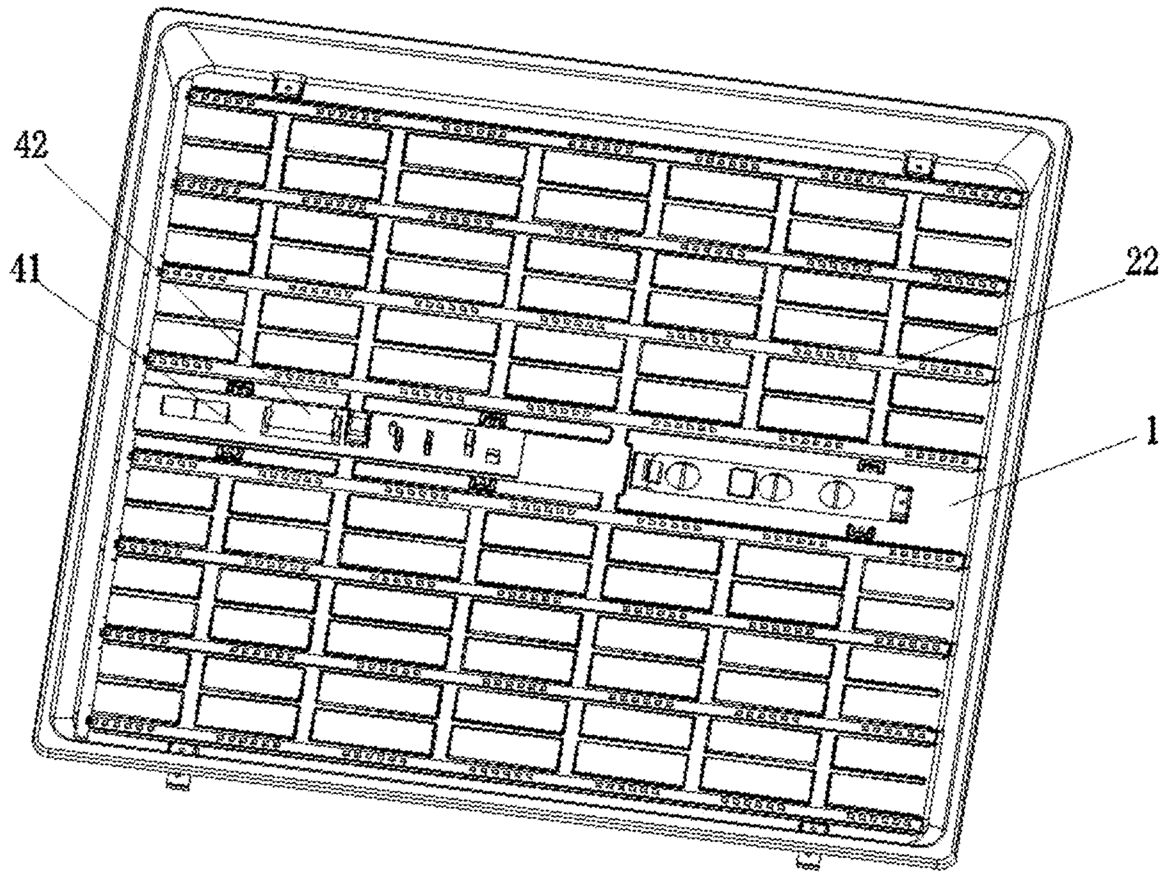
FIG. 52 is a perspective structural schematic view of FIG. 51 without the power source box.

In some embodiments, to control the glare of the LED lighting device and increase the light-emitting evenness in the light beam angle of the LED lighting device, a light distribution curve of the LED lighting device is designed (the light distribution curve means a light-emitting angle at each angle after the LED lighting device has been installed). In this embodiment, the LED lighting device is of a substantially square shape (such as two feet) or a lighting device described in any of the aforementioned embodiments, its light distribution curve is approximately axial symmetry (also called rotary symmetry, means the light distribution curve in each direction is basically symmetrical or the same). In other words, the ratio of luminous intensity (unit:cd) under the same angle of two light distribution curves in any direction is between 0.8 and 1.2. Furthermore, the ratio of luminous intensity (unit:cd) under the same angle of two light distribution curves in any direction is between 0.9 and 1.1. Moreover, the ratio of luminous intensity (unit:cd) under the same angle of two light distribution curves in any direction is between 0.95 and 1.05. In other words, when the ratio of luminous intensity under the same angle of two light distribution curves in any direction is in the above ranges, the light distribution curve of the LED lighting device in any direction is basically symmetrical or the same. For example, FIG. 44 shows light distribution curves on planes C0 and C90, where the light distribution curve on plane C0 is A and the light distribution curve on plane C90 is B. The ratio of luminous intensity of light distribution curve A and light distribution curve B at the same angle is between 0.8 and 1.2, 0.9 and 1.1 or 0.95 and 1.05. Plane C0 is a plane which is perpendicular to the light-emitting surface of the LED lighting device and penetrates the center line of the LED lighting device in one direction, where the "one direction" is parallel to the extended direction of length of the circuit board. Plane C90 is perpendicular to plane C0 and penetrates the center line of the LED lighting device in another direction, where the "another direction" is perpendicular to the extended direction of length of the circuit board. To further describe plane C0 and plane C90, please refer to FIG. 45. FIG. 45 shows a schematic view of the back of the LED lighting device. In FIG. 45, plane A0-A0 is plane C0 and plane B90-B90 is plane C90. The transverse direction of FIG. 45 is the installing direction of the circuit board.

The LED lighting device is of a substantially square shape (such as two feet), its light distribution curve is approximately axial symmetry, the light distribution curve in each direction is basically symmetrical or the same), so this embodiment takes the light distribution curve of plane C0 as an example. As shown in FIG. 44, the embodiment provides a light distribution curve to solve the glare and light-emitting evenness in the light beam angle of the LED lighting device. A coordinate system is established with point 0 of the light distribution curve as the center, in the range of 0 to 60 degrees, any point on the light distribution curve conforms to the following formula:

$$y=ax^2+bx+K$$

where a is a constant whose range is between −0.3 and −0.4, b is a constant whose range is between 3.5 and 4, and K is a constant whose range is between 1600 and 1700.

In the embodiment, the light beam angle of the light distribution curve of plane C0 is between 100 degrees and 110 degrees. The light distribution curve on two sides of the zero-degree angle of plane C0 is substantially symmetrical. In the range of 0 to 60 degrees, when any point on the light distribution curve satisfies the above formula, the LED lighting device has even light emission in the light beam angle and great glare control.

Please refer to FIG. 44. A coordinate system is established with point 0 of the light distribution curve as the center, in the range of −30 degrees to 30 degrees, any point on the light distribution curve satisfies the following formula:

$$y=ax^2+1E-13x+K$$

where a is a constant whose range is between −0.25 and −0.27, E means an exponent, and K is a constant whose range is between 1600 and 1720.

In the range of −30 degrees to 30 degrees, when any point on the light distribution curve satisfies the above formula, the LED lighting device has higher luminous intensity in the range of −30 degrees and 30 degrees to meet the requirement of light distribution in the angle range.

In the embodiment, the design of the above light distribution curve can be implemented by the above structural design.

As shown in FIGS. 69-75, an embodiment provides an optical member 9 which may be applied to the LED lighting device of the invention. The fundamental structure of the optical member 9 in the embodiment is substantially the same as the above embodiments (the optical member shown in the embodiments in FIGS. 1-56). In detail, the optical member 9 (optical unit 91) also includes a first optical member 911 and a second optical member 912. The first optical member 911 is covered on the light-emitting direction of the corresponding LED array 23. That is, the first optical member 911 is arranged in one-to-one correspondence with the LED array 23, and the both are arranged with the same amount. For example, in the embodiment, the outline size of the LED lighting device is 2 feet×2 feet (603 mm*603 mm), and the amount of the optical units 91 is 16.

In the embodiment, the range of luminous flux emitted from each optical unit 91 is between 250 lumen and 350 lumen. In the embodiment, at least 50% of the luminous flux emitted from the optical unit 91 is directly emitted from the first optical member 911 (without being reflected by the second optical member 912) to reduce the light loss caused by the reflection of the second optical member 912 so as to guarantee the light-emitting efficiency. After passing through two layers of optical media, the light-emitting efficiency of existing technology lamps is usually not higher than 75%, while in the LED lighting device of the embodiment, at least 50% of luminous flux only passes one layer of optical medium (the first optical member 911), its overall light-emitting efficiency can be higher than 80%. The light-emitting efficiency described here means the ratio of the luminous flux emitted from the LED lighting device to the sum of the luminous flux generated by all LED chips 21.

In the embodiment, the first optical member 911 may be substantially the same as the first optical member 911 in the aforementioned embodiments in structure In the embodiment, the second optical member 912 includes an optical walls surrounding the first optical member 911. The optical walls includes two first light redirecting walls 9121 and two second light redirecting walls 9122. The first light redirecting walls 9121 are disposed on two sides of the width direction of the circuit board 22, and the second light redirecting walls 9122 are disposed in the length direction of the circuit board 22. Each of the first light redirecting walls 9121 and the second light redirecting walls 9122 may be disposed with functions of reflection and/or transmittance.

In the embodiment, the light beam angle of the LED chip 21 is A (the definition of the light beam angle is the same as the abovementioned). The LED array 23 includes multiple LED chips 21. The multiple LED chips 21 are arranged in a row along the length direction of the circuit board 22. The angle c between the two first light redirecting walls 9121 of the second optical member 912 is greater than the light beam angle A of the LED chip 21. Thus, even if the light emitted from the LED chips 21 is optically treated by the first optical member 911 (such as diffusion), the light emitted from the LED chips 21 being emitted by the first light redirecting wall 9121 can still be reduced so as to reduce the light loss. In the embodiment, the difference between the angle c between the two first light redirecting walls 9121 of the second optical member 912 and the light beam angle A of the LED chip 21 is not greater than 30 degrees, so as to make the first light redirecting wall 9121 reflect sufficient light (emitted from the LED chips 21) to make the LED lighting device have evener light distribution and better glare control.

In the embodiment, the angle b between two second light redirecting walls 9122 of the second optical member 912 is less than the light beam angle A of the LED chip 21 and the angle c between two first light redirecting walls 9121. Thus, the second light redirecting walls 9122 can reflect more light from the LED chips 21 in the LED array 23 to both reduce the glare in the installing direction of the LED chips 21 of the LED array 23 of the LED lighting device and make the first light redirecting walls 9121 reflect sufficient light (emitted from the LED chips 21) to make the LED lighting device have evener light distribution. In some embodiments, the angle b between the second light redirecting walls 9122 of the second optical member 912 is less than 90°, 85°, 80° or 75°.

In the embodiment, the LED array 23 has more than ten LED chips 21 (such as fourteen), and wherein the light emission in the range of the light beam angle A of at least two, four or six LED chips 23 corresponds to the second light redirecting walls 9122. In other words, without considering the light diffusion of the first optical member 91, the light emission in the range of the light beam angle A of at least two, four or six LED chips 23 will be emitted to the second light redirecting walls 9122 to reduce glare and make the optical unit 91 have better light distribution.

As shown in FIGS. 57-64, in some embodiments, the LED lighting device may have different optical members to obtain different light-emitting effects. That is, the basic structure of the LED lighting device in the embodiment shown in FIGS. 57-60 is the same as the above embodiments (i.e., the seat, the electric power source and the light source are the same or substantially the same in structure), their difference is to replace a different optical member. As shown in FIGS. 57-60, in the embodiment, the optical member 6 includes a first optical element 61 and a second optical element 62. The first optical element 61 is covered on the seat 1 and arranged to redirect the light emitted from at least part of the light source 2. The second optical element 62 is disposed on the first optical element 61 and arranged to have one or more functions of light transmittance, diffusion, refraction and reflection.

The first optical element 61 is disposed with multiple optical units 611 corresponding to the LED array 23 of the light source 2. In detail, the optical unit 611 includes a light-emitting hole 6111, which makes the LED array 23 corresponding thereto exposed from the optical unit 611. In other words, in the direction of the optical axis of the ELD chips 21 of the LED array 23, the optical unit 611 does not form a cover and does not cause a light loss resulting from light passing different media.

The optical unit 611 is attached on a surface of the circuit board 22 of the light source 2 and there is no gap between the circuit board 22 and the wall portion of the periphery of the light-emitting hole 6111 in the direction of the optical axis of the ELD chips 21 to prevent light from entering the gap to cause light loss. In some embodiments, the interval between the optical unit 611 and the surface of the circuit board 22 of the light source 2 is less than 1 mm (the interval between the surface of the circuit board 22 and the wall portion of the periphery of the light-emitting hole 6111 in the direction of the optical axis of the LED chips 21 is less than 1 mm) to reduce light entering the gap between the circuit board 22 and the wall portion of the periphery of the light-emitting hole 6111 so as to control light loss.

The optical unit 611 includes a first light redirecting wall 6112 and a second light redirecting wall 6113. The first light redirecting wall 6112 is disposed on two sides of the width direction of the circuit board 22, and the second light redirecting walls 6113 is disposed in the length direction of the circuit board 22. Each of the first light redirecting wall 6112 and the second light redirecting wall 6113 may be disposed with functions of reflection and/or transmittance.

The second optical element 62 is covered on the first optical element 61 to form an optical chamber composed of the first light redirecting wall 6112, the second light redirecting wall 6113 and the second optical element 62. The light generated by the working LED chips 21 will be finally emitted from the second optical element 62. In the embodiment, at least 50% of the luminous flux generated by the working LED array 23 (light source 2) is emitted from the LED lighting device only through one optical layer (not including air) so as to reduce light loss caused by passing multiple optical layers and improve the light-emitting efficiency.

The first light redirecting wall 6112 has a first reflecting portion 61121 and a second reflecting portion 61122. The first reflecting portion 61121 is arranged to reflect the light directly emitted from the LED chips 21, and the second reflecting portion 61122 is arranged to only reflect secondary light (the light directly emitted from the LED chips 21 being reflected and then projected to the second reflecting portion 61122). In arrangement, the first reflecting portion 61121 is more adjacent to the LED chips 21 than the second reflecting portion 61122. In some embodiments, the area of the first reflecting portion 61121 accounts for at least one fifth of the area of the first light redirecting wall 6112 to prevent the light emission of the LED chips 21 from excessively concentrating after being reflected by the first reflecting portion with a small area, which causes uneven light emission. In the embodiment, the second optical element 62 is removed (excluding the influence of the reflected light by the second optical element 62), after the LED chips 21 been lit, part of the first light redirecting wall 6112, which is directly lit, can be deemed as the first reflecting portion 61121 of the embodiment, the contrary part is the second reflecting portion 61122.

Figure 61:
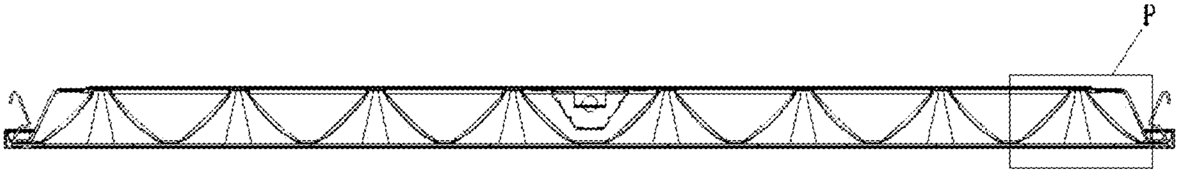
FIG. 61 is a cross-sectional structural schematic view of the LED lighting device in some embodiments.
Figure 62:
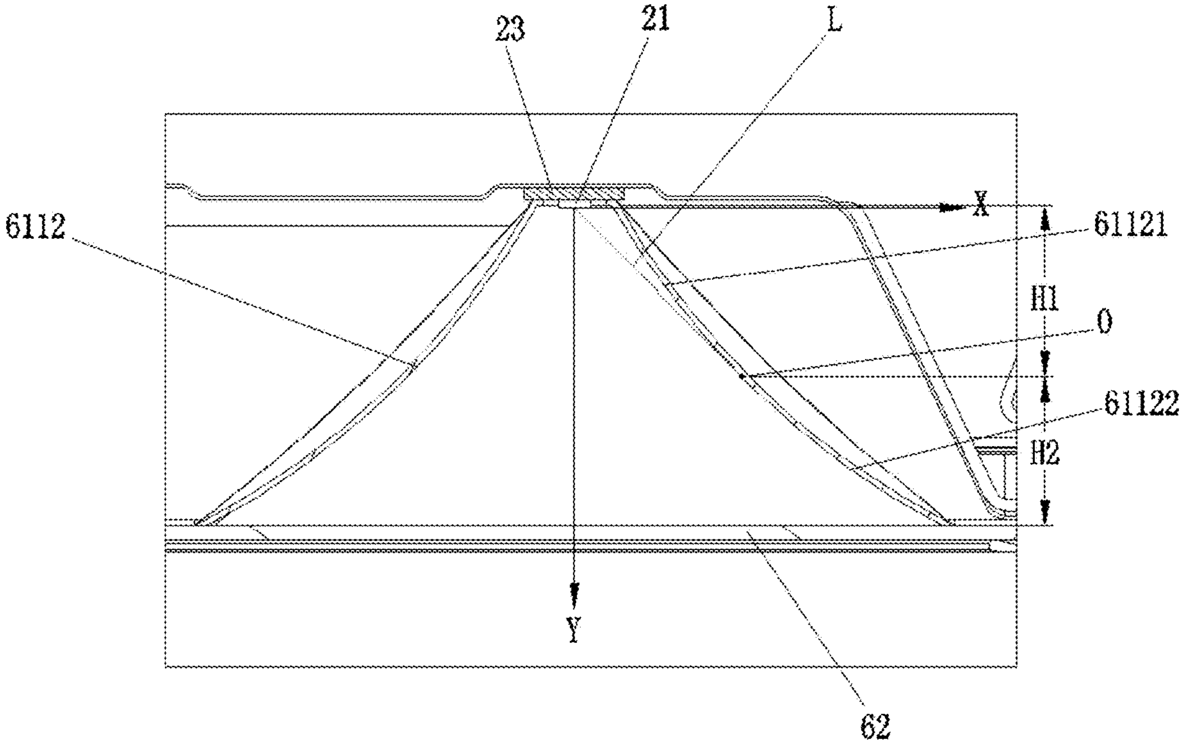
FIG. 62 is an enlarged view of part P in FIG. 61.

As shown in FIGS. 61-62, on the cross-section of the LED lighting device, the cross-section expresses the matching relationship of the first light redirecting wall 6112 and the LED chip 21. A straight line L, whose one end is connected to the center of the front of the LED chip 21 and the other end is tangent to the first light redirecting wall 6112, the tangent point between the straight line L and the first light redirecting wall 6112 is O, the tangent point O divides the first light redirecting wall 6112 into a first portion and a second portion, the first portion is more adjacent to the LED chip 21 than the second portion, the first portion is the first reflecting portion 61121, and the second portion is the second reflecting portion 61122. In FIG. 62, the ratio of the height H1 of the first portion to the height H2 of the second portion is between 1 and 1.3 to make the LED lighting device have better light-emitting evenness and better light-emitting angle. In detail, when the ratio of the height H1 of the first portion to the height H2 of the second portion is in the abovementioned range, on the one hand, the first reflecting portion 61122 can have a larger area to reflect the light directly emitted from the LED chip 21 (or the first light redirecting wall 6112 can have a larger area to reflect the light directly emitted from the LED chip 21), so that the reflected light can be emitted more evenly. On the other hand, it can better control the light emission of LED lighting device, control its light-emitting angle, and reduce glare.

In the embodiment, the first light redirecting wall 6112 may be of an arcuate shape. The distance between the two first light redirecting walls 6112 corresponding to the LED chips 21 gradually increases in the direction on the optical axis of the LED chips 21, which is away from the LED chips 21, and the magnitude of its gradual increase also increases. In other words, a flared or dilated shape appears between the two first light redirecting walls 6112 corresponding to the LED chips 21.

As shown in FIG. 62, when the LED lighting device is installed horizontally and the optical axis of the LED chips 21 is vertically downward, a rectangular coordinate system is established with the center of the light-emitting surface of the LED chips 21 as the origin, the width direction of the circuit board 22 as the X-axis, and the thickness direction of the LED lighting device as the Y-axis, any point on the first light redirecting wall 6112 satisfies the following formula:

$$y=ax^2+bx+k$$

where a is a constant whose range is between 0.02 and 0.025, the range of the absolute value of b is between 1.6 and 1.8, and k is a constant whose range is between 5 and 6.

When satisfying the above formula, the first light redirecting wall 6112 has better reflection to the light directly emitted from the LED chips 21 and to the light reflected from the second optical element 62, so that the LED lighting device can have better light-emitting evenness and light-emitting angle.

Figure 63:
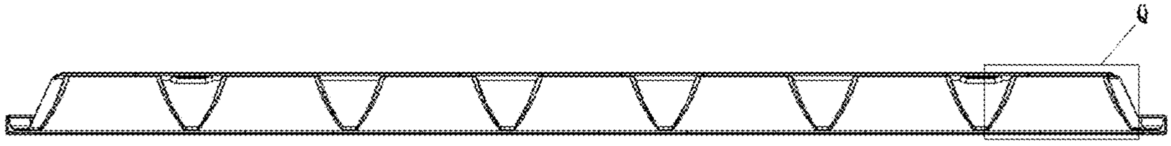
FIG. 63 is another cross-sectional structural schematic view of the LED lighting device in some embodiments.
Figure 64:
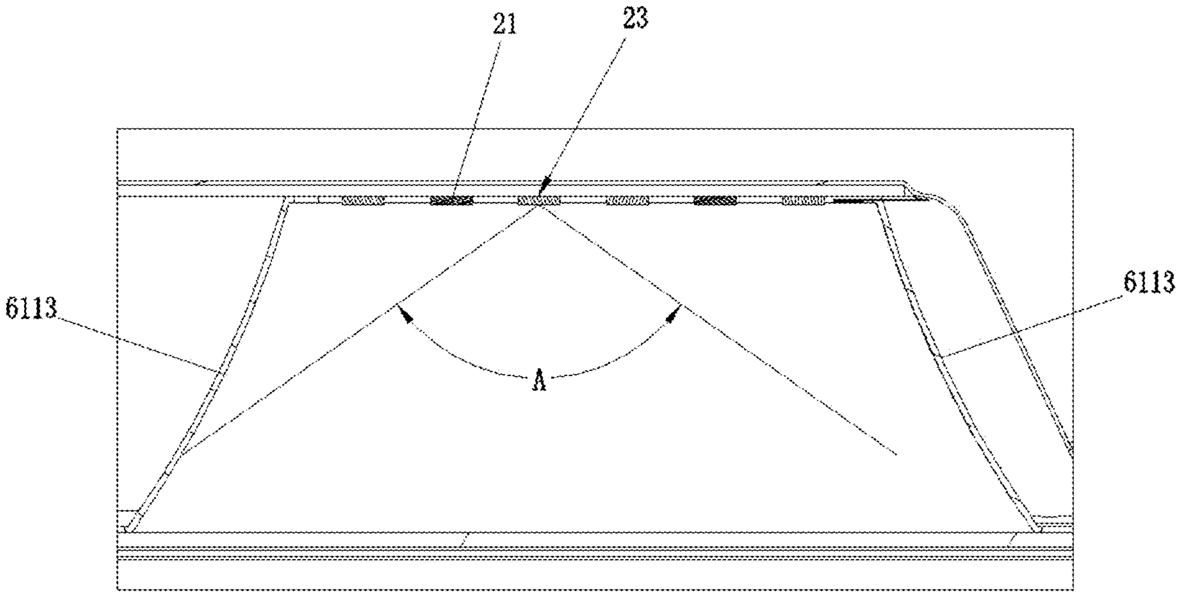
FIG. 64 is an enlarged view of part Q in FIG. 63.
Figure 65:
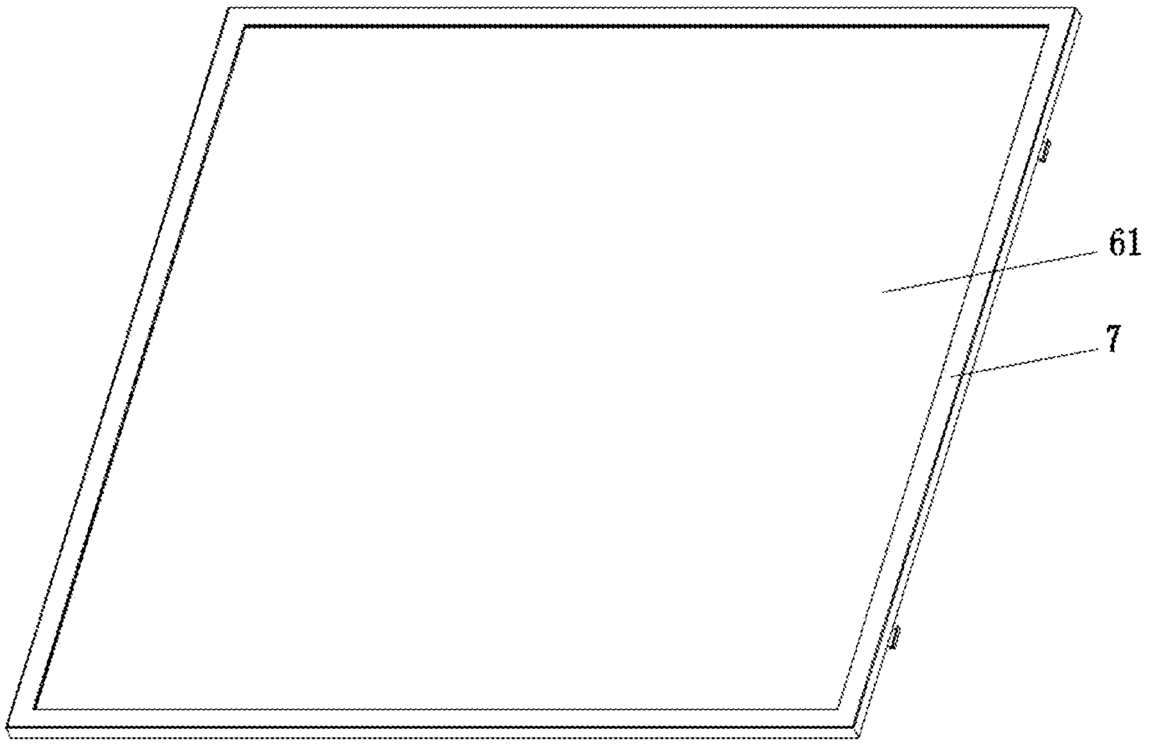
FIG. 65 is a perspective structural schematic view of the LED lighting device in some embodiments.
Figure 66:
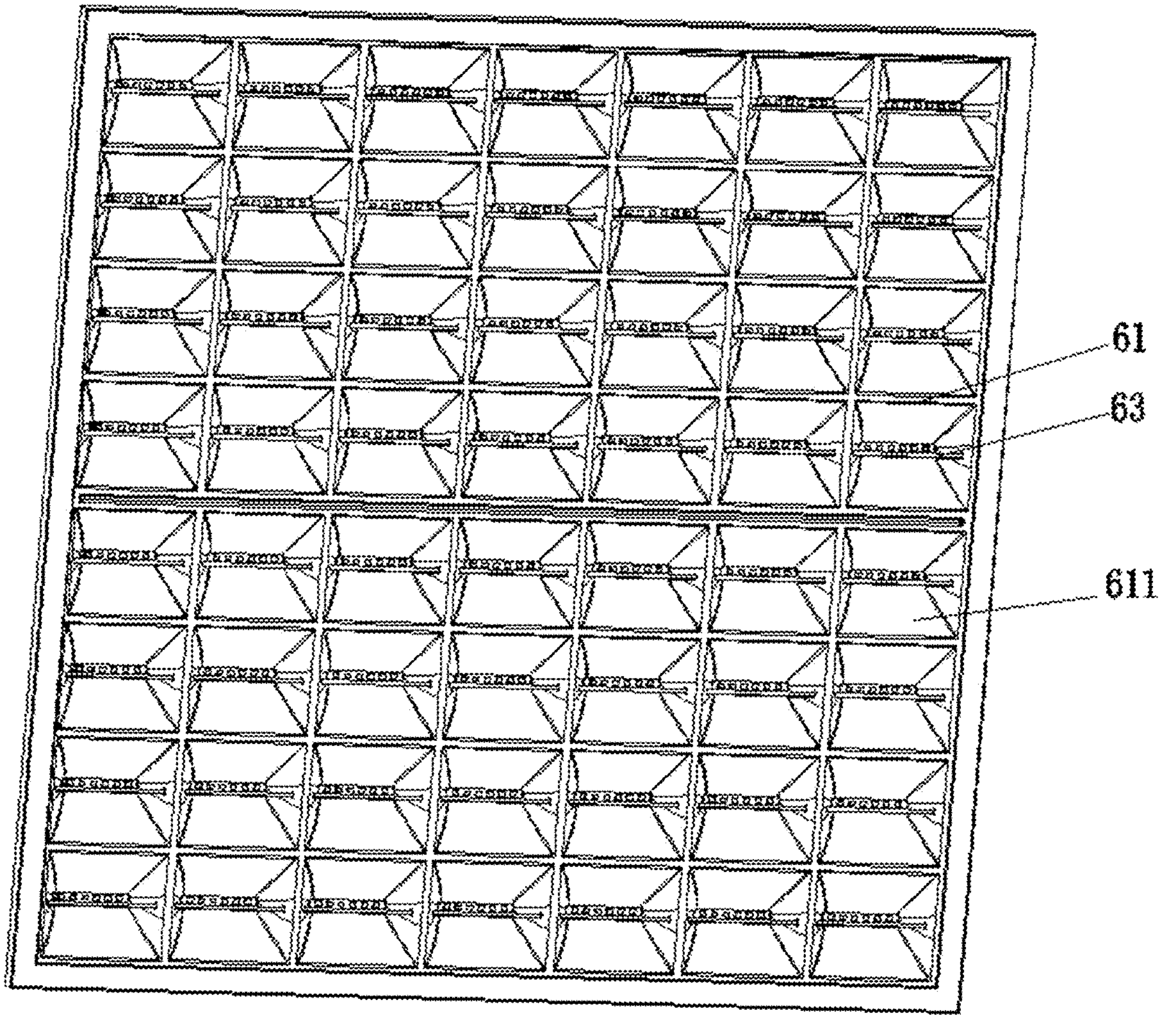
FIG. 66 is a perspective structural schematic view of FIG. 65 without the second optical element.
Figure 67:
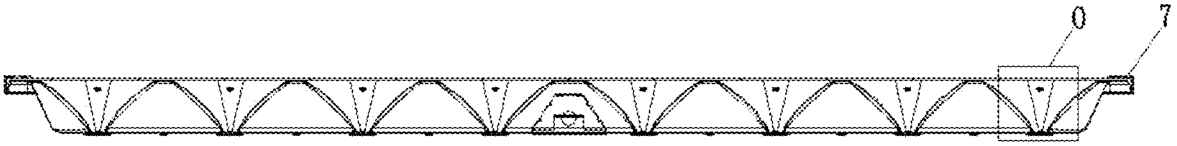
FIG. 67 is a cross-sectional structural schematic view of the LED lighting device in some embodiments.
Figure 68:
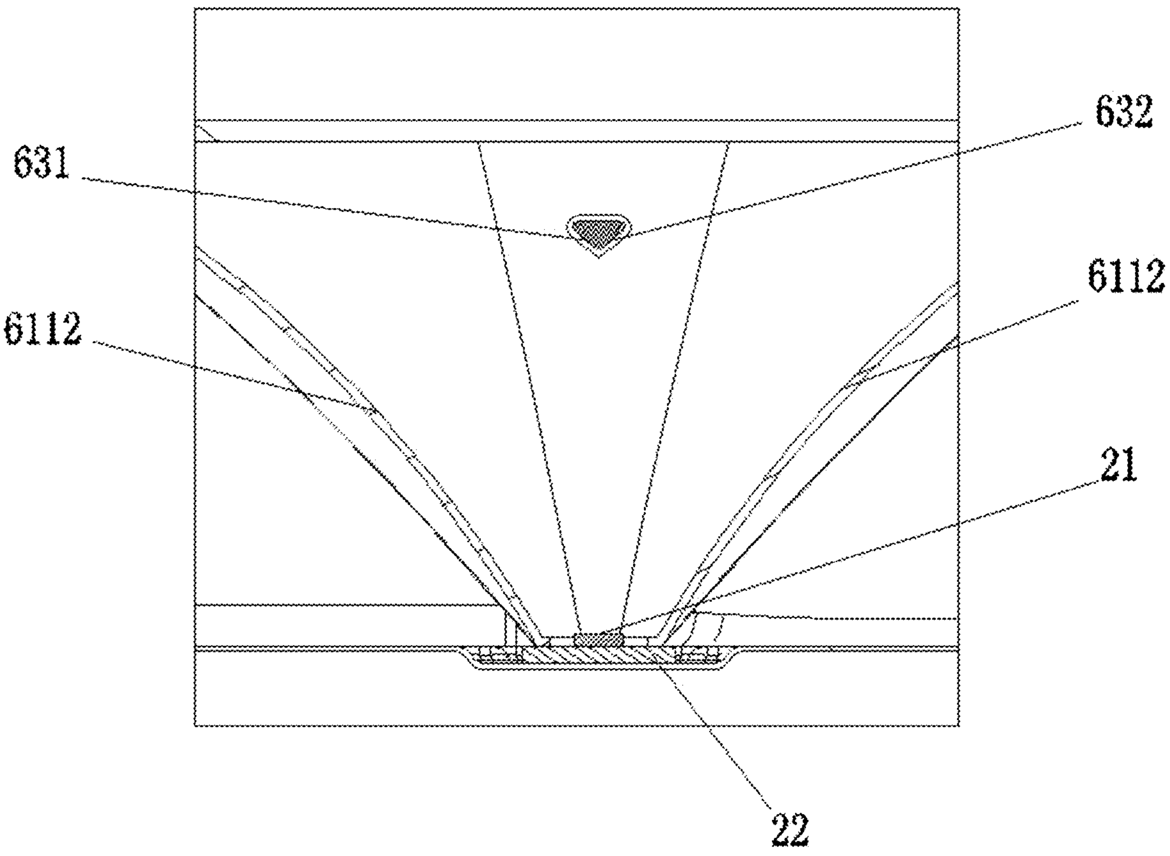
FIG. 68 is an enlarged view of part O in FIG. 67.
Figure 69:
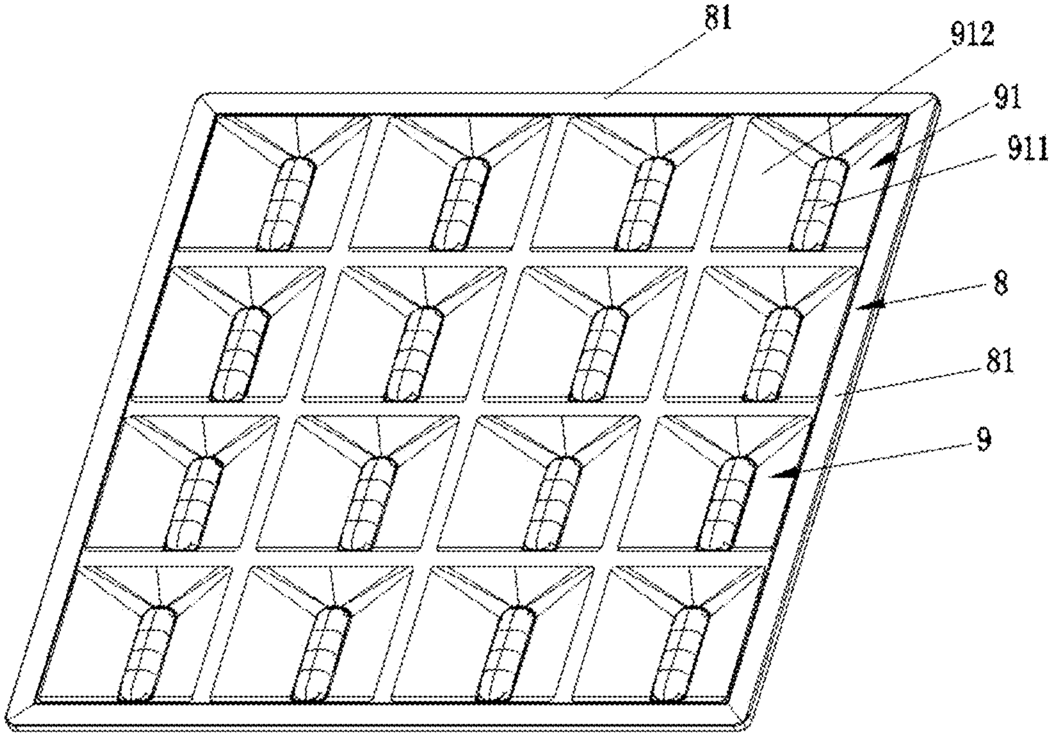
FIG. 69 is a perspective structural schematic view of the LED lighting device in some embodiments.
Figure 70:
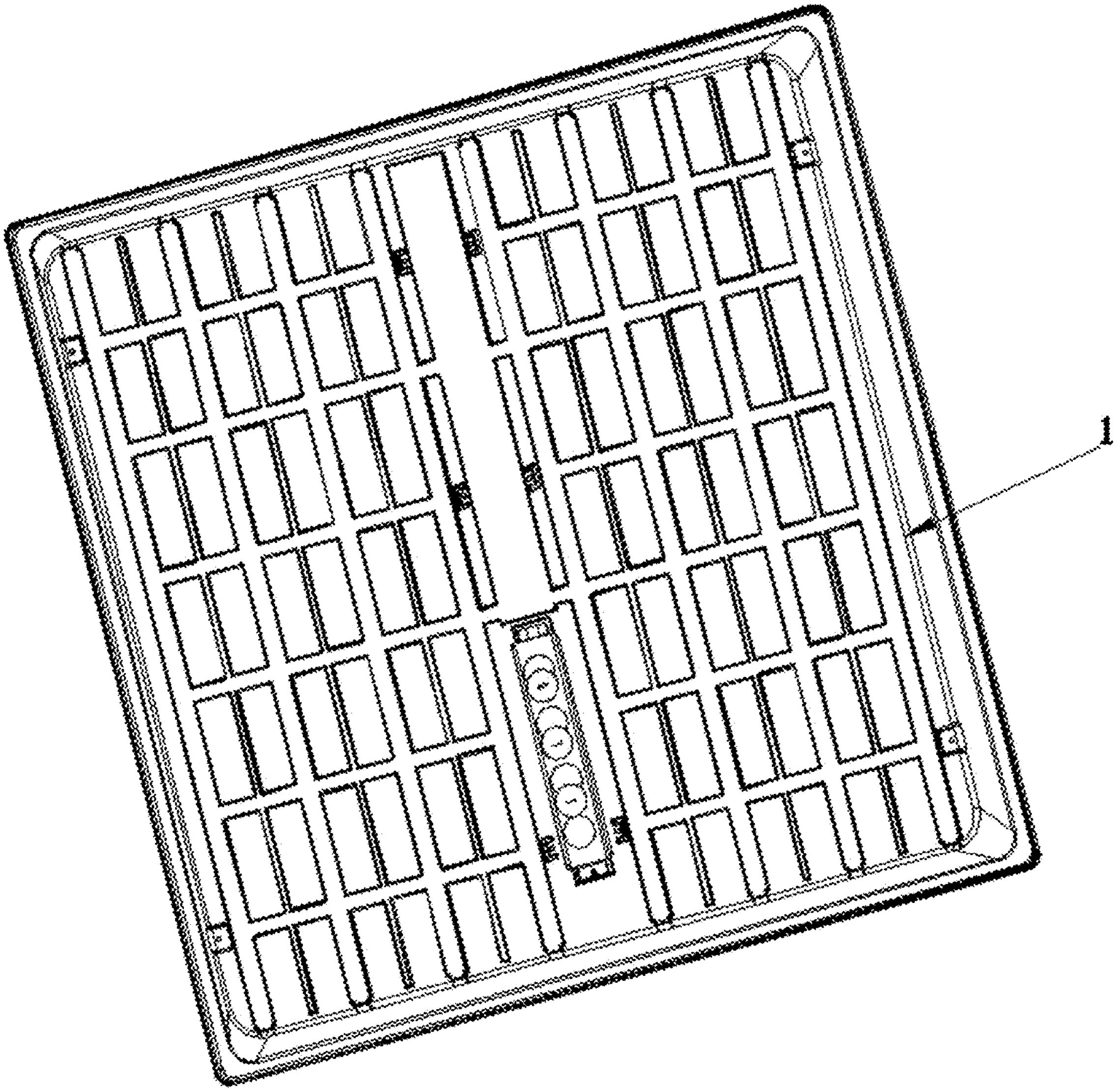
FIG. 70 is another perspective structural schematic view of the LED lighting device in some embodiments.
Figure 71:
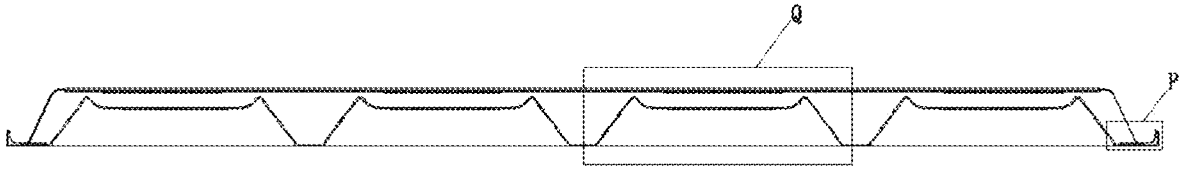
FIG. 71 is a perspective structural schematic view of the LED lighting device in some embodiments.
Figure 72:
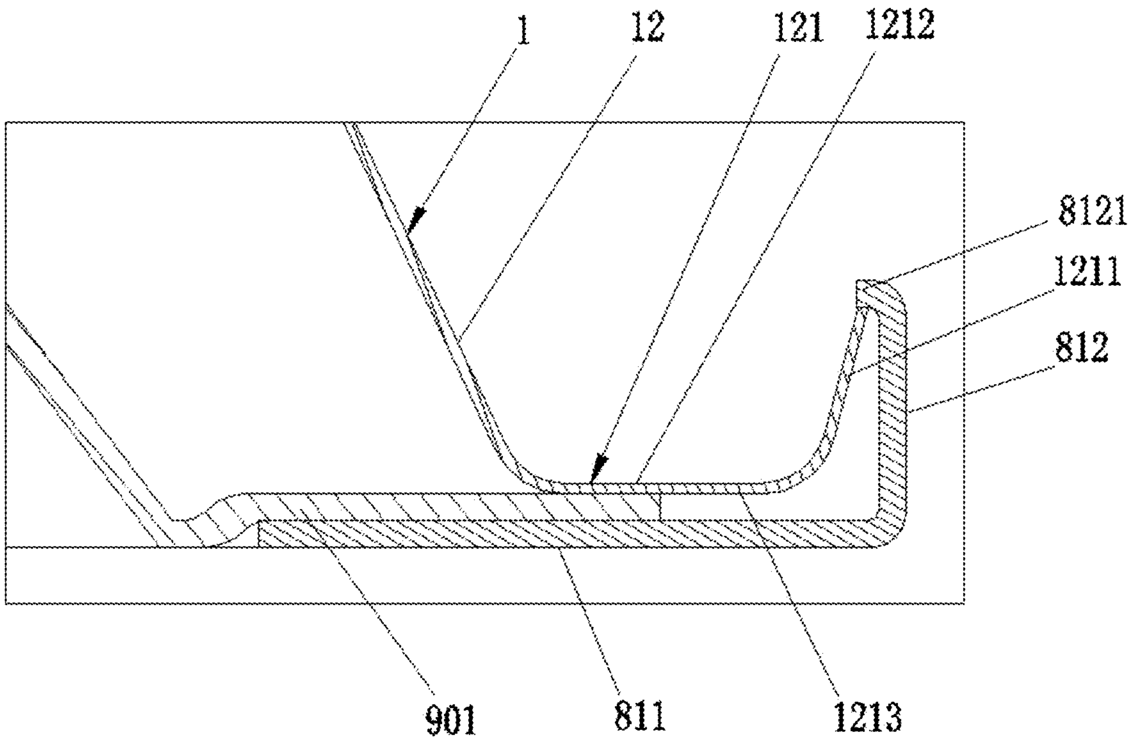
FIG. 72 is an enlarged view of part P in FIG. 71.
Figure 73:
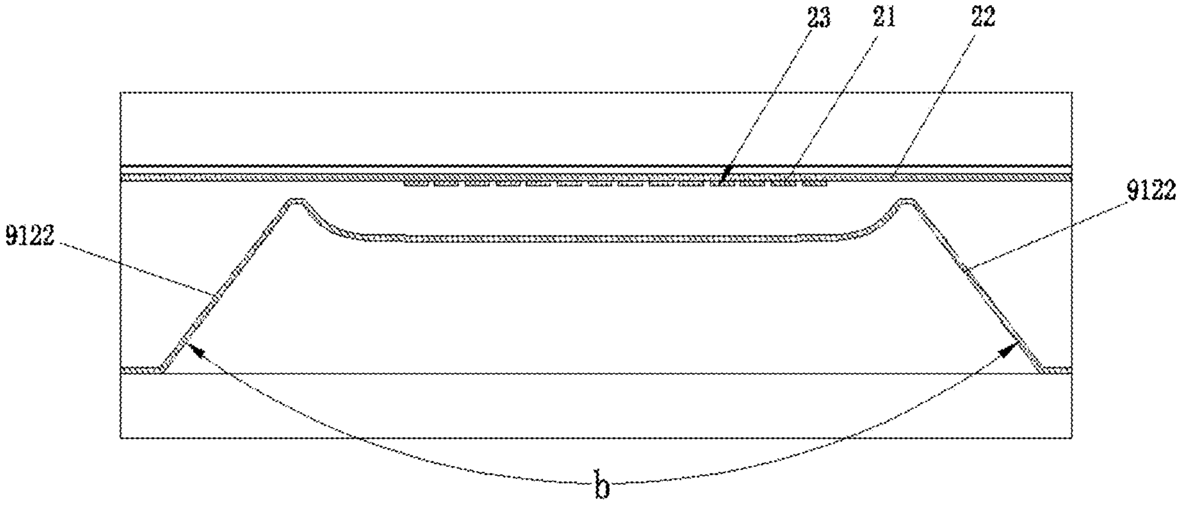
FIG. 73 is an enlarged view of part Q in FIG. 71.
Figure 74:
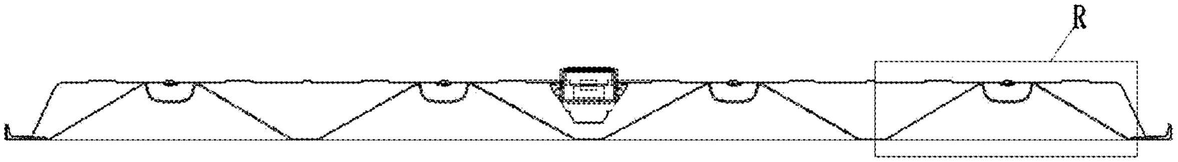
FIG. 74 is another cross-sectional schematic view of the LED lighting device in some embodiments.
Figure 75:
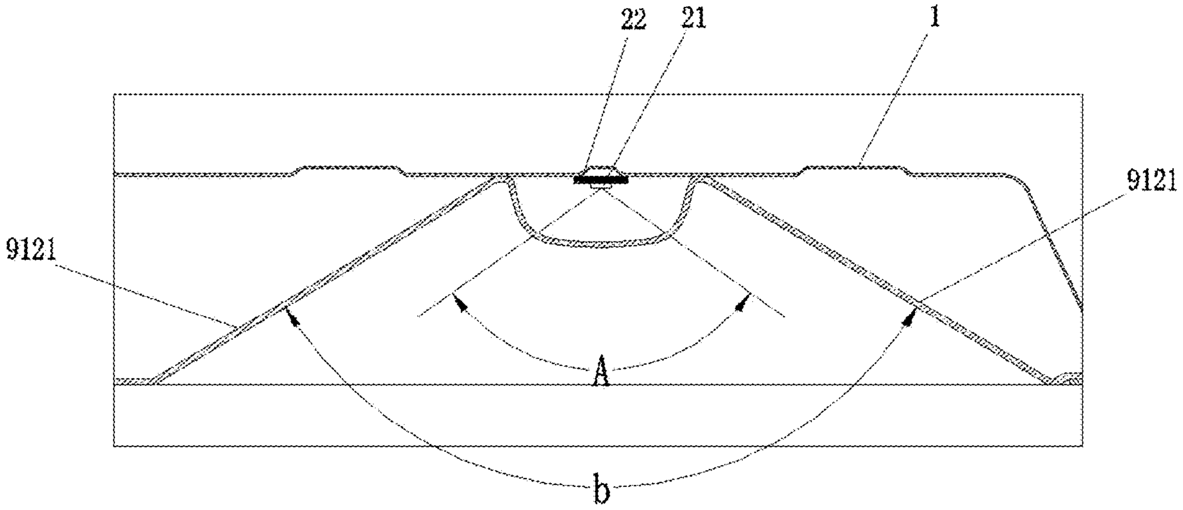
FIG. 75 is an enlarged view of part R in FIG. 74.

As shown in FIGS. 63-64, on the cross-section of the LED lighting device, the cross-section expresses the matching relationship of the second light redirecting wall 6113 and the LED array 23. At least part of the light emission in the range of the light beam angle A of one of the LED chips 21 in the same LED array 23 is directly emitted to the second light redirecting wall 6113 and reflected by the second light redirecting wall 6113. In other words, the boundary lines of the light beam angle A of one of the LED chips 21 in the same LED array 23 intersect the second light redirecting wall 6113. Thus, on the one hand, at least part of the light emission in the range of the light beam angle A of one of the LED chips 21 in the same LED array 23 is blocked by the second light redirecting wall 6113 to reduce glare. On the other hand, the reflection of the second light redirecting wall 6113 can improve the overall light emission to make the light-emitting distribution more reasonable.

In the embodiment, the second optical element 62 may be configured to have a diffusion function (for example, the second optical element 62 has a diffusion function by its own material property, such as acrylic material) to increase the evenness of light emission. In some embodiments, the second optical elements 62 are arranged in an array manner to have a light redirecting function.

As shown in FIGS. 65-68, in some embodiments, to make the LED lighting device have different light-emitting effects, the optical member 6 may be further disposed with a third optical element 63. The third optical element 63 is disposed along the length direction of the circuit board 22 and located in the direction of the optical axis of the LED chip 21. In some embodiments, the third optical element 63 may be configured to only have a reflection function to reflect the light from the working LED chips 21 to the optical unit 611 (the first light redirecting wall 6112 and the second light redirecting wall 6113) and then reflect it to the second optical element 62 by the optical unit 611 to perform light emission, so as to reduce the luminous intensity near the optical axis of the LED chip 21 to improve the evenness of light emission. In some embodiments, the third optical element 63 is configured to have functions of reflection and transmittance to prevent the third optical element 63 from forming a dark area.

The third optical element 63 has a first reflecting face 631 and a second reflecting face 632. The first reflecting face 631 corresponds to the first light redirecting wall 6112 on one side, and the second reflecting face 632 corresponds to the first light redirecting wall 6112 on the other side. The first reflecting face 631 and the second reflecting face 632 are arranged symmetrically.

The optical axis of the LED chip 21 corresponds or substantially corresponds to the junction of the first reflecting face 631 and the second reflecting face 632. The first reflecting face 631 is in the opposite direction of the junction of the first reflecting face 631 and the second reflecting face 632, and the distance from it to the surface of the circuit board 22 gradually increases.

The third optical element 63 is of a strip shape and simultaneously corresponds to multiple optical units 611. The third optical element 63 passes through the hole on the second light redirecting wall 6113 and is fixed on the second light redirecting wall 6113.

In the embodiment, the LED lighting device further includes a decorative element 7 disposed on the periphery of the seat 1 and covered on the periphery of the optical member 6. The decorative element 7 can form decoration and enhance the structural strength of the LED lighting device.

The technical contents of this invention will become apparent with the detailed description of embodiments accompanied with the illustration of related drawings as abovementioned. It is intended that the embodiments and drawings disclosed herein are to be considered illustrative rather than restrictive. While this invention has been described by means of specific embodiments, numerous modifications and variations could be made thereto by those skilled in the art without departing from the scope and spirit of this invention set forth in the claims.

What is claimed is:

1. An LED (light-emitting diode) lighting device comprising:

a seat comprising a baseplate, a sidewall disposed on a periphery of the baseplate and an end wall disposed on a periphery of the sidewall, the baseplate and the sidewall forming a chamber therebetween, the sidewall and the end wall forming a receiving space therebetween;

a light source disposed in the chamber and attached to a surface of the baseplate, the light source comprising a plurality of LED arrays;

an electric power source disposed in the receiving space and electrically connecting to the light source;

an optical assembly disposed on the seat, the optical assembly comprising a plurality of optical units and a connecting wall connecting to a periphery of the plurality of optical units, the plurality of optical units covering the light source and the connecting wall disposed on the end wall; and an installing unit disposed on the connecting wall of the optical assembly, the connecting wall of the optical assembly being clamped by the installing unit and the end wall of the seat, wherein the plurality of optical units comprise a plurality of first optical members and a plurality of second optical members, one of the first optical members covers one of the LED arrays, and the second optical members are interposed between adjacent first optical members, the second optical members further comprising a plurality of optical walls that form groups of optical walls, each group of optical walls surrounding a respective first optical member of the plurality of first optical members.

2. The LED lighting device of claim 1, wherein each one of the LED arrays is arranged to correspond to one of the first optical members and a quantity of the LED arrays is the same as the quantity of first optical members.

3. The LED lighting device of claim 2, wherein each of the LED arrays is cloaked by one of the first optical members.

4. The LED lighting device of claim 3, wherein each one of the first optical members has a light-emitting surface, whereby for each LED array of the LED arrays, a portion of light emitted from the LED array penetrates the first optical member and then exits from the light-emitting surface.

5. The LED lighting device of claim 4, wherein the light-emitting surface has a main portion and two end portions separately and located at two ends of the main portion, and further wherein a cross-section of the main portion has an arcuate shape and each end portion is an arcuate surface.

6. The LED lighting device of claim 5, wherein the light-emitting surface is a light transmissive and diffusive surface.

7. The LED lighting device of claim 6, wherein the light source comprises a plurality of circuit boards, the plurality of LED arrays are disposed on the plurality of circuit boards, and each LED array comprises a plurality of LED chips.

8. The LED lighting device of claim 7, wherein the LED lighting device further comprises an electric connecting unit attached to the baseplate and electrically connecting the electric power source to the light source.

9. The LED lighting device of claim 8, wherein the electric connecting unit is attached to the baseplate and electrically connects the plurality of the circuit boards to the electric power source.

10. The LED lighting device of claim 9, wherein the plurality of optical walls are arranged obliquely relative to the baseplate.

11. The LED lighting device of claim 10, wherein the plurality of optical walls are arranged so that groups of four optical walls of the second optical members are connected in series to form a loop, each group of four optical walls surround one of the first optical members, and each optical wall is a plane wall.

12. The LED lighting device of claim 11, wherein at least a portion of light emitted from the LED arrays penetrates the optical walls and at least a portion of light emitted from the LED arrays is reflected by the optical walls.

13. The LED lighting device of claim 12, wherein for each optical unit, the light-emitting surface is closer to the LED array than it is to the second optical member.

14. The LED lighting device of claim 13, wherein the baseplate comprises a positioning unit to position the light source.

15. The LED lighting device of claim 13, wherein the sidewall is formed by bending the periphery of baseplate.

* * * * *